US012294189B2

(12) United States Patent
Paynter

(10) Patent No.: US 12,294,189 B2
(45) Date of Patent: *May 6, 2025

(54) GANGED COAXIAL CONNECTOR ASSEMBLY

(71) Applicant: Outdoor Wireless Networks LLC, Claremont, NC (US)

(72) Inventor: Jeffrey D. Paynter, Momence, IL (US)

(73) Assignee: Outdoor Wireless Networks LLC, Richardson, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/844,379

(22) Filed: Jun. 20, 2022

(65) Prior Publication Data

US 2022/0329023 A1 Oct. 13, 2022

Related U.S. Application Data

(63) Continuation of application No. 17/027,846, filed on Sep. 22, 2020, now Pat. No. 11,374,370.

(60) Provisional application No. 62/908,780, filed on Oct. 1, 2019.

(51) Int. Cl.

| | |
|---|---|
| ***H01R 24/40*** | (2011.01) |
| ***H01R 9/05*** | (2006.01) |
| ***H01R 33/20*** | (2006.01) |

(52) U.S. Cl.

CPC ............... *H01R 24/40* (2013.01); *H01R 9/05* (2013.01); *H01R 33/20* (2013.01)

(58) Field of Classification Search

None

See application file for complete search history.

(56) References Cited

U.S. PATENT DOCUMENTS

| | | | | | |
|---|---|---|---|---|---|
| 3,850,495 | A * | 11/1974 | Glover | H01R 13/53 | 439/470 |
| 4,090,759 | A * | 5/1978 | Herrmann, Jr. | H01R 13/53 | 439/279 |
| 4,364,626 | A * | 12/1982 | Price | H01R 13/28 | 439/732 |

(Continued)

FOREIGN PATENT DOCUMENTS

| | | | |
|---|---|---|---|
| EP | 2020707 | A1 | 2/2009 |
| JP | 2009016126 | A | 1/2009 |

OTHER PUBLICATIONS

"International Preliminary Report on Patentability corresponding to International Application No. PCT/US2020/051910 mailed Apr. 14, 2022".

(Continued)

*Primary Examiner* — Oscar C Jimenez

(74) *Attorney, Agent, or Firm* — Myers Bigel, P.A.

(57) ABSTRACT

A coaxial connector assembly includes:

a first plurality of first coaxial connectors mounted within a shell, the shell defining a plurality of electrically isolated cavities, each of the first coaxial connectors being located in a respective cavity;

a plurality of first coaxial cables, each of the coaxial cables attached to a respective one of the first coaxial connectors;

a second coaxial connector mounted within the shell, the second coaxial connector being smaller that the first coaxial connectors; and a second coaxial cable attached to the second coaxial connector, the second coaxial cable being smaller than the first coaxial cables.

20 Claims, 44 Drawing Sheets

(56) References Cited

U.S. PATENT DOCUMENTS

| | | | | | |
|---|---|---|---|---|---|
| 4,697,859 | A * | 10/1987 | Fisher, Jr. | H01R 13/6315 | 439/246 |
| 4,708,666 | A * | 11/1987 | Fisher, Jr. | H01R 24/40 | 439/98 |
| 4,900,258 | A * | 2/1990 | Hnatuck | H01R 13/6585 | 439/502 |
| 4,974,075 | A * | 11/1990 | Nakajima | H04N 23/54 | 348/E5.025 |
| 5,169,343 | A * | 12/1992 | Andrews | H01R 24/50 | 439/607.11 |
| 5,244,415 | A * | 9/1993 | Marsilio | H01R 13/65912 | 439/456 |
| 5,474,466 | A | 12/1995 | Sakuraoka et al. | | |
| 5,474,470 | A * | 12/1995 | Hammond, Jr. | H01R 24/44 | 439/675 |
| 5,626,486 | A * | 5/1997 | Shelly | H01R 13/53 | 439/273 |
| 5,718,606 | A * | 2/1998 | Rigby | H01R 12/7035 | 439/607.1 |
| 5,906,511 | A | 5/1999 | Bozzer et al. | | |
| 6,244,892 | B1 * | 6/2001 | McCarthy | H01R 4/5025 | 439/421 |
| 6,702,601 | B2 * | 3/2004 | Pogliani | H01R 13/6215 | 439/282 |
| 6,905,367 | B2 * | 6/2005 | Crane, Jr. | H01R 13/514 | 439/701 |
| 7,316,584 | B2 * | 1/2008 | Mackillop | H01R 13/6477 | 439/607.05 |
| 7,458,837 | B2 * | 12/2008 | Mineo | G01R 1/0416 | 439/248 |
| 7,934,939 | B2 | 5/2011 | Chen et al. | | |
| 8,465,300 | B2 * | 6/2013 | Lin | H01R 24/86 | 439/101 |
| 9,257,796 | B1 * | 2/2016 | Dang | H01R 13/6463 | |
| 10,498,061 | B1 | 12/2019 | Blasick et al. | | |
| 11,424,582 | B2 * | 8/2022 | Paynter | H01R 9/0506 | |
| 2002/0146931 | A1 | 10/2002 | Richmond et al. | | |
| 2003/0216072 | A1 | 11/2003 | Kato et al. | | |
| 2009/0117762 | A1 | 5/2009 | Khemakhem | | |
| 2011/0244710 | A1 | 10/2011 | Svelnis et al. | | |
| 2014/0120769 | A1 | 5/2014 | Dang | | |
| 2016/0072224 | A1 | 3/2016 | Ichio | | |
| 2019/0081427 | A1 | 3/2019 | Ohtaka | | |
| 2019/0312394 | A1 | 10/2019 | Paynter et al. | | |
| 2020/0006893 | A1 | 1/2020 | Ding et al. | | |

OTHER PUBLICATIONS

"International Search Report and Written Opinion corresponding to International Application No. PCT/US2020/051910 mailed Jan. 4, 2021".

Extended European Search Report corresponding to European Application No. 20872090.4; Dated: Oct. 2, 2023, (9 pages).

* cited by examiner

GANGED COAXIAL CONNECTOR ASSEMBLY

RELATED APPLICATION

The present application is a continuation of U.S. patent application Ser. No. 17/027,846, filed Sep. 22, 2020, now U.S. Pat. No. 11,374,370, which claims priority from and the benefit of U.S. Provisional Patent Application No. 62/908,780, filed Oct. 1, 2019, the disclosure of which is hereby incorporated by reference herein in full.

FIELD OF THE INVENTION

The present invention relates generally to electrical cable connectors and, more particularly, to ganged connector assemblies.

BACKGROUND

Coaxial cables are commonly utilized in RF communications systems. Coaxial cable connectors may be applied to terminate coaxial cables, for example, in communication systems requiring a high level of precision and reliability.

Connector interfaces provide a connect/disconnect functionality between a cable terminated with a connector bearing the desired connector interface and a corresponding connector with a mating connector interface mounted on an apparatus or a further cable. Some coaxial connector interfaces utilize a retainer (often provided as a threaded coupling nut) that draws the connector interface pair into secure electro-mechanical engagement as the coupling nut, rotatably retained upon one connector, is threaded upon the other connector.

Alternatively, connection interfaces may be also provided with a blind mate characteristic to enable push-on interconnection, wherein physical access to the connector bodies is restricted and/or the interconnected portions are linked in a manner where precise alignment is difficult or not cost-effective (such as the connection between an antenna and a transceiver that are coupled together via a rail system or the like). To accommodate misalignment, a blind mate connector may be provided with lateral and/or longitudinal spring action to accommodate a limited degree of insertion misalignment. Blind mated connectors may be particularly suitable for use in "ganged" connector arrangements, in which multiple connectors (for example, four connectors) are attached to each other and are mated to mating connectors simultaneously.

Due to the limited space on devices such as antennas or radios and the increasing port count required therefor, there may be a need for an interface that increases the density of port spacing and decreases the labor and skill required to make many connections repeatedly.

SUMMARY

As a first aspect, embodiments of the invention are directed to a coaxial connector assembly. The assembly comprises: a first plurality of first coaxial connectors mounted within a shell, the shell defining a plurality of electrically isolated cavities, each of the first coaxial connectors being located in a respective cavity; a plurality of first coaxial cables, each of the coaxial cables attached to a respective one of the first coaxial connectors; a second coaxial connector mounted within the shell, the second coaxial connector being smaller that the first coaxial connectors; and a second coaxial cable attached to the second coaxial connector, the second coaxial cable being smaller than the first coaxial cables.

As a second aspect, embodiments of the invention are directed to a coaxial connector assembly comprising: four first coaxial connectors limited within a shell, the shell defining a plurality of electrically isolated cavities, each of the first coaxial connectors being located in a respective cavity; four first coaxial cables, each of the coaxial cables attached to a respective one of the first coaxial connectors; a second coaxial connector mounted within the shell, the second coaxial connector being smaller that the first coaxial connectors; a second coaxial cable attached to the second coaxial connector, the second coaxial cable being smaller than the first coaxial cables; and a plurality of first protective boots and a second protective boat, wherein each of the first protective boots is associated with a respective one of the first coaxial cables and the second protective boot is associated with the second coaxial cable. The four first coaxial connectors and the second coaxial connector are disposed in a cruciform arrangement, and the second coaxial connector is positioned at an intersection of the cruciform arrangement.

As a third aspect, embodiments of the invention are directed to a coaxial connector assembly comprising: a first plurality of first coaxial connectors mounted within a shell, the shell defining a plurality of electrically isolated cavities, each of the first coaxial connectors being located in a respective cavity; and a plurality of first coaxial cables, each of the coaxial cables attached to a respective one of the first coaxial connectors. The shell includes an orientation protrusion on a forward-facing surface configured to mate with a receiving recess on a mating coaxial connector assembly.

As a fourth aspect, embodiments of the invention are directed to a coaxial connector assembly comprising: a first plurality of first coaxial connectors mounted within a shell, the shell defining a plurality of electrically isolated cavities, each of the first coaxial connectors being located in a respective cavity; a plurality of first coaxial cables, each of the coaxial cables attached to a respective one of the first coaxial connectors; and a toggle assembly having a latch pivotally connected with the shell, wherein the latch is configured to engages a pin on a mating coaxial connector assembly to secure the mated assembly in position. The toggle assembly includes an L-shaped handle that is fixed relative to the latch, and wherein the handle includes a slot positioned and configured to receive a tool to facilitate securing and/or unsecuring of the latch.

DETAILED DESCRIPTION

Figure 1:
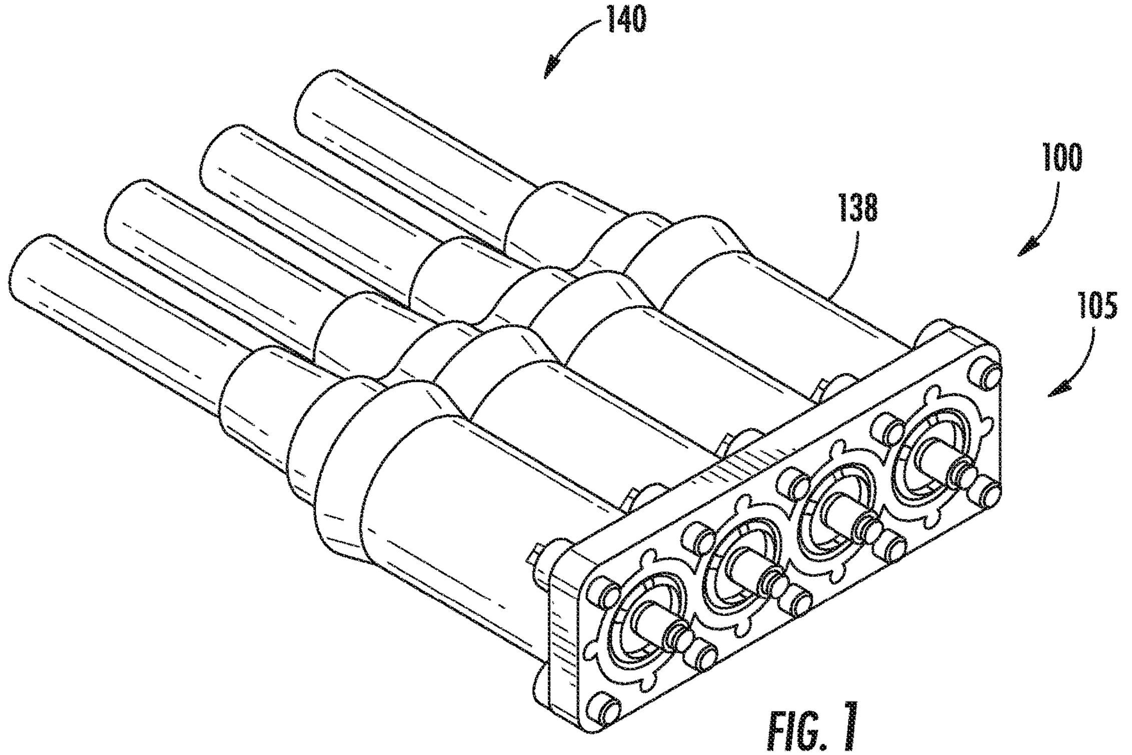
FIG. 1 is a rear perspective view of an assembly of mated ganged coaxial connectors according to embodiments of the invention.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the drawings, an assembly of mated ganged connectors, designated broadly at 100, is shown in FIG. 1-15. The assembly 100 includes a ganged equipment connector assembly 105 that includes four coaxial equipment connectors 110, and a ganged cable connector assembly 140 that includes four coaxial cable connectors 150. These components are described in greater detail below.

Figure 3:
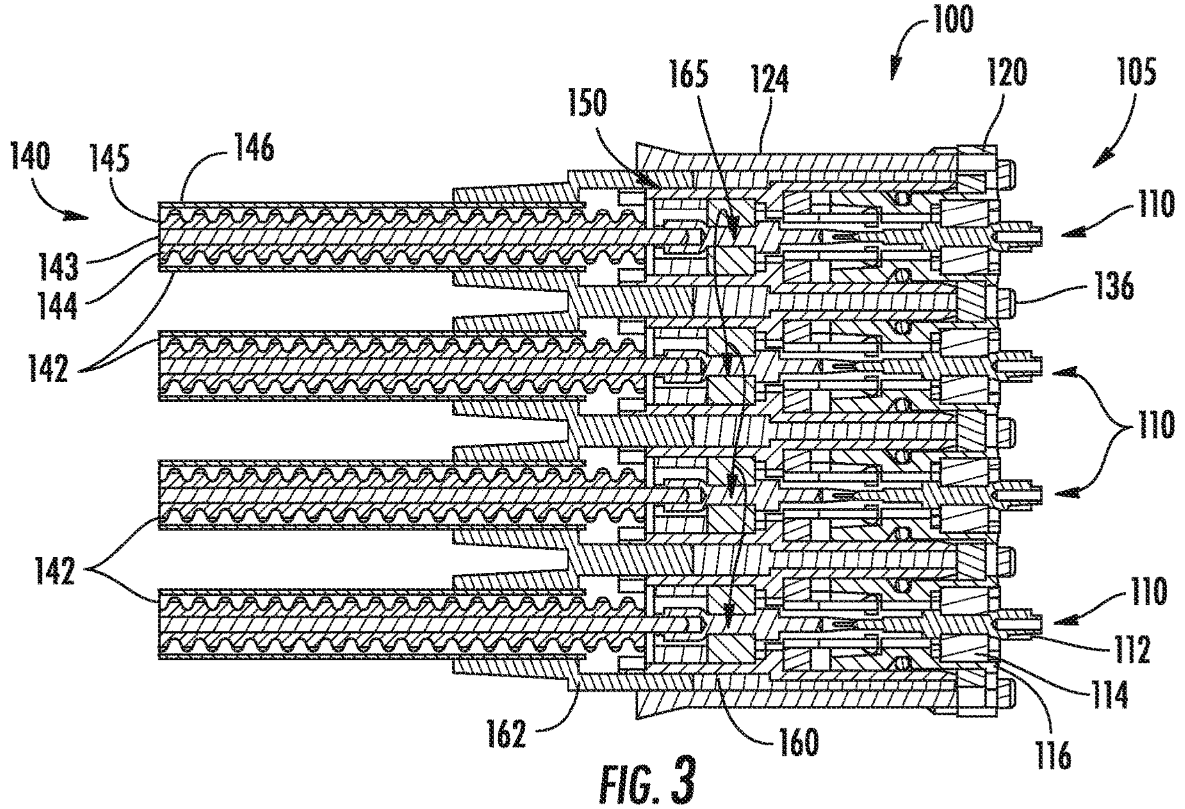
FIG. 3 is a top section view of the mated assembly of FIG. 1.
Figure 4:
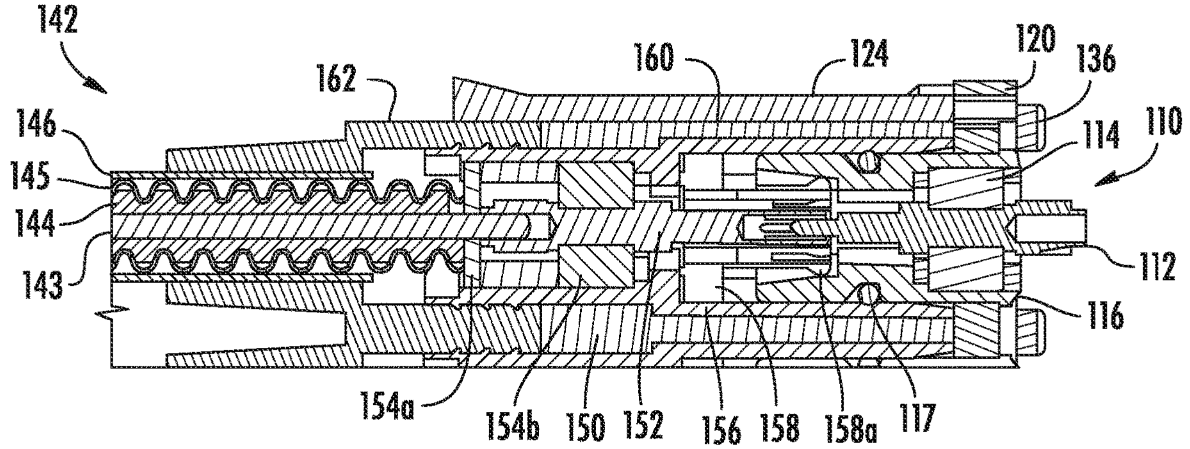
FIG. 4 is an enlarged section view of the mated assembly of FIG. 1 showing one mated pair of connectors.

Referring now to FIGS. 3 and 4, each of the equipment connectors 110 includes an inner contact 112, a dielectric spacer 114 that circumferentially surrounds a portion of the inner contact 112, and an outer conductor body 116 that circumferentially surrounds the dielectric spacer 114 and is electrically isolated from the inner contact 112. An O-ring 117 is mounted in a groove in an intermediate section of the outer conductor body 116.

Figure 7:
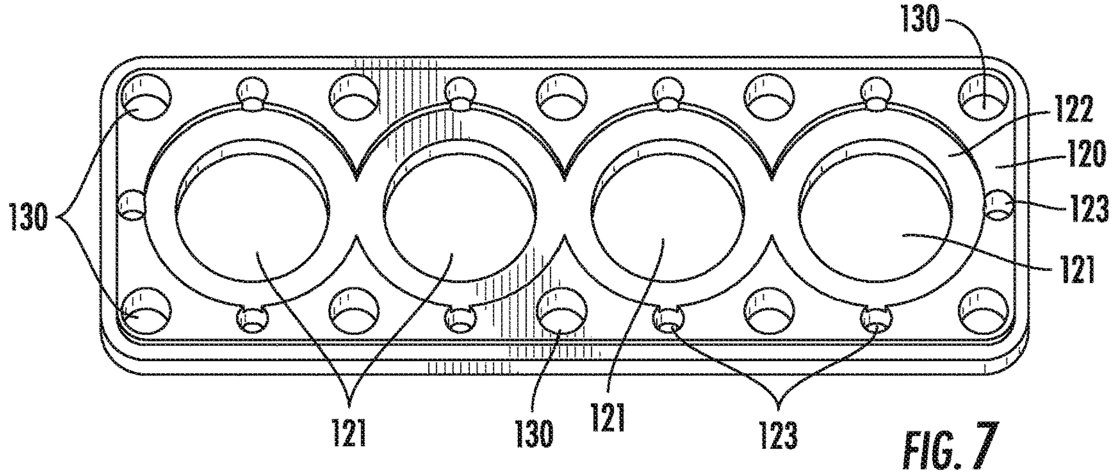
FIG. 7 is a rear perspective view of the mounting plate of the ganged equipment connector assembly of FIG. 5.

A flat plate 120 provides a common mounting structure for the equipment connectors 110. As can be seen in FIG. 7, the plate 120 includes four aligned holes 121, each of which is encircled by a recess 122 on its rear side. The recesses 122 are contiguous with each other. Each recess 122 has two or three pockets 123 extending radially outwardly therefrom that also extend through the thickness of the plate 120. Also, ten holes 130 are arranged near the perimeter of the plate 120.

Figure 2:
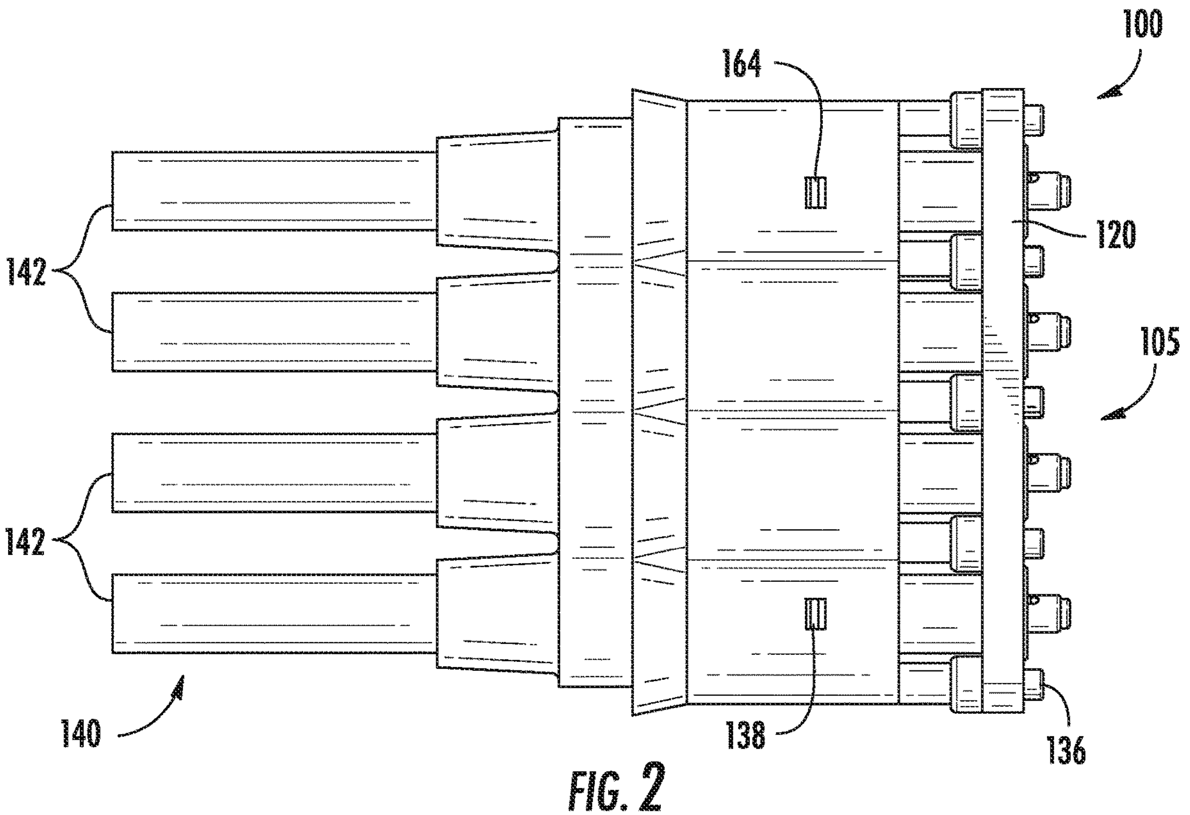
FIG. 2 is a top view of the mated assembly of FIG. 1.
Figure 5:
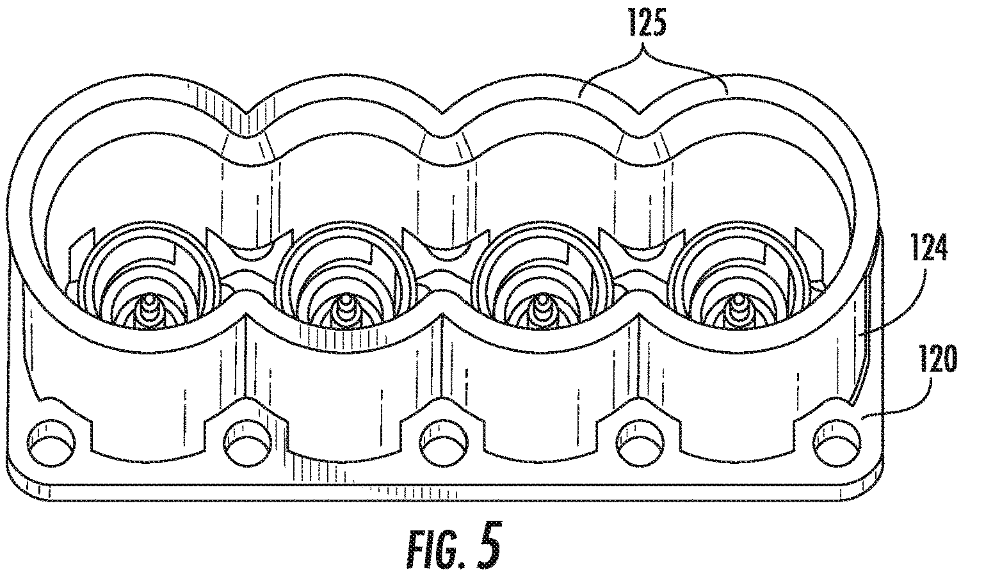
FIG. 5 is a front perspective view of a ganged equipment connector assembly of the assembly of FIG. 1.
Figure 6:
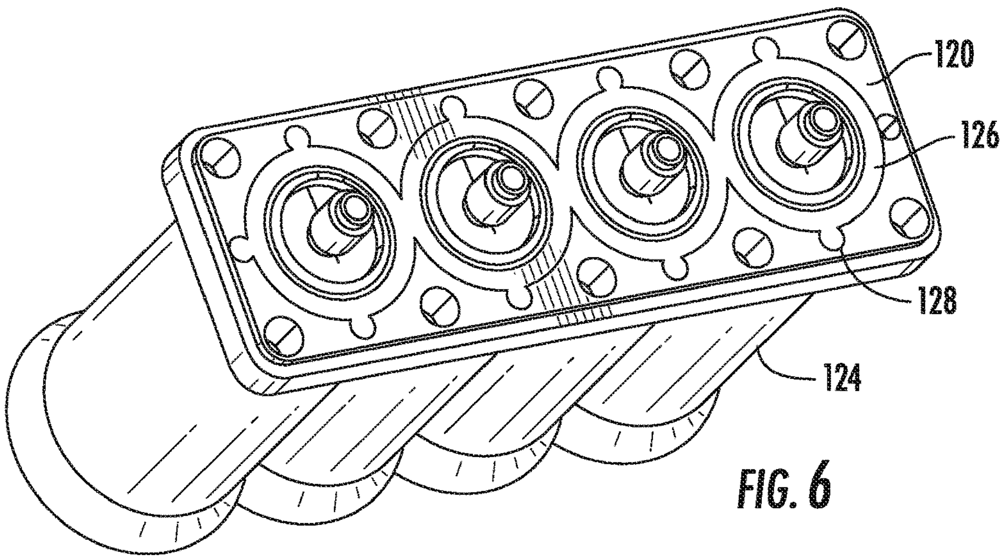
FIG. 6 is a rear perspective view of the ganged equipment connector assembly of FIG. 5.
Figure 8:
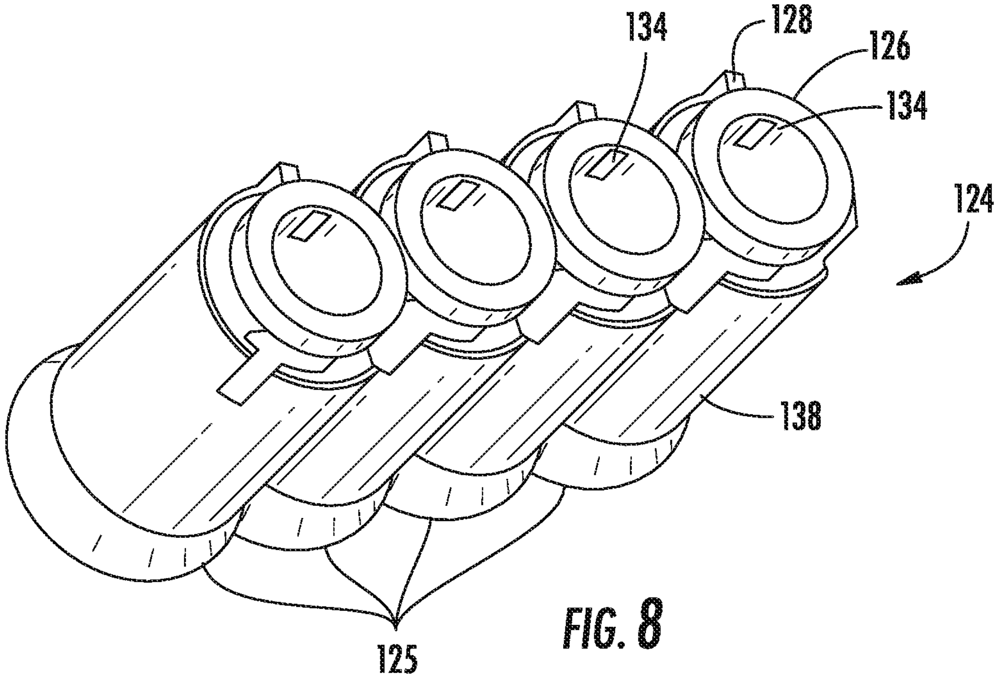
FIG. 8 is a rear perspective view of the outer shell of the ganged equipment connector assembly of FIG. 5.

Referring now to FIGS. 3-5, a shell 124 is mounted to the plate 120 and extends forwardly therefrom. The shell 124, typically formed of a polymeric material, is generally scalloped in profile, with each "scallop" 125 partially surrounding one of the holes 121. The shell 124 is held in place by posts 128 that extend radially outwardly from the rear edges of the scallops 125 and terminate at rings 126 (see FIG. 8); the rings 126 are received in the recesses 122 of the plate 120, and the posts 128 are received in the pockets 123. Barbs 116*a* on the outer conductor body 116 assist in holding the shell 120 in place. As can be seen in FIGS. 1, 2 and 8, the two endmost scallops 125 include latch openings 138.

Figure 9A:
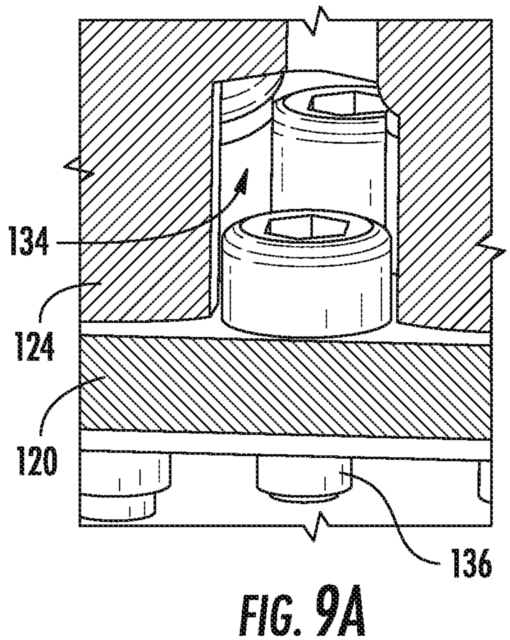
FIGS. 9A and 9B are greatly enlarged partial perspective views of an exemplary mounting screw and its corresponding hole in the mounting plate of the ganged equipment connector assembly of FIG. 5.
Figure 9B:
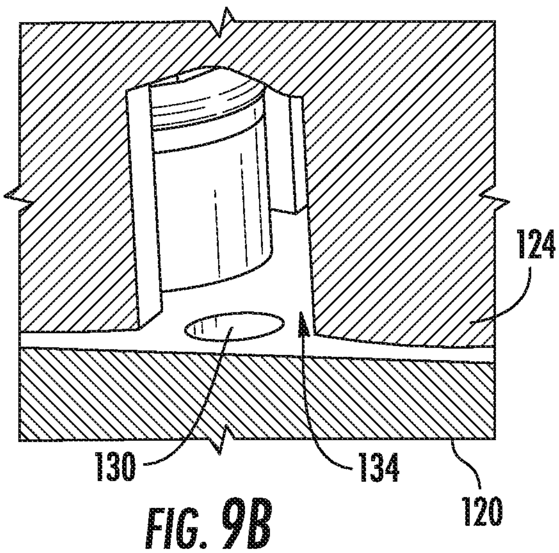
Figure 10:
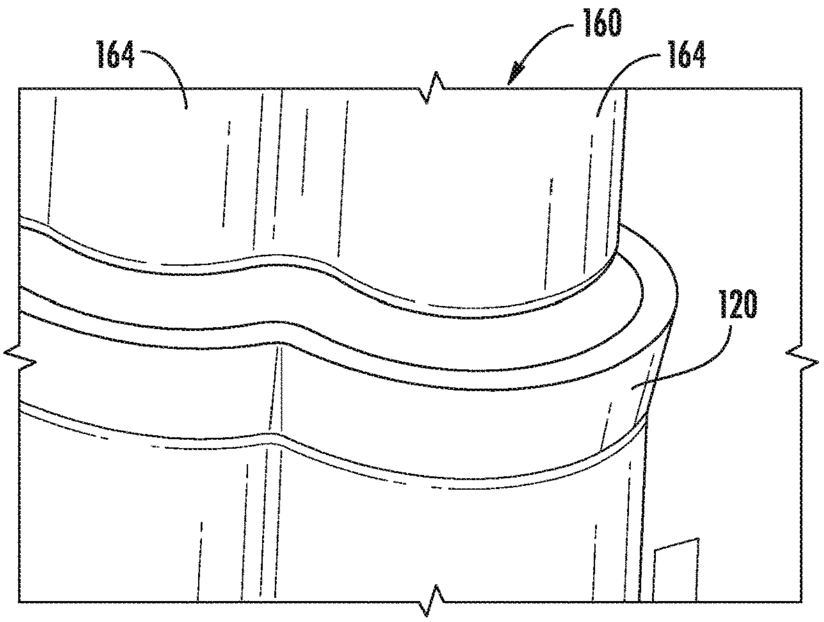
FIG. 10 is a perspective view of a ganged cable connector assembly of the assembly of FIG. 1 being inserted into the shell of the ganged equipment connectors of FIG. 5.
Figure 11:
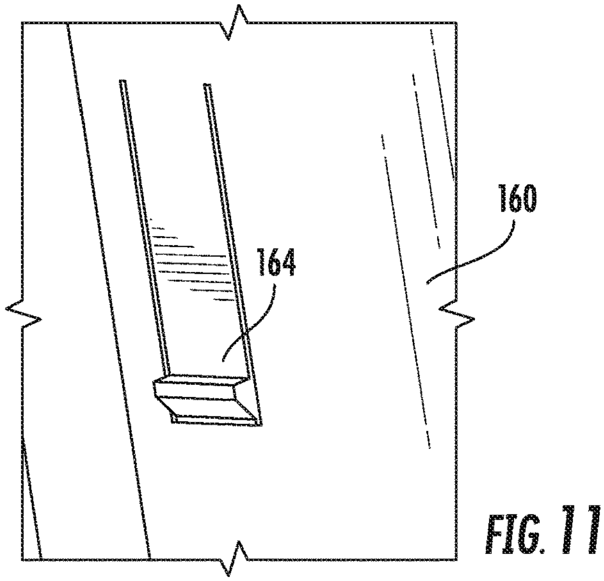
FIG. 11 is a greatly enlarged perspective view of a latch on the housing of the ganged cable connector assembly of FIG. 10.
Figure 12:
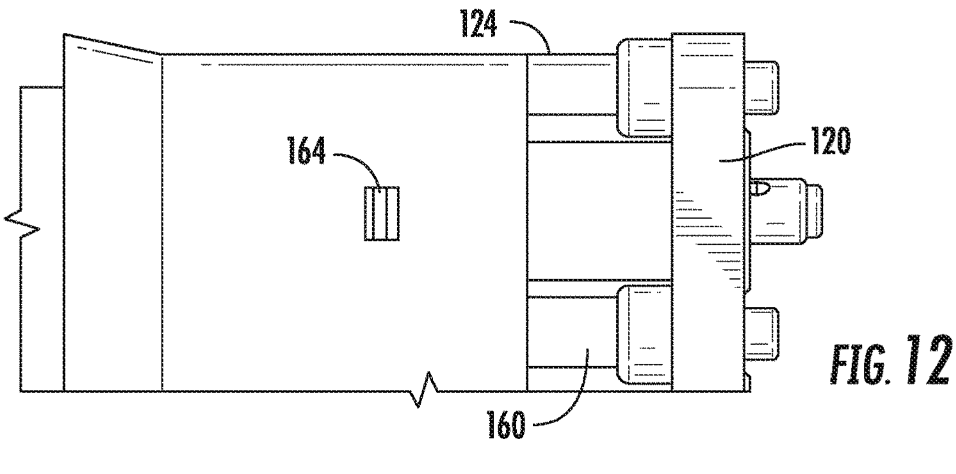
FIG. 12 is a greatly enlarged top view of the latch of FIG. 11 inserted into a slot on the shell of FIG. 8.

As seen in FIGS. 8, 9A and 9B, ten access openings 134 are located at the rear edges of the scallops 125, each being aligned with a corresponding hole 130. Screws 136 are inserted through the holes 130 (with access provided by the access openings 134) to mount the plate 120 to electronic equipment, such as a remote radio head. The positions of the access openings 134 and the holes 130 makes it possible to securely mount the plate 120 (and in turn the equipment connector assembly 110) to electronic equipment in a relatively small space.

The shell 124 may be formed via injection molding, and in particular may be injection molded with the mounting plate as an insert, such that the rings 126 and posts 128 are integrally formed in place during the molding process.

Referring now to FIGS. 3 and 4, the cable connector assembly 140 includes four cables 142, each of which has an inner conductor 143, a dielectric layer 144, an outer conductor 145 (in this case, the outer conductor is corrugated, but it may be smooth, braided, etc.), and a jacket 146. Each of the cables 142 is connected with one of the connectors 150.

Each connector 150 includes an inner contact 152, dielectric insulators 154*a,* 154*b* and an outer conductor body 156. The inner contact 152 is electrically connected with the inner conductor 143 via a press-fit joint, and the outer conductor body 156 is electrically connected with the outer conductor 145 via a solder joint 148. A spring basket 158 with fingers 158*a* is positioned within the cavity of the outer conductor body 156.

Figure 13:
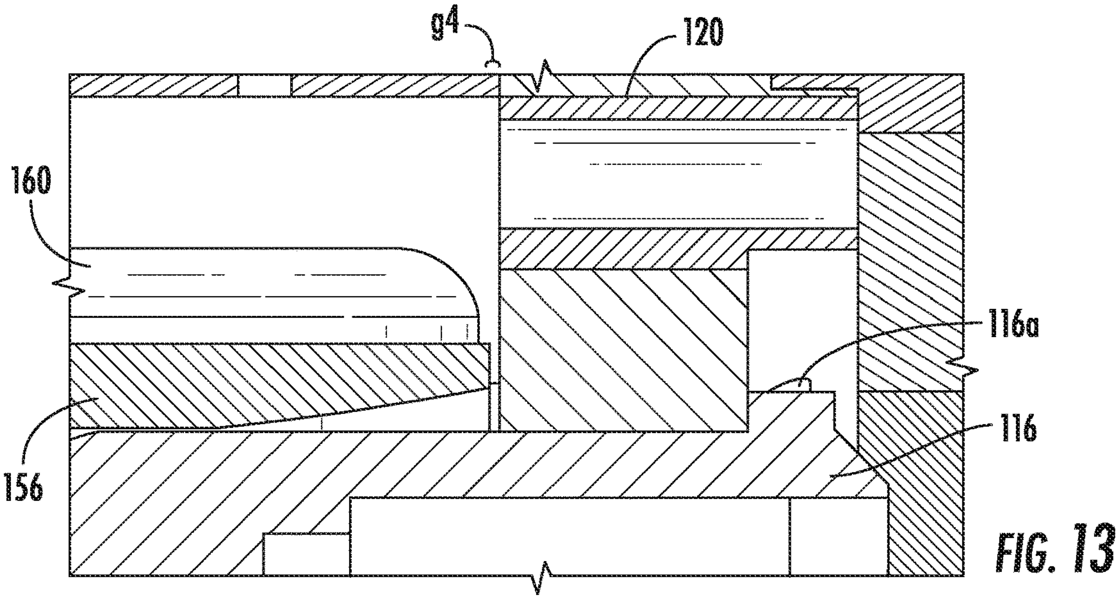
FIG. 13 is a greatly enlarged partial top section view of the housing and forward end of the outer conductor body of a cable connector of FIG. 10.
Figure 14:
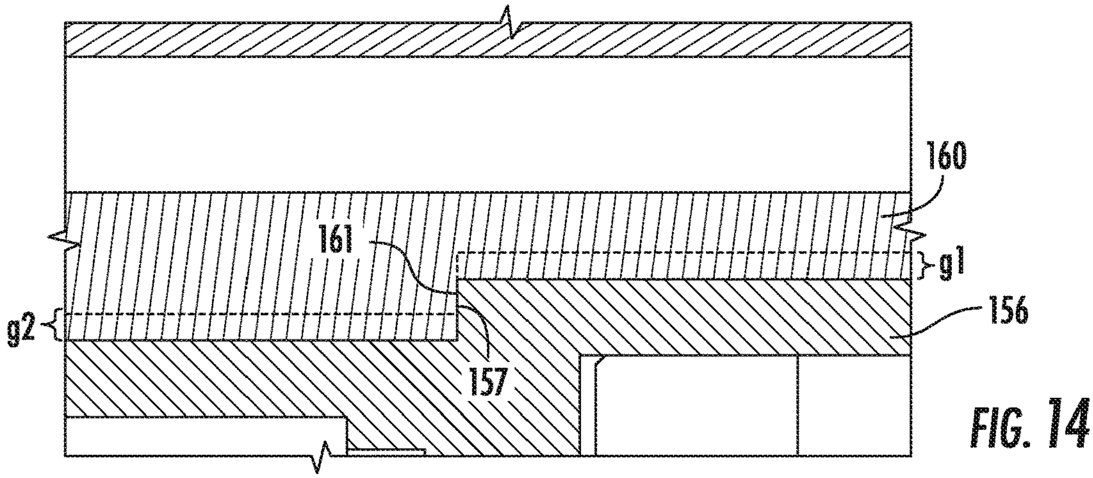
FIG. 14 is a greatly enlarged partial top section view of the housing and intermediate section end of the outer conductor body of a cable connector of FIG. 10.
Figure 15:
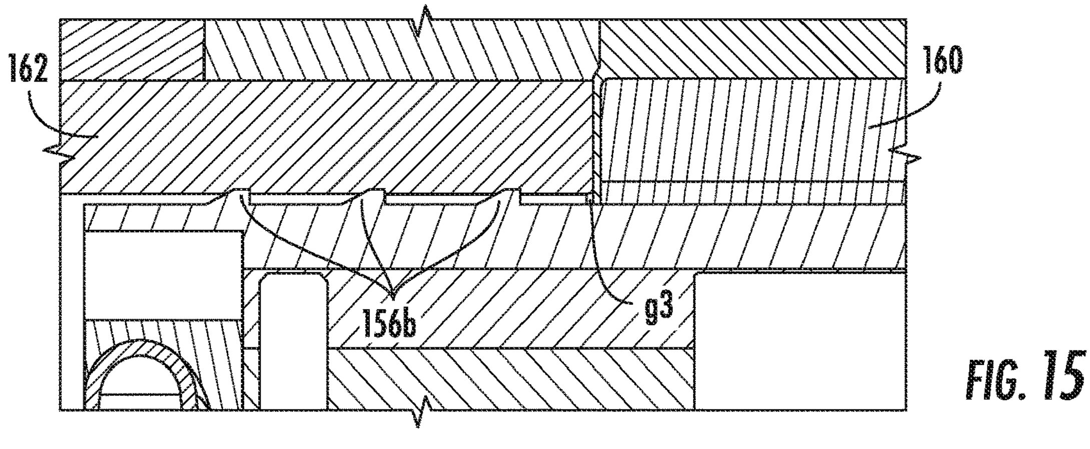
FIG. 15 is a greatly enlarged partial top section view of the housing and rear end of the outer conductor body of a cable connector of FIG. 10.
Figure 16:
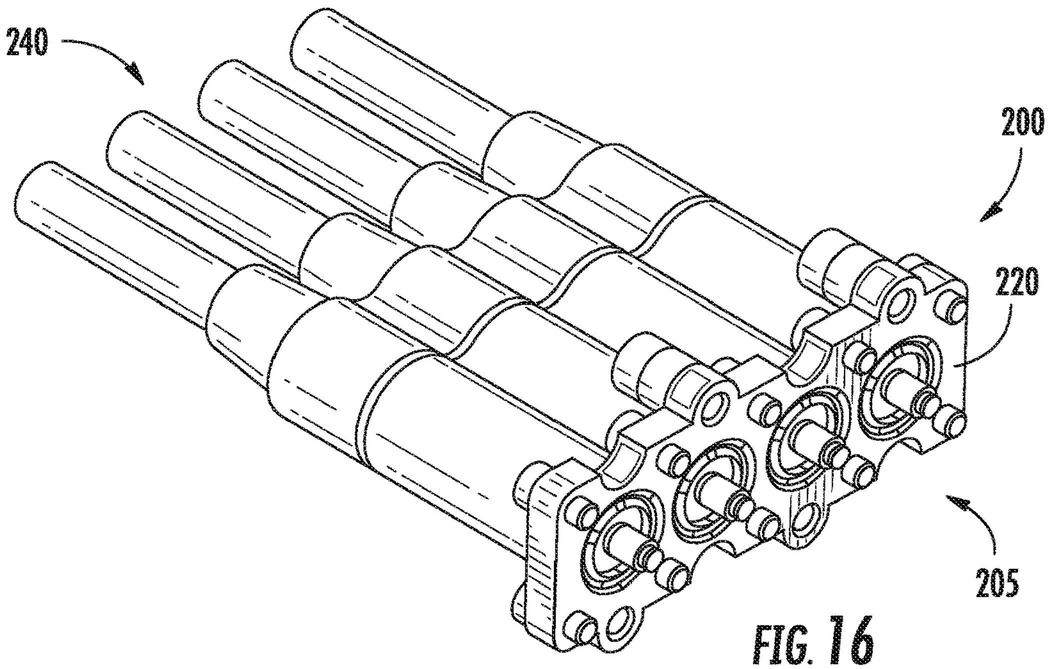
FIG. 16 is a rear perspective view of an assembly of mated ganged coaxial connectors according to additional embodiments of the invention.
Figure 17:
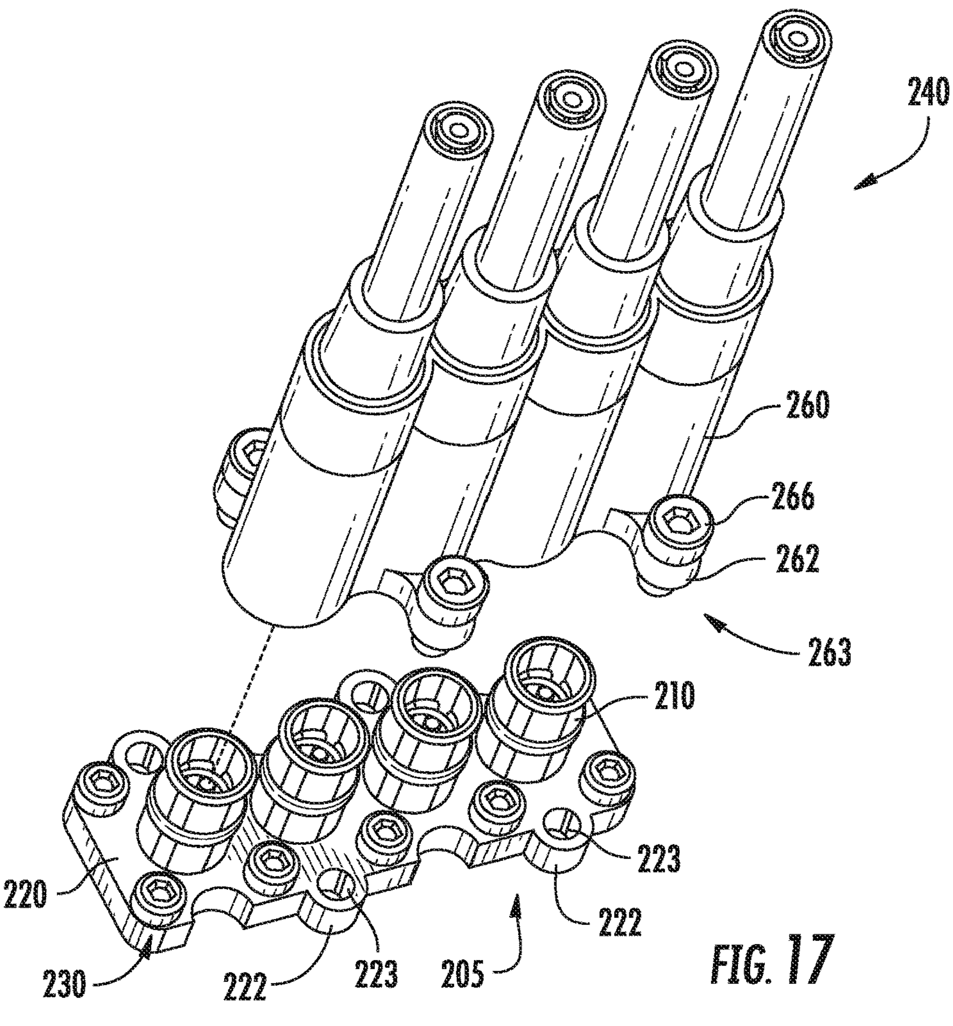
FIG. 17 is a front perspective view of the assembly of FIG. 16 with the ganged equipment connectors separated from the ganged cable connectors.
Figure 18:
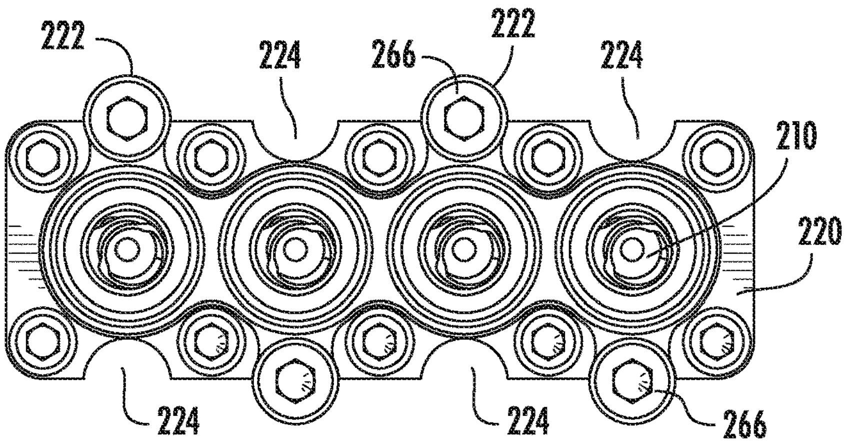
FIG. 18 is a front section view of the assembly of FIG. 16.
Figure 19:
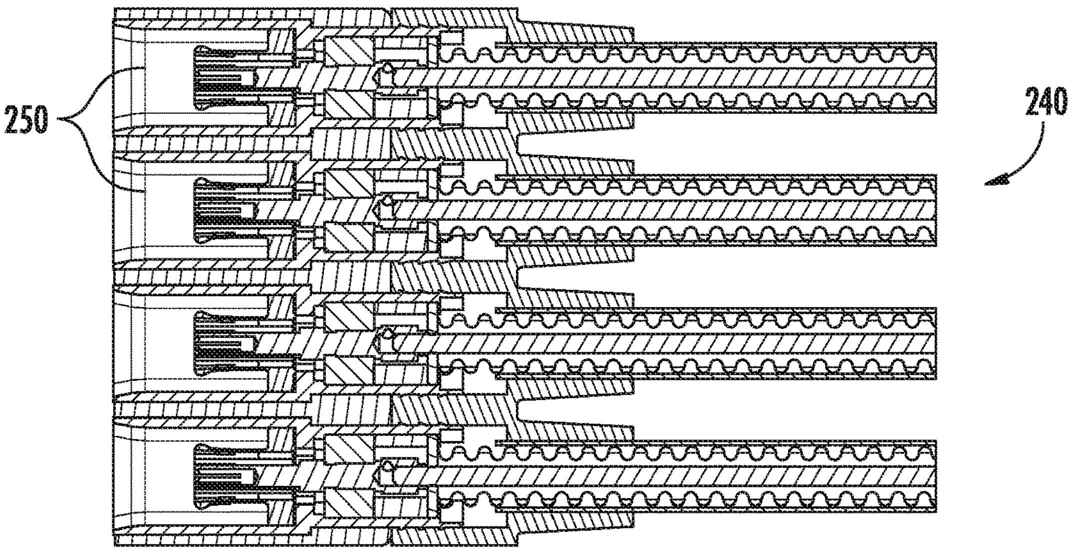
FIG. 19 is a top section view of the ganged cable connectors of the assembly of FIG. 16.
Figure 20:
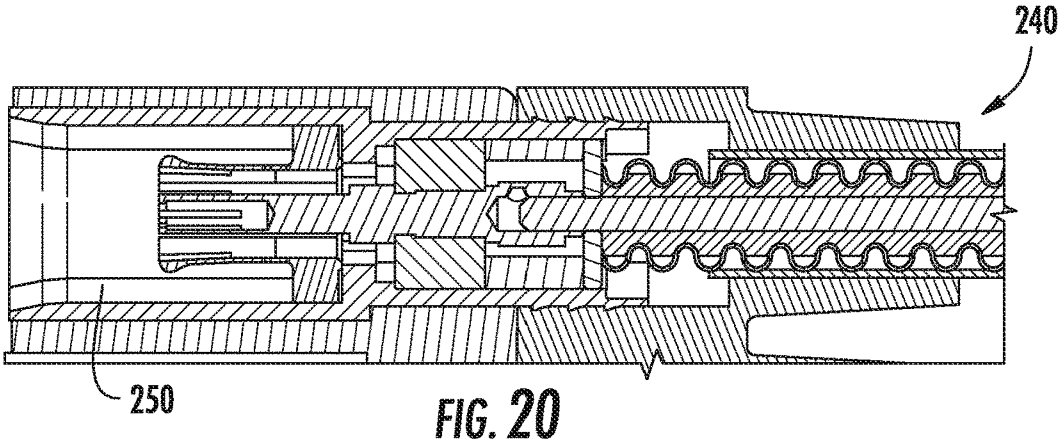
FIG. 20 is a top section view of one cable connector of FIG. 19.

A shell 160 circumferentially surrounds each of the outer conductor bodies 156 of the connectors 150, thereby electrically insulating them from each other within cavities 165. A shoulder 161 on the shell 160 is positioned to bear against a shoulder 157 on the outer conductor body 156 (see FIG. 14). A strain relief 162 overlies the interfaces of the cables 142 and connectors 150; barbs 156*b* on the outer conductor body 156 help to hold the strain relief 162 in place. As can be seen in FIGS. 4 and 13-15, the inner diameter of the shell 160 is slightly larger than the outer diameter of the outer conductor body 156, such that gaps g1, g2 are present. In addition, as shown in FIG. 13, the free end of the outer conductor body 156 extends slightly farther toward the mating connector 110 than the shell 160. FIG. 15 shows that a gap g3 is present between the shell 160 and the strain relief 162.

As shown in FIGS. 3 and 4, the connectors 110, 150 are mated by inserting the cable connector assembly 140 into the equipment connector assembly 105. More specifically, the shell 160 is inserted within the shell 120, with each of the cavities 165 residing within a respective scallop 125. This action aligns each connector 150 of the cable connector assembly 140 with a respective connector 110 of the equipment connector assembly 105. As is illustrated in FIGS. 3 and 4, the inner contacts 152 of the connectors 150 receive the inner contacts 112 of the connectors 110, and the free ends of the outer conductor bodies 116 are received in the gaps between outer conductor bodies 156 and the spring fingers 158*a* of the spring baskets 158. Notably, the spring fingers 158*a* exert radial pressure on the outer conductor body 116 and do not "bottom out" axially against the outer conductor body 116; this is characteristic of some connector interface configurations, such as the 4.3/10, 4.1/9.5, and 2.2/5 interfaces. The cable connector assembly 140 is maintained in place relative to the equipment connector assembly 140 via latches 164 in the shell 160 engaging the latch openings 138.

As seen in FIG. 13, the free end of the outer conductor body 156 does not reach the plate 120, thereby forming a gap g4 therebetween. The presence of the gaps g3, g4 enable the connectors 150 of the cable connector assembly 140 to shift axially relative to their corresponding mating connectors 110 in the event such shifting is required for mating (e.g., because of manufacturing tolerances and the like). In additional, the presence of the gaps g1, g2 between the outer conductor bodies 156 and the shell 160 enables the connectors 150 to shift radially relative to the connectors 110 in the event such shifting is required.

Also, as noted above, the shell 160 on the cable connector assembly 140 electrically insulates the connectors 150 from each other, which in turn electrically insulates the mated pairs of connectors 110, 150 from adjacent pairs. The configuration enables the mated connectors 110, 150 to be closely spaced (thereby saving space for the overall connector assembly 100) without sacrificing electrical performance.

The illustrated assembly 100 depicts connectors 110, 150 that satisfy the specifications of a "2.2/5" connector, and may be particularly suitable for such connectors, as they typically are small and are employed in tight spaces.

Referring now to FIGS. 16-21, another embodiment of an assembly of mated ganged connectors, designated broadly at 200, is illustrated therein. The assembly 200 is similar to the assembly 100 in that an equipment connector assembly 205 with four connectors 210 mates with a cable connector assembly 240 with four connectors 250. Differences in the assemblies 105, 205 and in the assemblies 140, 240 are set forth below.

The equipment connector assembly 205 has a plate 220 that has two recesses 224 in its top and bottom edges and two ears 222 with holes 223 that extend from the top and bottom edges, with each ear 222 being vertically aligned with a respective recess 224 on the opposite edge. The ears 222 and recesses 224 are positioned between adjacent holes 230 in the plate 220. The cable connector assembly 240 has a shell 260 with four ears 262 with holes 263 that align with ears 222 and holes 223. Screws 266 are inserted into the holes 263 and holes 223 to maintain the assemblies 205, 240 in a mated condition.

Figure 21:
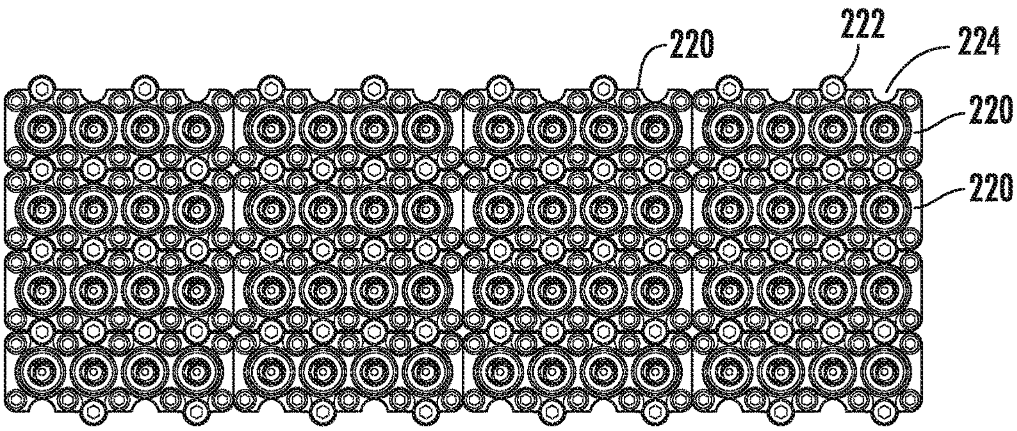
FIG. 21 is a schematic representation of sixteen assemblies of FIG. 16, illustrating how adjacent assemblies can be intermeshed.
Figure 22:
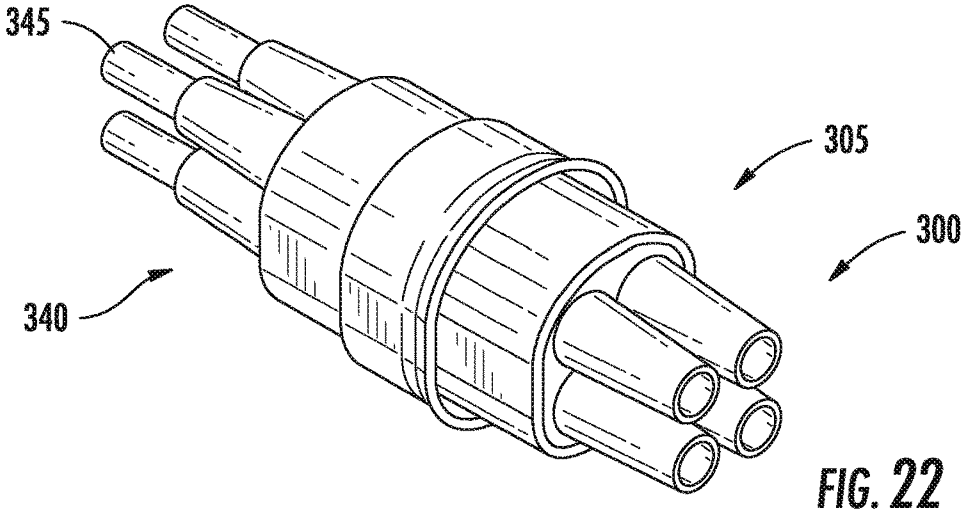
FIG. 22 is a perspective view of another assembly of mated ganged connectors according to embodiments of the invention.
Figure 23:
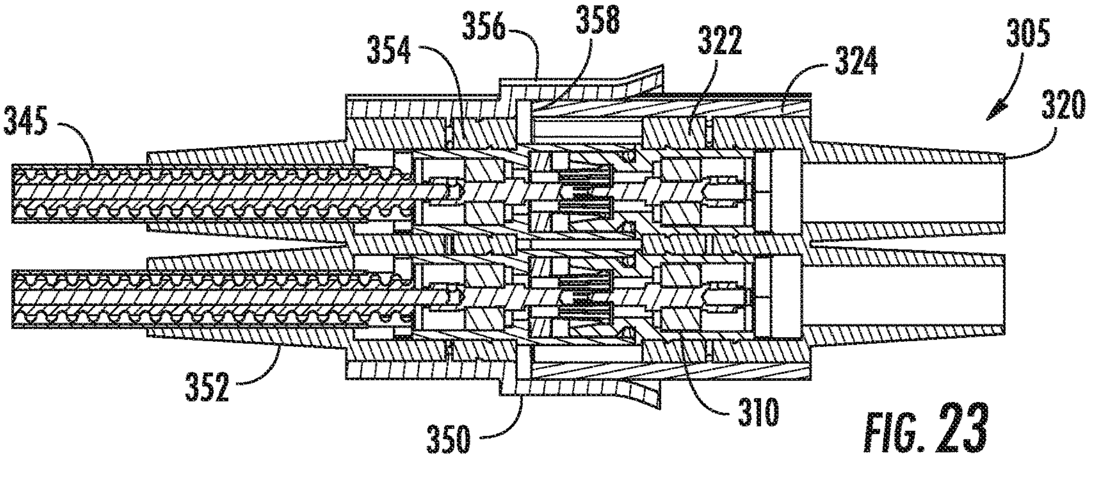
FIG. 23 is a top section view of the mated assembly of FIG. 22.

As can be seen in FIG. 21, the plates 220 are configured to nest with adjacent plates 220. FIG. 21 schematically illustrates sixteen assemblies 200 arranged in a 4×4 array, wherein the ears 222 of one plate 220 are received in the recesses 224 of an adjacent plate 220. This arrangement enables adjacent assemblies 200 to be tightly packed, which can save space.

Figure 24:
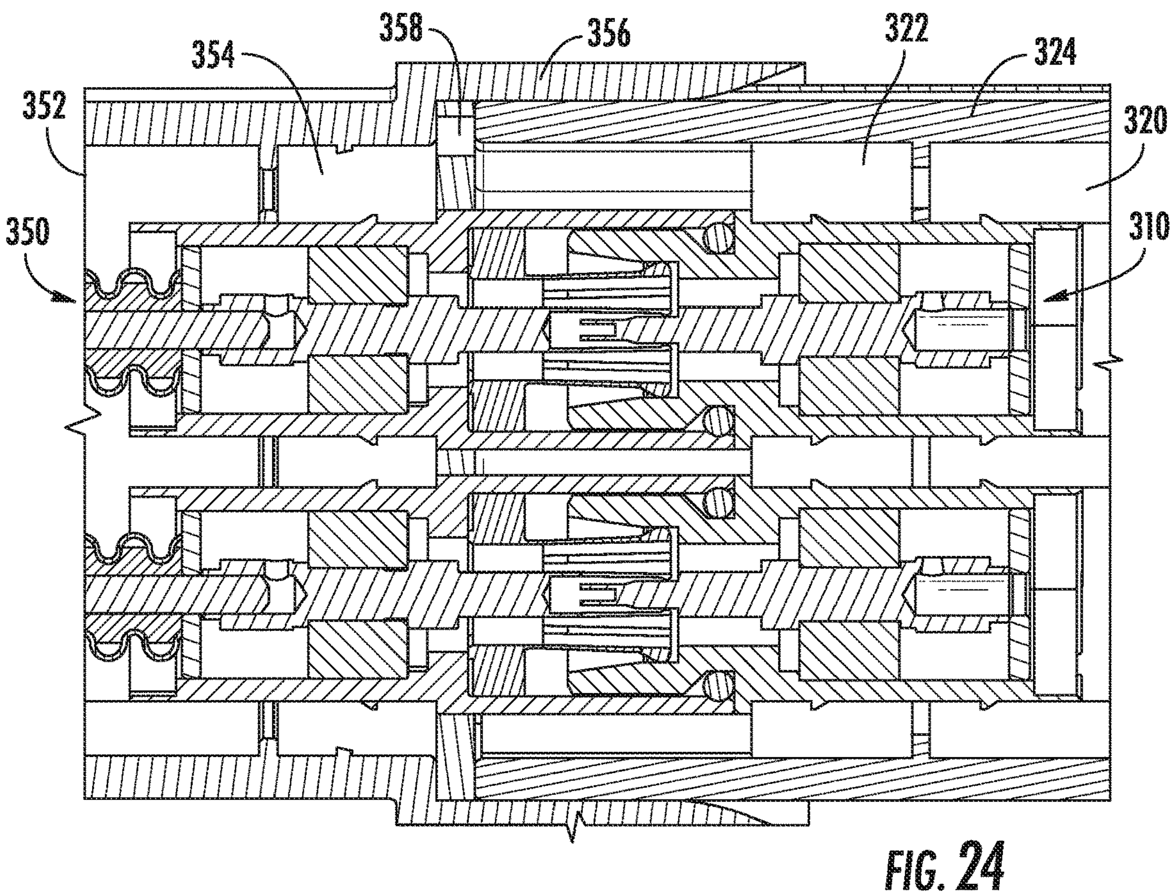
FIG. 24 is an enlarged partial top section view of the mated connectors of FIG. 22.

Referring now to FIGS. 22-25, an assembly 300 is shown therein. The assembly 300 includes a first cable connector assembly 305 and a second cable connector assembly 340. The connectors 310 of the first cable connector assembly 305 are similar to the connectors 110 described above, and the connectors 350 of the second cable connector assembly 340 are similar to the connectors 150 described above. However, the connectors 310 are arranged in a square 2×2 pattern, as are the connectors 350. The connectors 310 are held in place via a strain relief 320, a spacer 322 and a housing 324. Similarly, the connectors 350 and cables 345 are held in place with a strain relief 352, a spacer 354 and a housing 356 having a panel 358. The strain reliefs 320, 352 and the spacers 322, 354 enable the connectors 310, 350 to "float" relative to each other to facilitate interconnection. As shown in FIG. 24, when the assembly 300 is fully mated, the free end of the housing 324 of the first cable connector assembly 305 contacts the panel 358 of the housing of the second cable connector assembly 340 to provide an axial stop that prevents the fingers 358*a* of the spring basket 358 of the connectors 350 from "bottoming out" against the outer conductor body 316 of the connectors 310.

Figure 25:
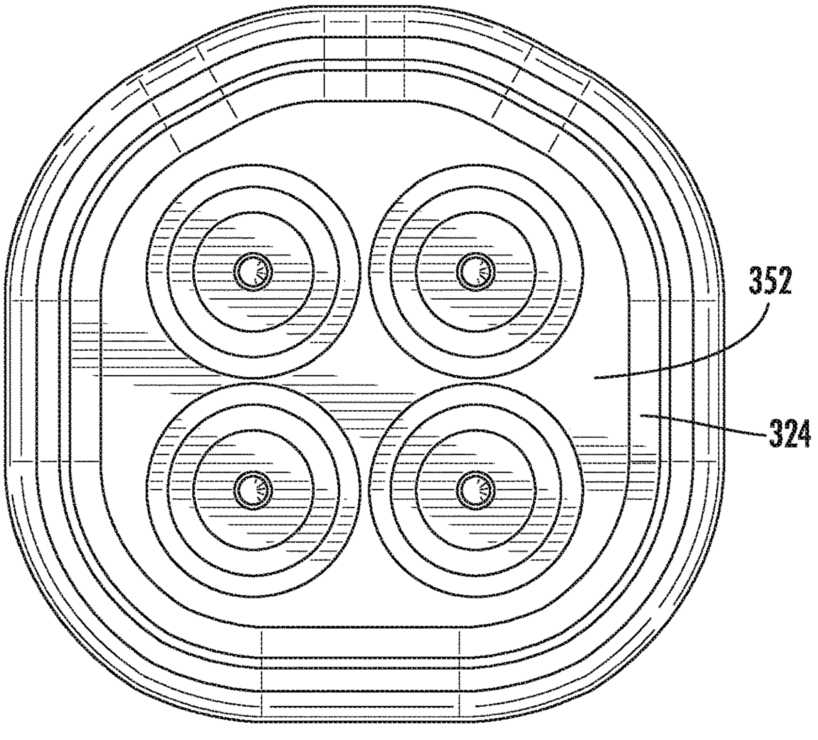
FIG. 25 is a front section view of the mated connectors of FIG. 22.

As can be seen in FIG. 25, in some embodiments, the housings 324, 352 of the connector assemblies 305, 340 include upper portions that are rounded slightly (as compared to the lower portions, which are generally straight). This difference serves as an orientation feature to ensure that the assemblies 305, 340 are properly oriented relative to each other for mating, which further ensures that the connectors 310, 350 are each aligned to mate with the correct mating connector.

Figure 26:
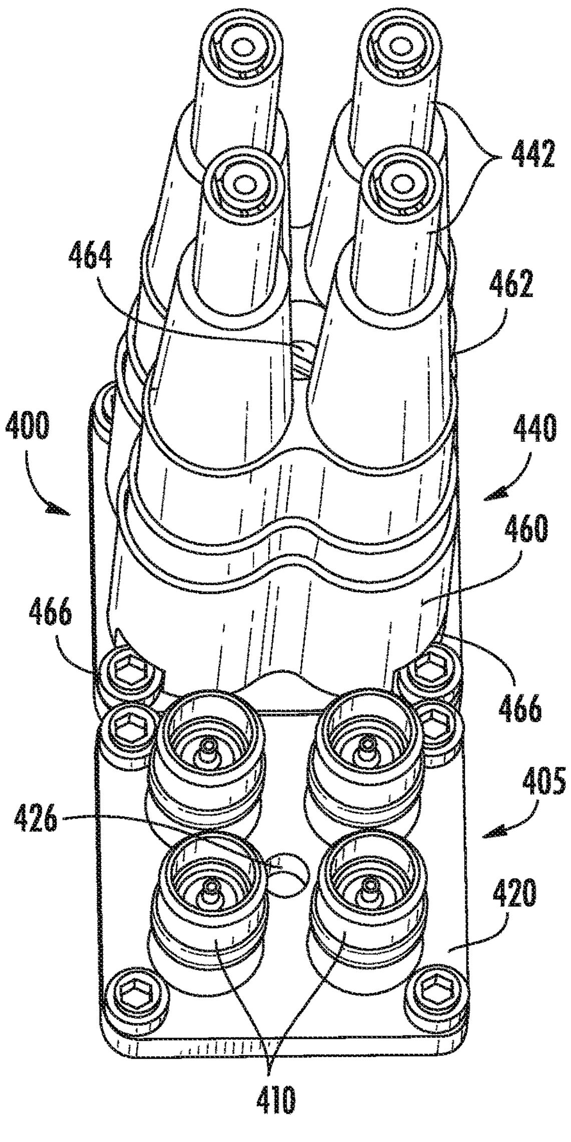
FIG. 26 is a perspective view of an assembly of mated ganged assembly connectors according to embodiments of the invention with an unmated equipment connector assembly.

Referring now to FIGS. 26-29, additional embodiments of ganged connectors are shown therein. FIG. 26 shows an assembly 400 of an equipment connector assembly 405 of four connectors 410 mounted in a 2×2 array on a mounting plate 420 and a cable connector assembly 440 of four connectors (not visible in FIG. 26) and four cables 442. The connectors 410 are similar to the connectors 110 discussed above, and the connectors of the cable connector assembly 440 are similar to the connectors 140 discussed above. A strain relief 462 surrounds and isolates the connectors of the cable connector assembly 440; a shell 460 extends forwardly of the strain relief 462. A mounting hole 464 is located at the center of the strain relief 462 and shell 460. The shell 460 also includes access openings 466 in its free edge that are positioned to receive screws for the mounting plate 420.

As shown in FIG. 26, the cable connector assembly 440 mates with the equipment connector assembly 405, with a connector of the cable connector 440 mating with a corresponding connector 410. The assemblies 405, 440 are maintained in a mated condition by a screw or other fastener inserted through the mounting hole 464 and into a mounting hole 426 on the mounting plate 420. The shell 460 abuts the surface of the mounting plate 420.

It should be noted that, when formed of a resilient polymeric or elastomeric material such as TPE, the shell 460 may provide additional strain relief, as well as serving to help to "center" the individual connectors of the cable connector assembly 440. The resilience of the material biases the individual connectors toward their "centered" position to more easily align with their respective mating connectors 405. This effect can also help to center the entire cable connector assembly 440, as the centering of two of the connectors of the cable connector assembly 440 can help to center the whole assembly 440. In addition, the shell 460 can also allow the individual connectors to pivot and otherwise shift as needed for alignment.

Figure 27:
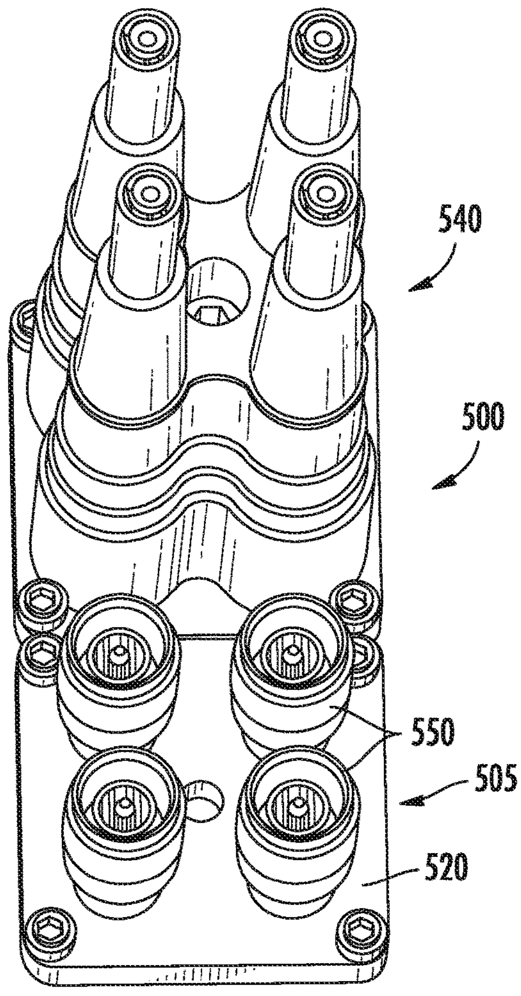
FIG. 27 is a perspective view of an assembly of mated ganged assembly connectors according to additional embodiments of the invention with an unmated equipment connector assembly.
Figure 28:
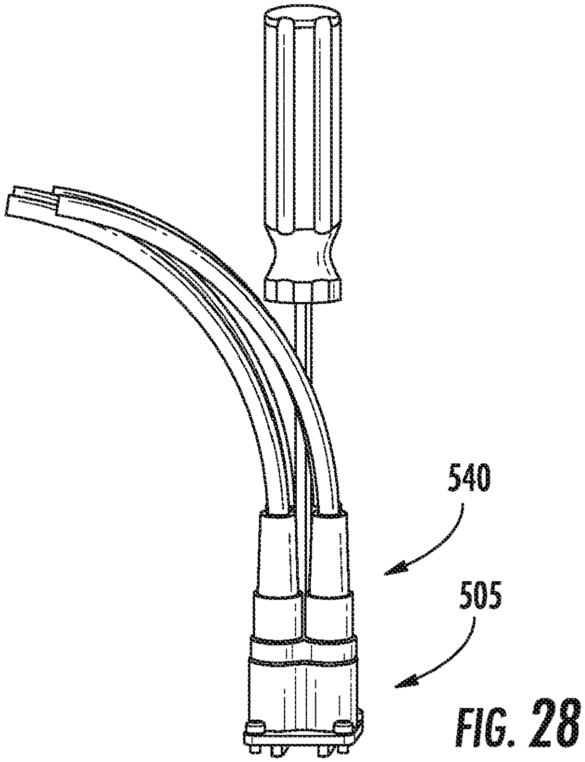
FIG. 28 is a perspective view of the assembly of FIG. 27 showing how the mated assembly can be secured with a screwdriver.
Figure 38:
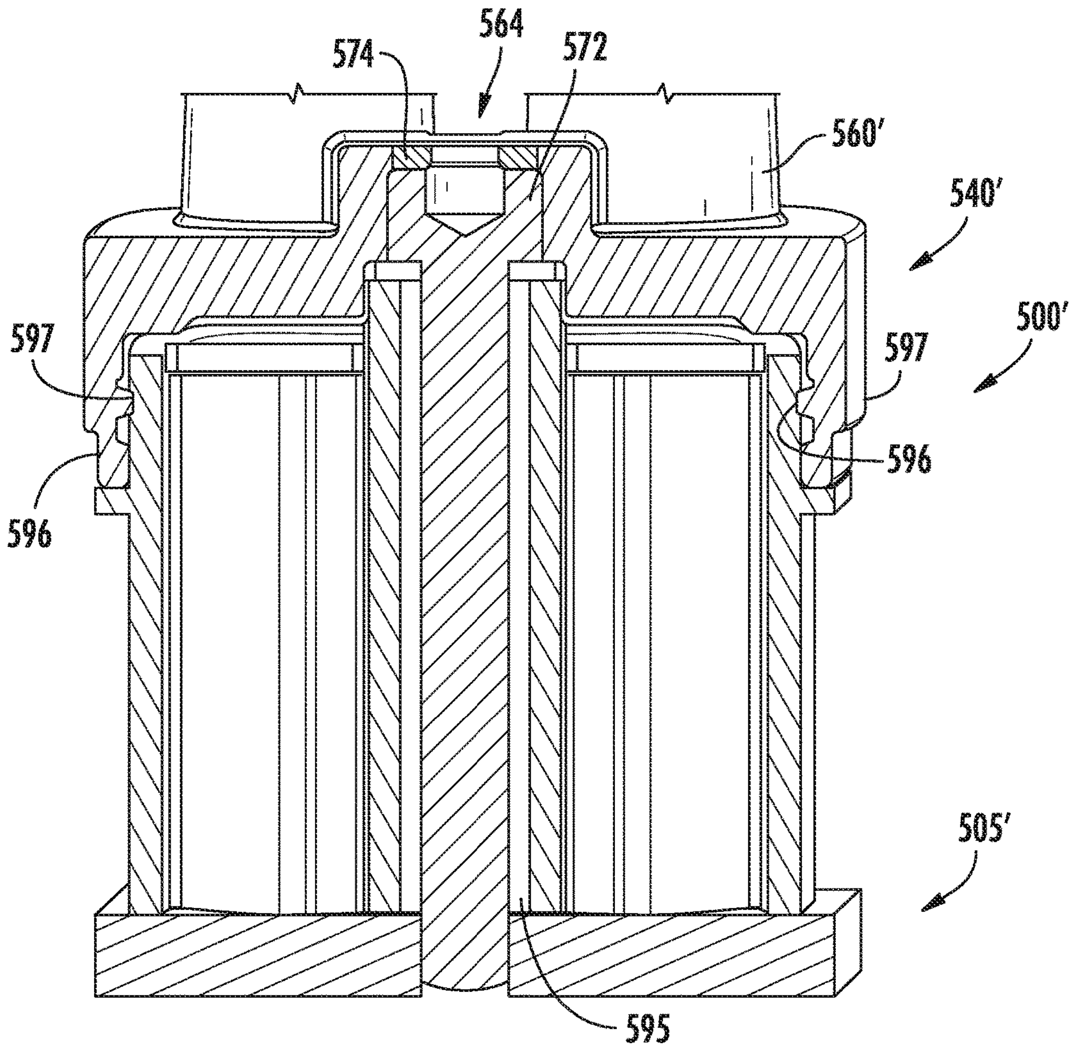
FIG. 38 is a section view of an assembly of mated ganged connectors according to embodiments of the invention showing how the fastening screw is captured by a flap in the housing of the cable connector assembly.

Referring now to FIG. 27, another embodiment of an assembly 500 is shown therein. The assembly 500 is similar to the assembly 400 with the exception that the equipment assembly 505 includes connectors 550 mounted to the mounting plate 520 that are similar to the connectors 440, and the cable connector assembly 540 includes connectors that are similar to the connectors 410. As a result, the mounting plate 520 can be formed slightly smaller than the mounting plate 420, thereby saving space on the equipment. FIG. 28 shows how the assemblies 505, 540 can be secured with a screwdriver employed to drive a fastening screw through holes located in the center of the mounting plate 520 and the cable connector assembly 540. FIG. 38 shows an alternative configuration 500' in which a fastening screw 572 is used to connect the equipment assembly 505' to the cable connector assembly 540'. The fastening screw 572 is maintained in position by a flap 574 that encircles the mounting hole 564. The head of the fastening screw 572 is larger than the mounting hole 564, so once the head of the fastening screw 572 passes through the mounting. hole 564 (the material of the shell 560' being sufficiently resilient to stretch to enable the head of the screw 572 to pass therethrough), the flap 574 captivates the screw 572 in place. As an alternative, the head of the screw 572 may be captured within the mounting hole 564 itself via an interference fit.

Figure 29:
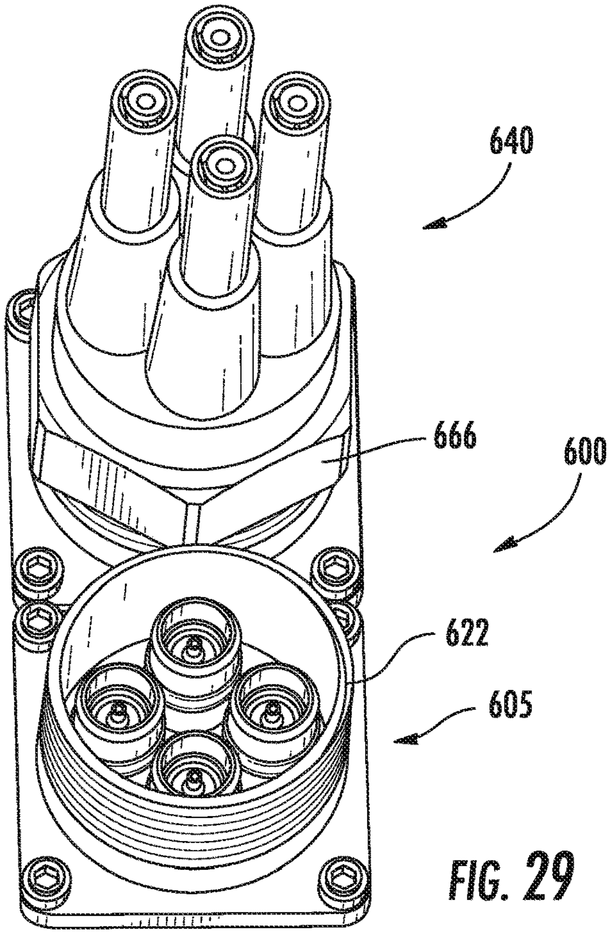
FIG. 29 is a perspective view of an assembly of mated ganged assembly connectors according to further embodiments of the invention with an unmated equipment connector assembly.

Referring now to FIG. 29, an assembly 600 comprising an equipment connector assembly 605 and a cable connector assembly 640 is shown therein. This embodiment utilizes a coupling nut 666 that attaches to a threaded ring 622 on the mounting plate 620 to secure the assemblies 605, 640 in a mated condition.

Figure 30:
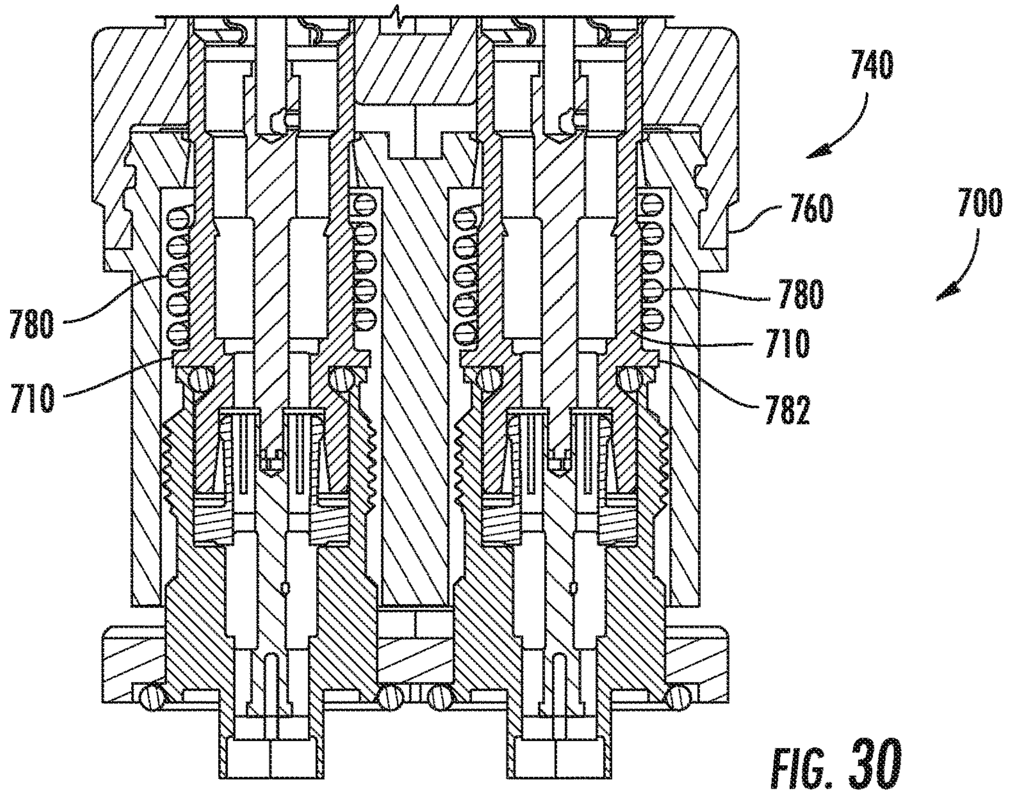
FIG. 30 is a section view of another assembly of mated ganged assembly connectors according to embodiments of the invention, wherein springs employed to provide axial float to the connectors of the cable connector assembly are shown in a relaxed position.
Figure 31:
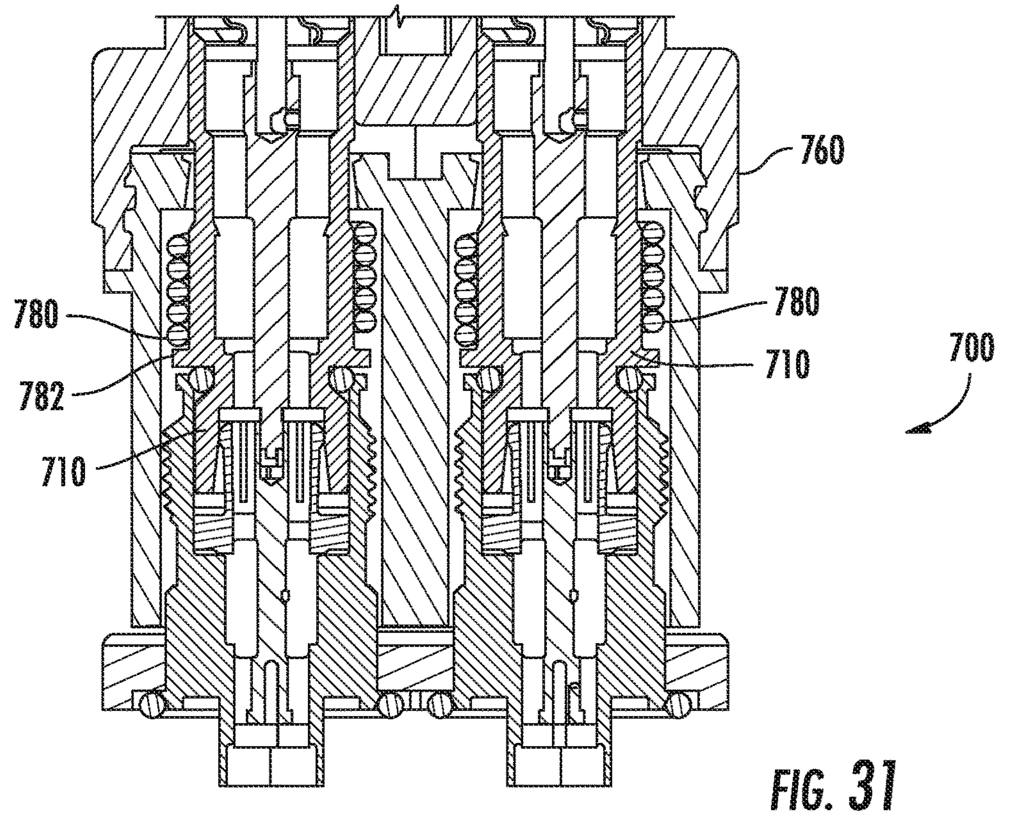
FIG. 31 is a section view of the assembly of FIG. 30, wherein the springs are shown in a compressed position.

Referring now to FIGS. 30 and 31, another embodiment of an assembly, designated broadly at 700, is shown therein. The assembly 700 is similar to the assembly 500 discussed above, with one exception being that the connectors 710 mounted in the cable connector assembly 740 include helical springs 780 that encircle each connector 750. The springs 780 extend between the inner surface of the shell 760 and a projection 782 on the outer conductor body 716. The springs 780 enable the connectors 710 to float axially relative to the shell 760.

As potential alternatives, the spring 780 may be replaced with a Belleville washer, which may be a separate component, or may be insert-molded into the shell 760 (in which case the washer may include a spiked or spoked perimeter for improved mechanical integrity at the joint). The spring 780 may also be replaced with an elastomeric spacer or the like.

Figure 32A:
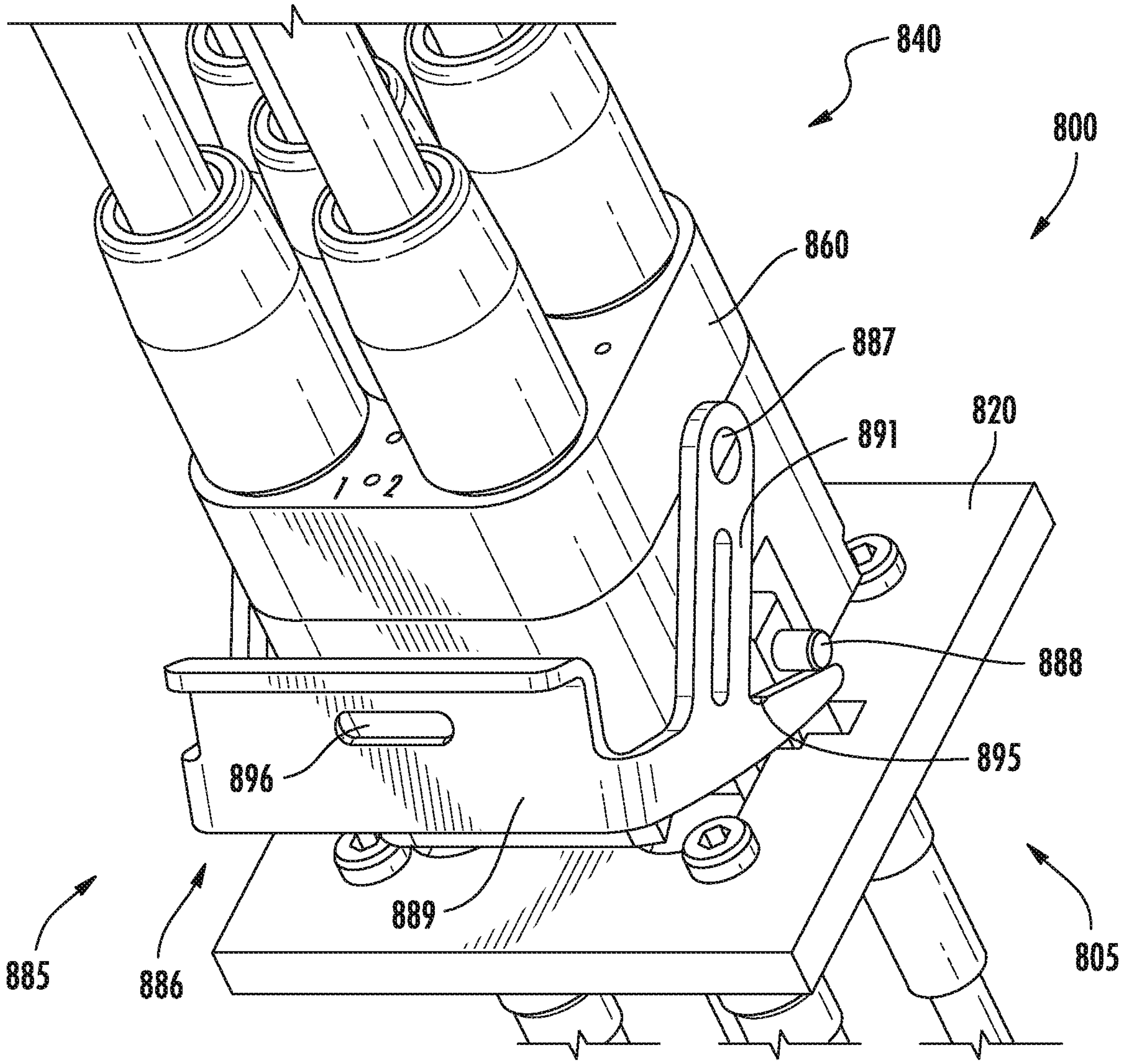
FIG. 32A is a perspective view of another assembly of mated ganged assembly connectors according to embodiments of the invention having a toggle assembly to secure the cable connector assembly to the equipment connector assembly.
Figure 32B:
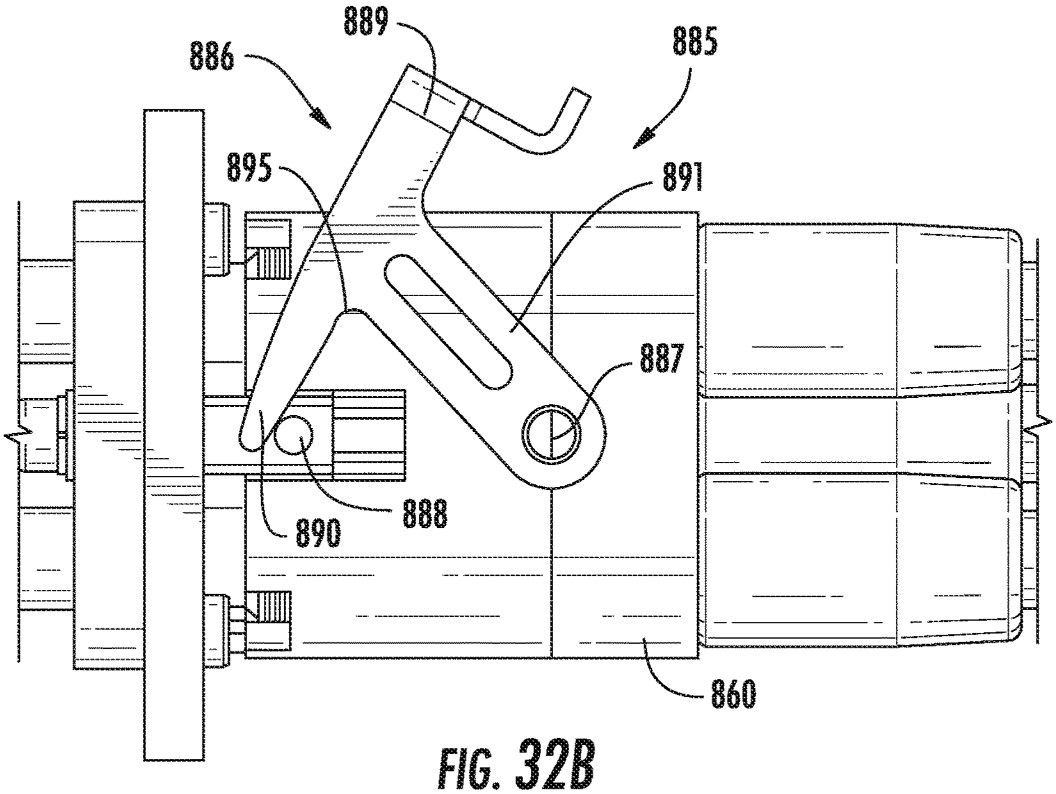
FIG. 32B is a side view of the toggle assembly shown in FIG. 32A with the latch in its unsecured position.
Figure 32C:
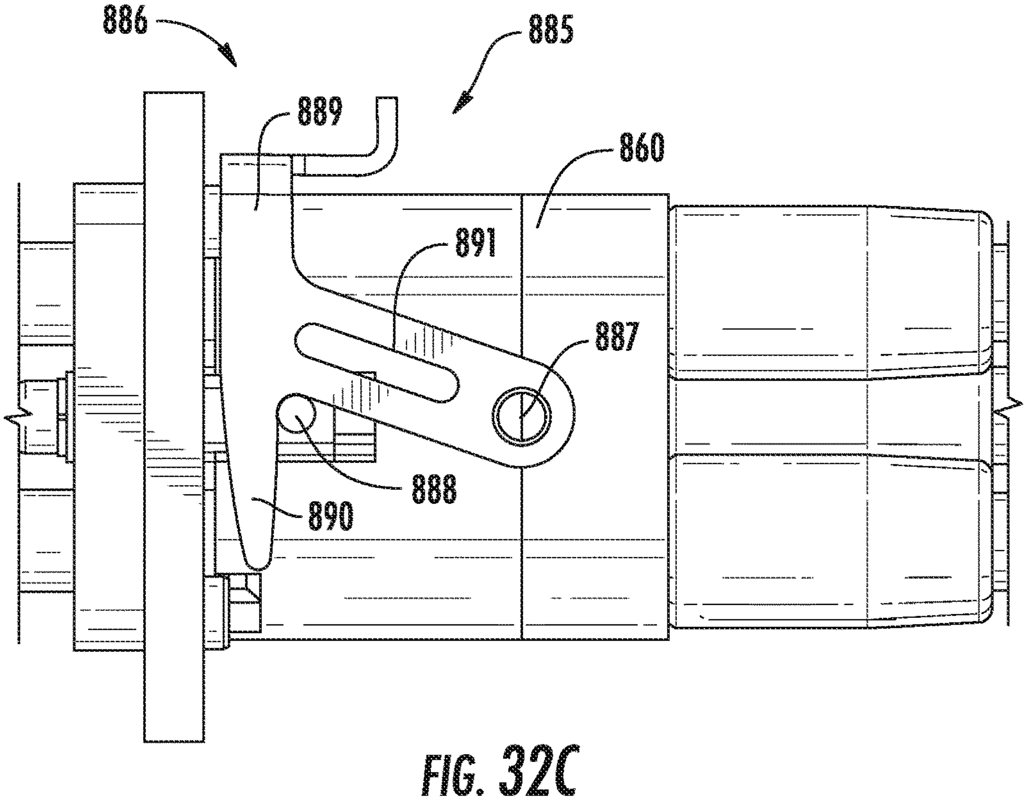
FIG. 32C is a side view of the toggle assembly shown in FIG. 32A with the latch in its secured position.
Figure 33:
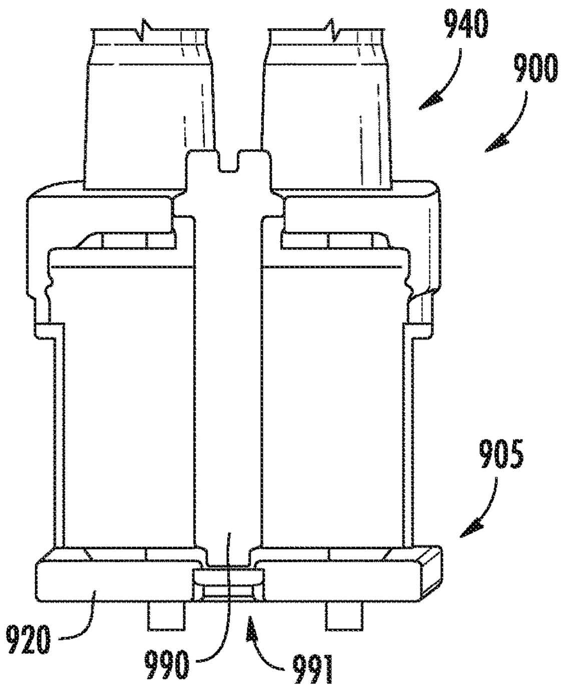
FIG. 33 is a section view another assembly of mated ganged assembly connectors according to embodiments of the invention, with a quarter turn screw employed to secure the cable connector assembly to the equipment connector assembly.
Figure 34:
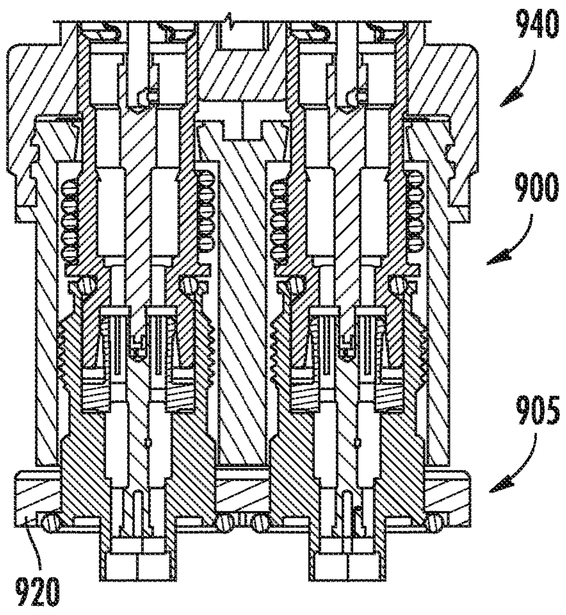
FIG. 34 is an enlarged section view of the assembly of FIG. 33.

Referring now to FIGS. 32A-32C, another embodiment of an assembly is shown therein and designated broadly at 800. The assembly 800 may be similar to either of the assemblies 400, 500, but includes a toggle assembly 885 with an L-shaped latch 886 mounted to the shell 860 of the cable connector assembly 840 at a pivot 887 and a pin 888 mounted to the mounting plate 820 of the equipment connector assembly 805. A handle 889 extends generally parallel to a finger 890 on the latch 886 and generally perpendicular to an arm 891 that extends between the finger 890 and the pivot 887. The finger 890 includes a recess 895 adjacent the arm 891. The handle 889 includes a slot 896 (see FIG. 32A).

The latch 886 can be pivoted via the handle 889 into engagement with the pin 888 to secure the assemblies 805, 840 to each other. As the finger 890 initially contacts the pin 888, the handle 889 is relatively easily pivoted toward the latched position. The assembly 800 is fully secured with the toggle assembly 885 when the latch 886 pivots sufficiently that the finger 890 moves relative to the pin 888 so that the pin 888 slides into the recess 895. Because in the secured position the handle 889 is generally level with the pin 888 and generally perpendicular to a line between the pivot 887 and the recess 895, significantly greater mechanical force is required on the handle 889 to move the latch 886 from the recess 895 back to its unsecured position. In the illustrated embodiment, the force required on the handle 889 to move the latch 886 into the secured position may be less than 27 lb-ft, while the force required to move the handle 889 from the secured position may be 50 lb-ft or more, and may even require the use of a screwdriver, wrench or other lever inserted into the slot 896 to create sufficient force. As such, once secured, the assembly 800 will tend to remain in the secured condition.

Figure 35:
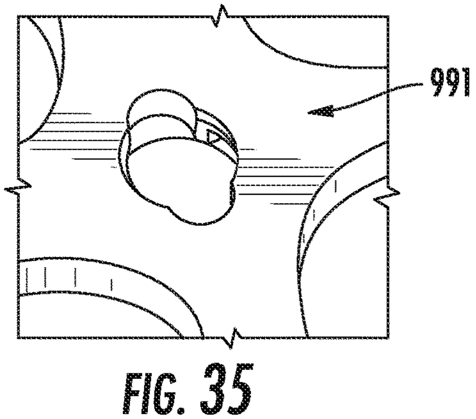
FIG. 35 is an enlarged perspective view of the mounting hole in the mounting plate of the equipment connector assembly of FIG. 33.
Figure 36:
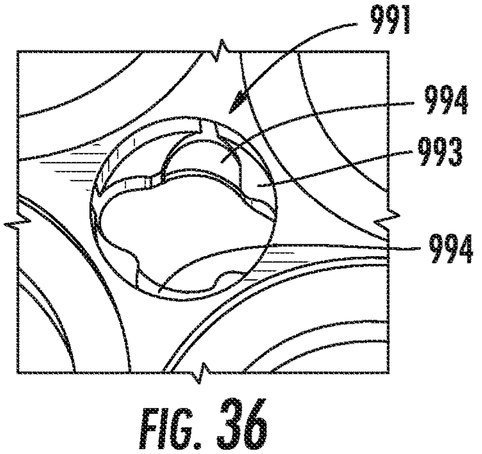
FIG. 36 is an enlarged opposite perspective view of the mounting hole of FIG. 35.
Figure 37A:
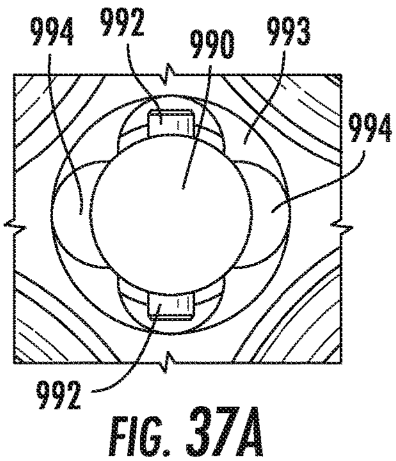
FIGS. 37A-37C are sequential views of the insertion and securing of the quarter-turn screw of FIG. 33 in the mounting hole of FIGS. 35 and 36.
Figure 37B:
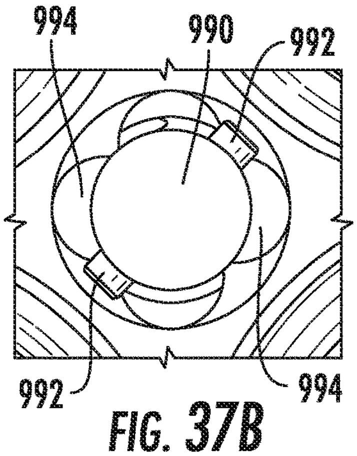
Figure 37C:
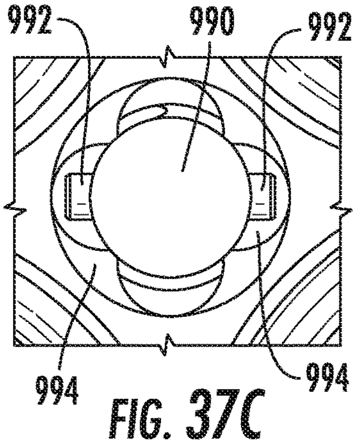

Referring now to FIGS. 33-37C, another embodiment of an assembly is shown therein and designated broadly at 900. The assembly 900 is similar to the assembly 500 with the exception that a quarter-turn screw 990 is employed to secure the cable connector assembly 940 to the equipment connector assembly 905. As shown in FIG. 35, a mounting hole 991 in the mounting plate 920 is configured to enable protruding flanges 992 of the quarter-turn screw 990 to be inserted. FIG. 36 shows that, on the opposite side of the mounting plate 920, the mounting hole 991 is surrounded by a circular recess 993 with two additional radially-extending recesses 994. FIGS. 37A-37C illustrate how the quarter-turn screw 990 can be inserted in the rerouting hole 991 (FIG. 37A) and rotated a quarter turn (shown in progress in FIG. 37B) so that the flanges 992 are received in the recesses 994 (FIG. 37C).

Referring again to FIG. 38, the assembly 500' shown therein also includes a metal tube 595 through which the fastening screw 572 may be inserted that provides a positive stop to prevent overtightening of the screw 572. The assembly 500' also shows a groove 596 on the inner surface of the shell 560' that can capture a rim 597 on the housing 524' to assist with securing of the assemblies 505', 540'.

Figure 39:
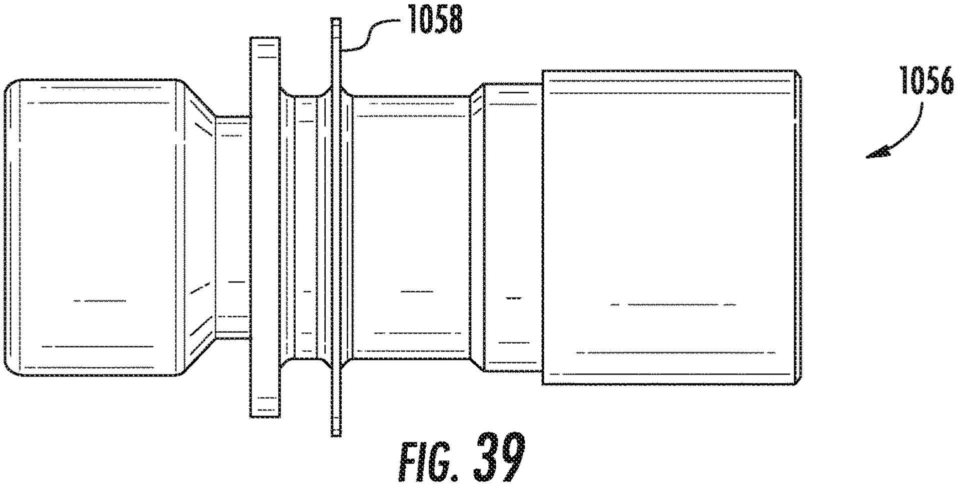
FIG. 39 is a side view of a connector body for use in an assembly of mated connectors according to embodiments of the invention, wherein the connector body is shown after machining but prior to swaging and cutting.
Figure 40:
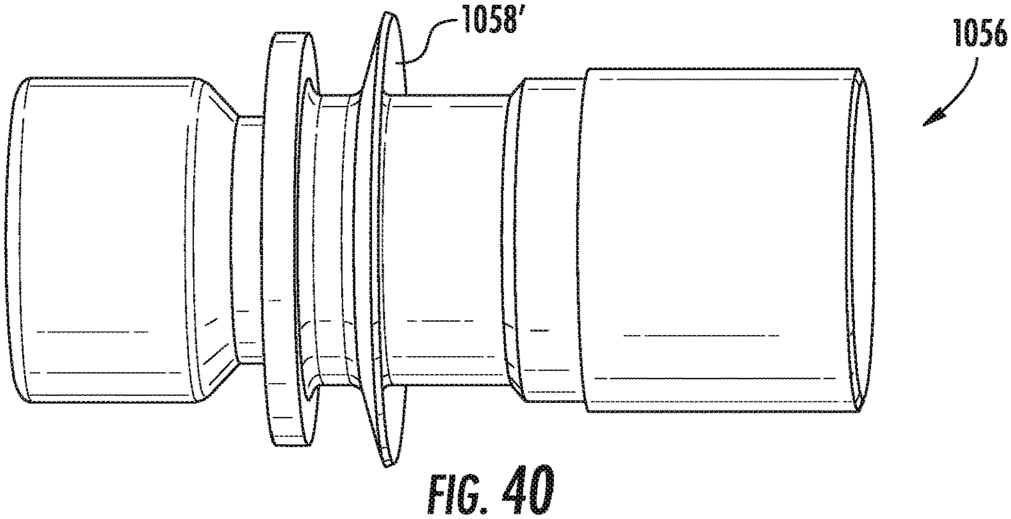
FIG. 40 is a side view of the connector body of FIG. 39 after swaging.
Figure 41:
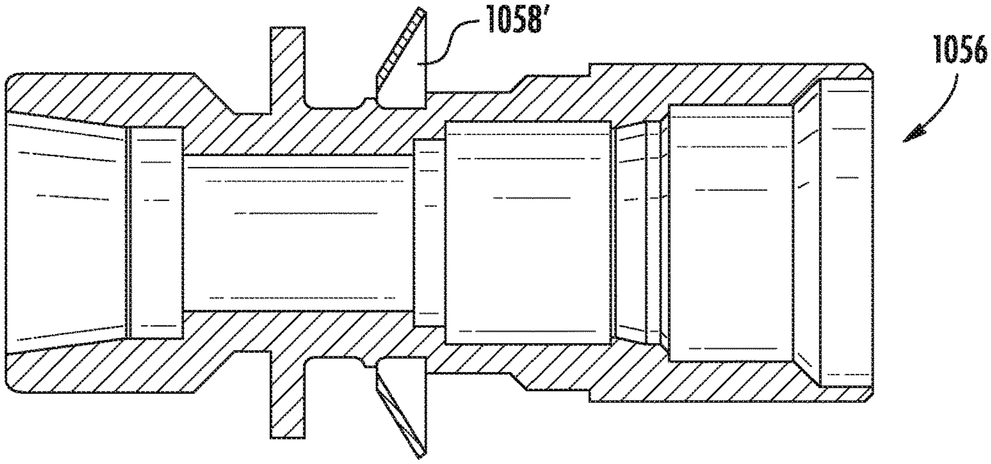
FIG. 41 is a side section view of the connector body of FIG. 39 after swaging and cutting.

Referring now to FIGS. 39-41, an outer conductor body suitable for use in a mated ganged assembly is shown therein and designated broadly at 1056. The outer conductor body 1056 includes a spring washer-type structure and action that can replace the springs 780 shown in FIGS. 30 and 31. As shown in FIG. 39, the outer conductor body after machining has a radially-extending fin 1058. The fin 1058 is swaged or otherwise formed into a truncated conical configuration (shown at 1058' in FIG. 40). The inner diameter of the fin 1058' is then cut from the remainder of the outer conductor body 1056 (see FIG. 41). In this configuration, the fin 1058' can serve as a spring that allows axial adjustment of the outer conductor body 1056.

The process described above can provide a Belleville washer-type spring that may be more suitable than a separate washer, as the inner diameter of the fin 1058' (which can be an important dimension for achieving a desirable spring action) can be closely matched to the outer diameter of the outer conductor body 1056.

Figure 42:
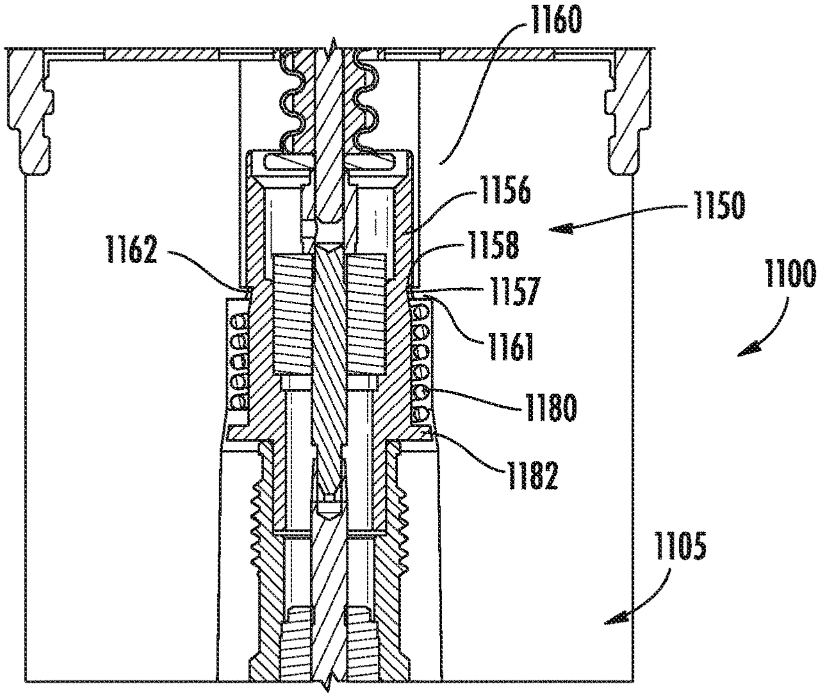
FIG. 42 is a top section view of a mated pair of connectors suitable for use in a mated ganged assembly, the connectors shown in an unmated condition.
Figure 43:
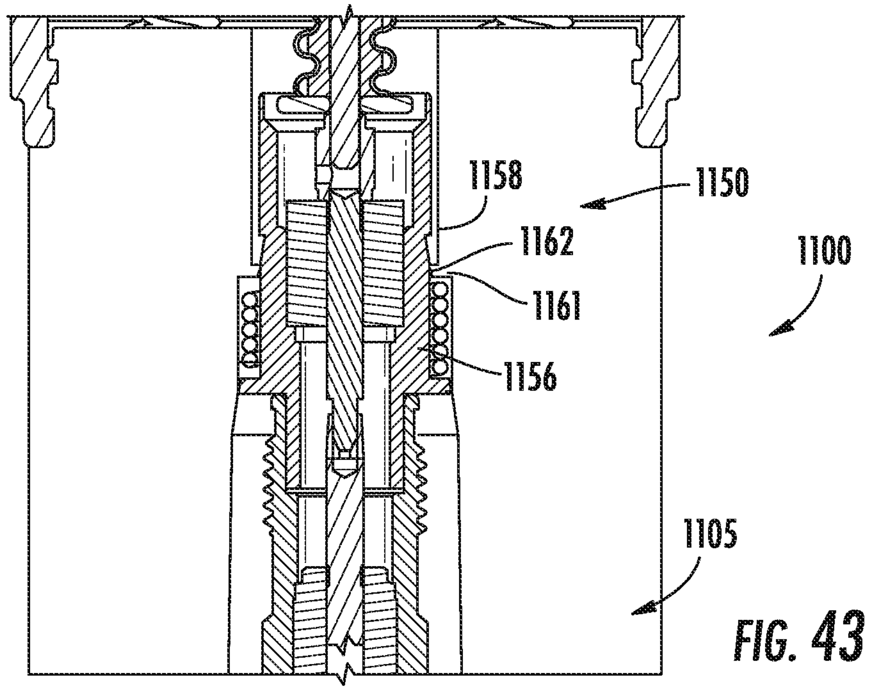
FIG. 43 is a top section view of the connectors of FIG. 42 shown in a mated condition.
Figure 43A:
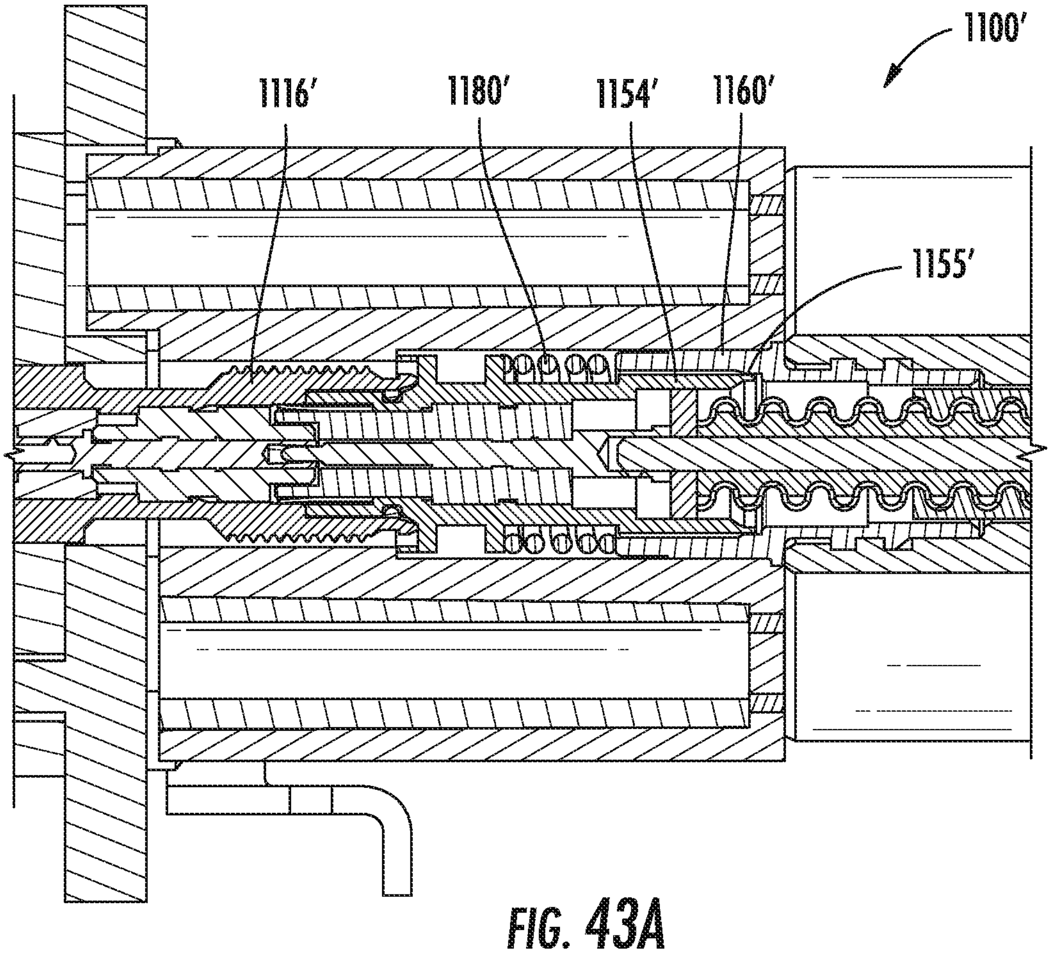
FIG. 43A is a top section view of the mated pair of connectors of FIG. 42A, the connectors shown in a mated condition.
Figure 43B:
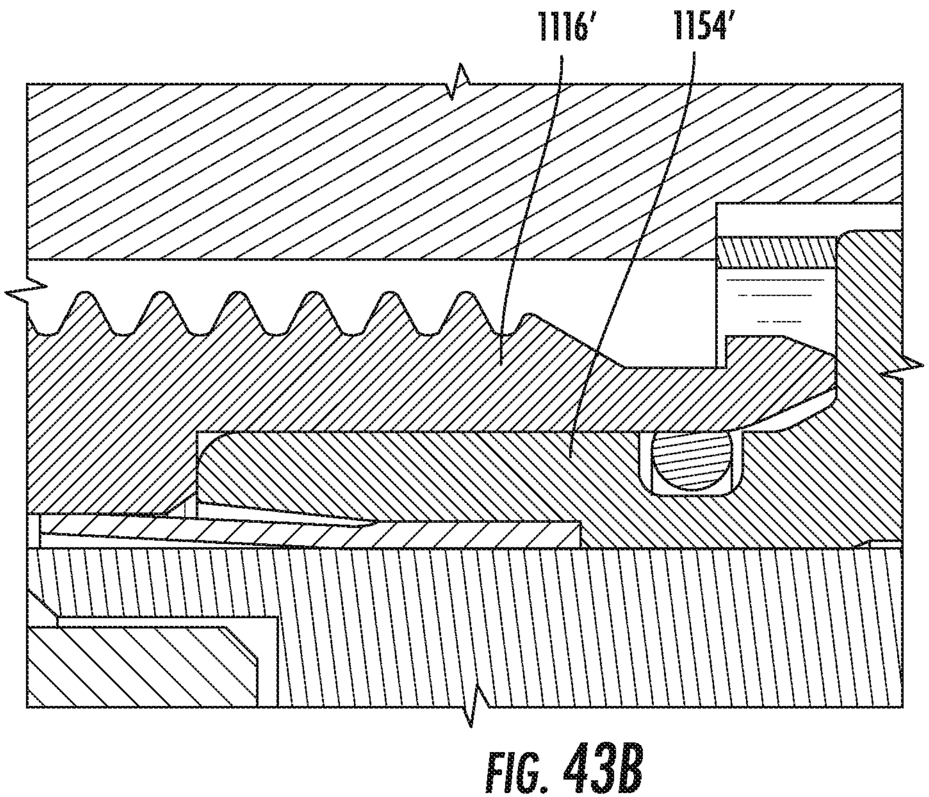
FIG. 43B is an enlarged partial section view of a portion of the interface of the assembly of FIG. 43A shown in a mated condition.
Figure 43C:
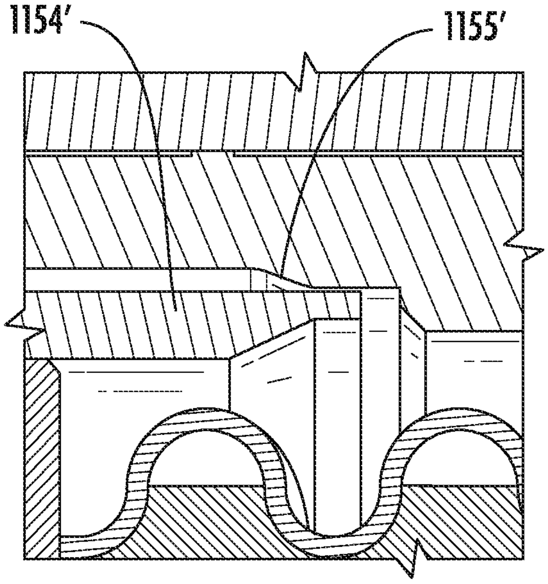
FIG. 43C is an enlarged partial section view of a portion of the outer connector body of the assembly of FIG. 43A shown in a mated condition.
Figure 44:
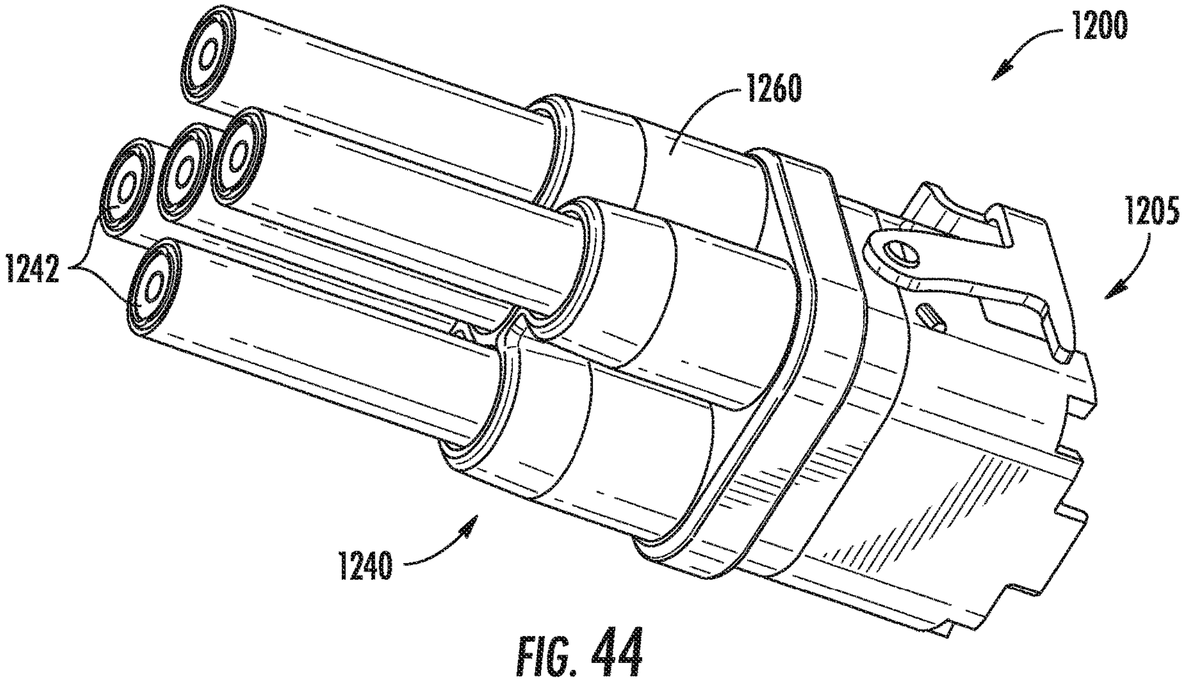
FIG. 44 is a perspective view of an assembly of mated ganged connectors according to additional embodiments of the invention.
Figure 45:
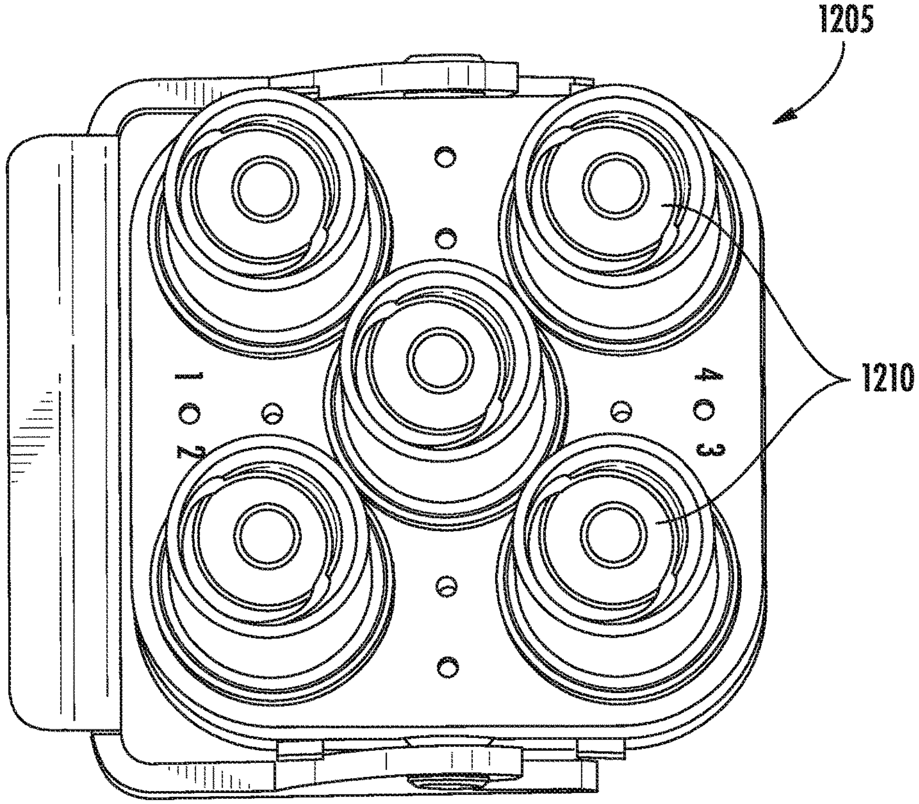
FIG. 45 is a front view of the equipment connector assembly of the assembly of FIG. 44.

Referring now to FIGS. 42 and 43, mating connectors 1105, 1150 for another assembly, designated broadly at 1100, is shown therein. The connectors 1105, 1150 are similar to the connectors of the assembly 700 discussed above, with the accompanying spring 780 to allow axial float. However, the outer conductor body 1156 of the connector 1150 includes a ramped surface 1157 forward of a shoulder 1158; the spring 1150 is captured between the shoulders 1182, 1158. The shell 1160 includes a rim 1161 with a ramped inner surface 1162.

As can be seen in FIG. 42, in an open position, the rim 1161 rests against the forward surface of the shoulder 1158. As the connector 1150 moves to a mating condition with the connector 1105 as shown in FIG. 43, the forward surface of the rim 1161 compresses the spring 1180 against the shoulder 1182. The ramped surfaces 1157, 1162 interact during mating to gradually center and radially align the connectors 1105, 1150. In some embodiments, in the closed position there is a slight interference fit between the ramped surfaces.

This configuration can provide distinct performance advantages. When both of the electrical contacts (inner and outer conductors) of mating connectors are radial, as is the case with 4.3/10, 2/2.5 and Nex10 interfaces, axial clamp force between the mating connectors is not needed for electrical contact directly, but only to provide mechanical stability: specifically, to force the axes of the two mating connectors to remain aligned, thus preventing the electrical contact surfaces from moving relative each other during bending, vibration, and the like. Such relative axial movement can generate PIM directly, and can also generate debris which in turn further causes PIM. (Experiments have demonstrated this behavior for the 4.3/10 interface).

The two clamped or interfering sections spaced along the outer conductor body 1156 in the closed position of FIG. 43 provide a means of creating this desired axial stability. Furthermore, the ramped surfaces 1157, 1162 allow radial float initially and gradually bring the axis of the floating connector (i.e., the connector 1150) into alignment with the fixed connector (i.e., the connector 1105) and then hold it in a fixed position when fully advanced. The angle of the ramped surfaces 1157, 1162 can be adjusted to provide the mechanical advantage required based on the force of the latching mechanism used. In some embodiments, this arrangement may eliminate the need for any axial float, in which case the spring 1180 may be omitted. The area of interference can be increased as required to increase stability at the expense of radial float.

Figure 42A:
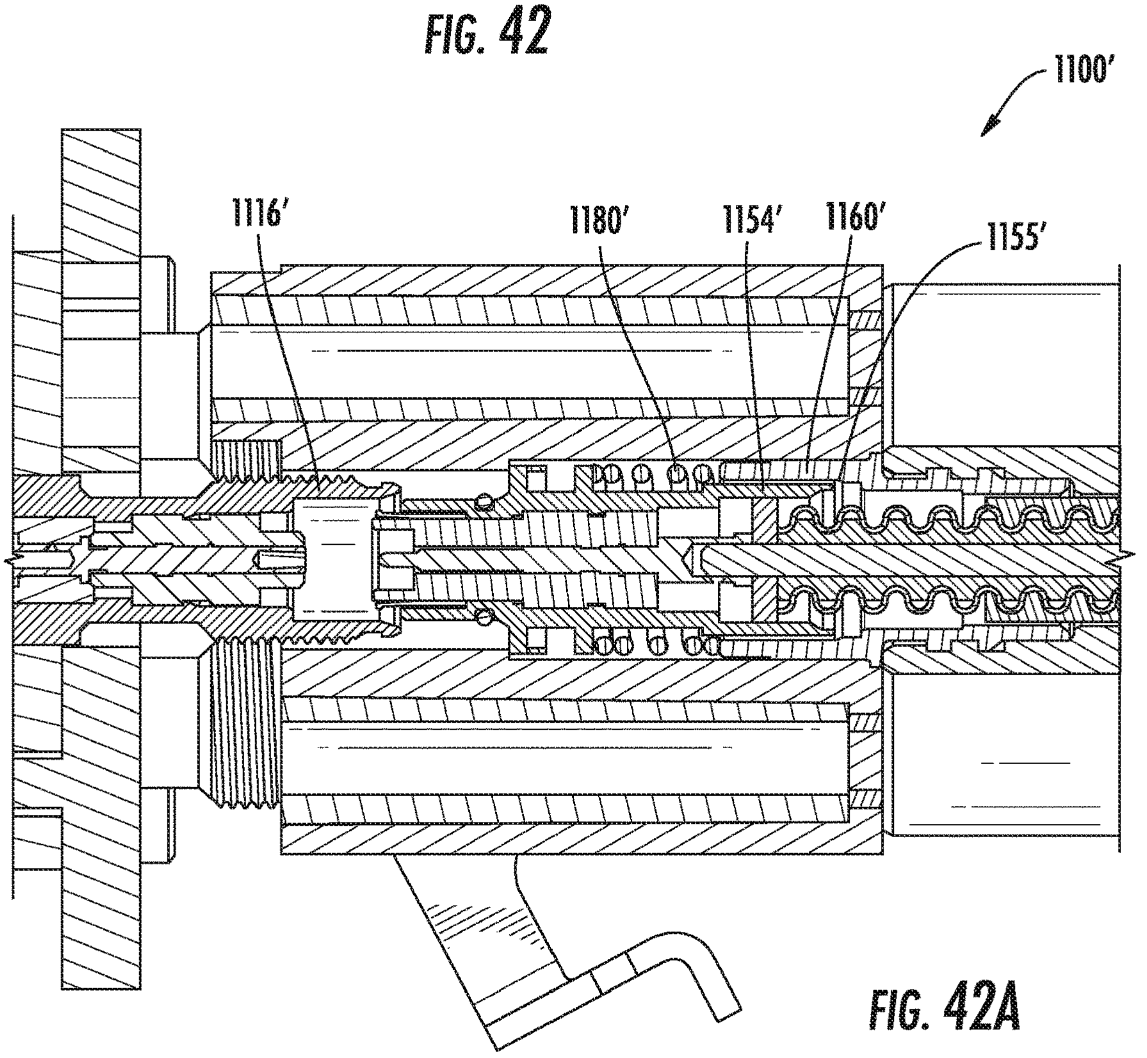
FIG. 42A is a top section view of a mated pair of connectors suitable for use in a mated ganged assembly according to another embodiment, the connectors shown in an unmated condition.
Figure 42B:
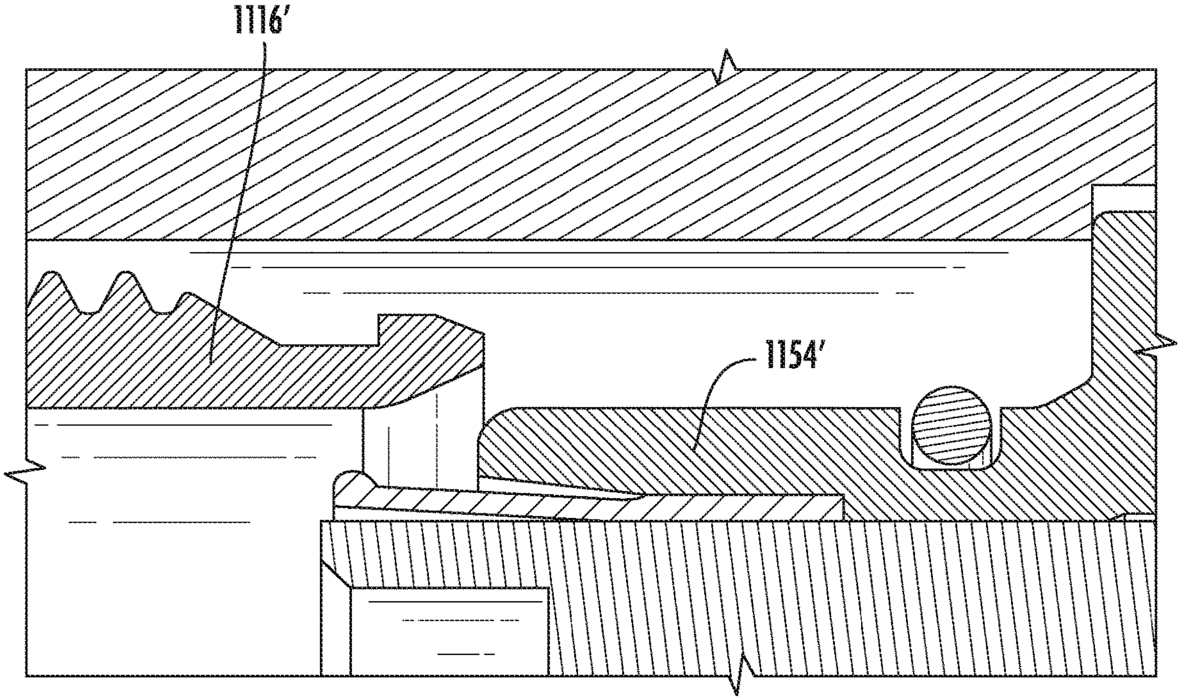
FIG. 42B is an enlarged partial section view of a portion of the interface of the assembly of FIG. 42A shown in an unmated condition.
Figure 42C:
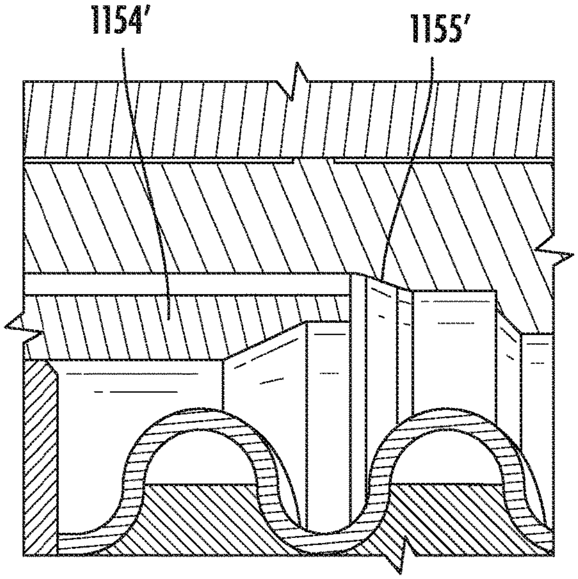
FIG. 42C is an enlarged partial section view of a portion of the outer connector body of the assembly of FIG. 42A shown in an unmated condition.

Referring now to FIGS. 42A-42C and 43A-43C, another assembly, designated broadly at 1100', is shown therein. In this embodiment, axial float is provided with a spring 1180' similar to that shown for the assembly 1100. However, radial float is controlled differently by the ID and OD of the outer connector bodies 1116', 1154' at the interface and the OD of the rear end of the outer connector body 1154' and a ramped transition surface 1155'. As shown in FIGS. 42A-42C, in an unmated condition, the connector 1150' is able to float axially and radially due to the spring 1180'. However, in the mated condition of FIGS. 43A-43C, mating of the outer connector bodies 1116', 1154' tends to radially align the connector 1150', and as it floats rearwardly, the ramped transition surface 1155' forces the rear end of the outer connector body 1154 into radial alignment. As this occurs, though, there is still the opportunity for axial float at the outer connector body 1154' moves rearwardly. The clearance at both ends of the outer conductor body 1154' is sufficiently minimal that this interaction can be used to maintain the mated condition without other external means. (In fact, those skilled in this art will recognize that this concept may be employed with a single connector pair and is not limited to ganged connectors as illustrated herein). Also, as noted above, in some embodiments the spring 1180' may be omitted, as the resilience of the shell 1160' may provide sufficient give to permit any needed axial float.

Figure 46:
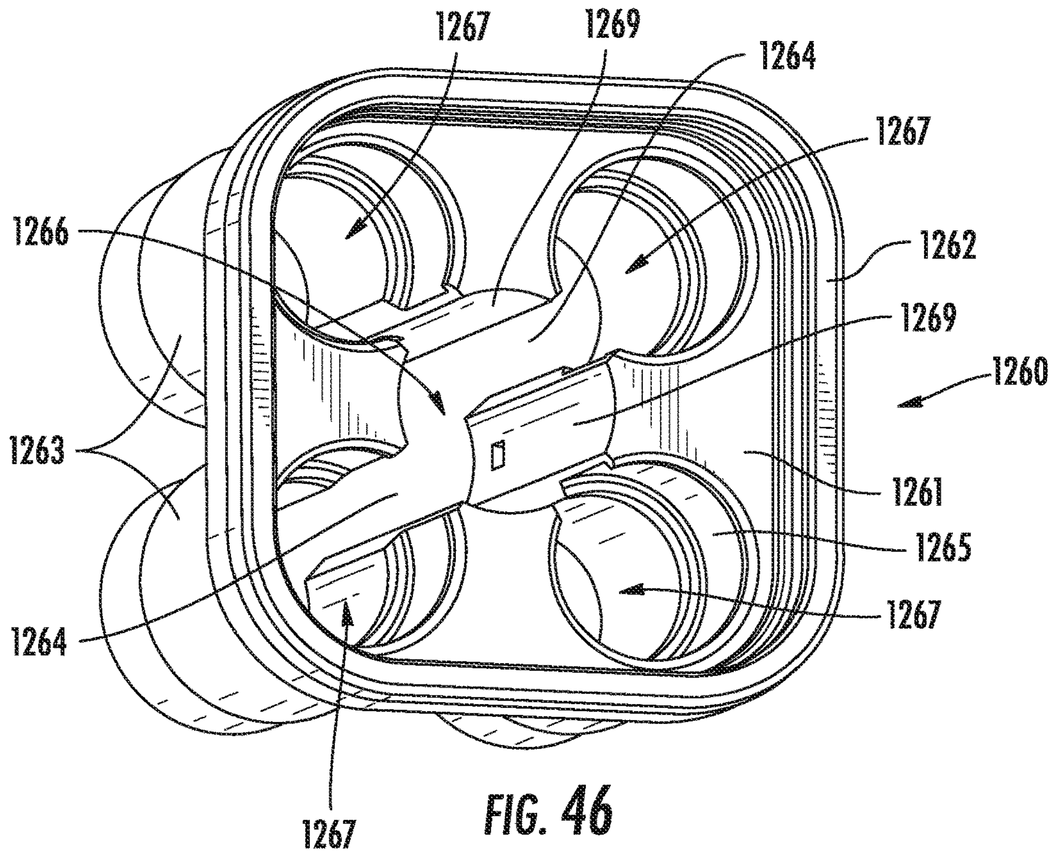
FIG. 46 is a front perspective view of the shell of the cable connector assembly of the assembly of FIG. 44.
Figure 47:
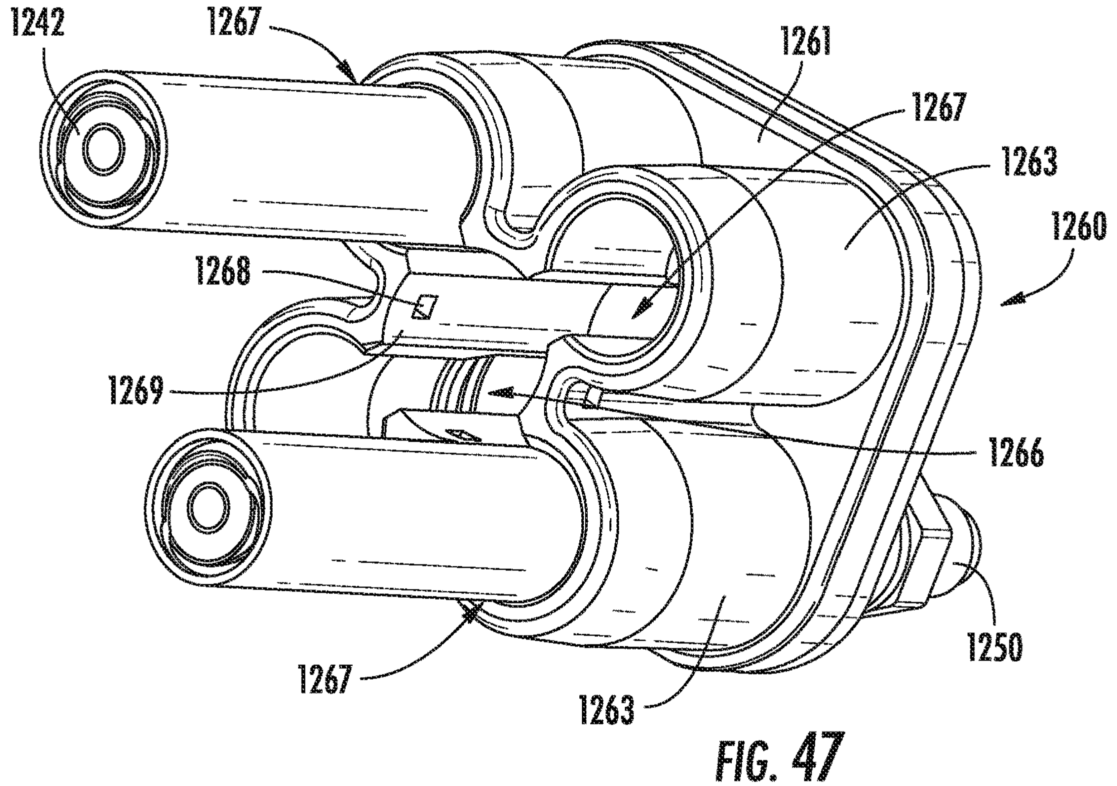
FIG. 47 is a rear perspective view of the shell of FIG. 46 with two cables inserted therein.

Those of skill in this art will appreciate that the assemblies discussed above may vary in configuration. For example, the connectors are shown as being either "in-line" or in a rectangular M×N array, but other arrangements, such as circular, hexagonal, staggered or the like, may also be used. Also, although each of the assemblies is shown with four pairs of mating connectors, fewer or more connectors may be employed in each assembly. An example of an assembly with five pairs of connectors is shown in FIGS. 44-54 and designated broadly at 1200, which includes an equipment connector assembly 1205 with five connectors 1210 and a cable connector assembly 1240 with five connectors 1250 connected to five cables 1242. As shown in FIGS. 46 and 47, the connectors 1210 and 1250 are arranged in a cruciform pattern, with one of the connectors 1210, 1250 surrounded by four other connectors 1210, 1250 separated from each other by 90 degrees. In this arrangement, one potential issue that can arise is proximity of the connectors. For larger cables and connectors, there may be inadequate space between the connectors 1210 to enable each of the connectors 1250 to have its own cavity as shown in FIG. 26 (either as separate shells or as a single shell with four cavities), as the wall thickness of the material surrounding the cavity is often too thin.

This shortcoming may be addressed by the use of the shell 1260 shown in FIGS. 46-54. The shell 1260 has a generally square footprint with an outer rim 1262 that surrounds a base 1261. Four towers 1263 extend from the base 1261. Each of the towers 1263 defines a peripheral cavity 1267, but is discontinuous in that it includes a radially-inward gap 1264. Each tower 1263 includes a recess 1265 at one end, with a lip 1265*a* extending radially inwardly from the front end of the recess 1265 (see FIGS. 53 and 54). A transition all 1269 spans adjacent towers 1263, with the effect that a central cavity 1266 is defined by the transition walls 1269 and the gaps 1264. Each of the transition walls 1269 includes an indentation 1268 (see FIG. 50).

Figure 48:
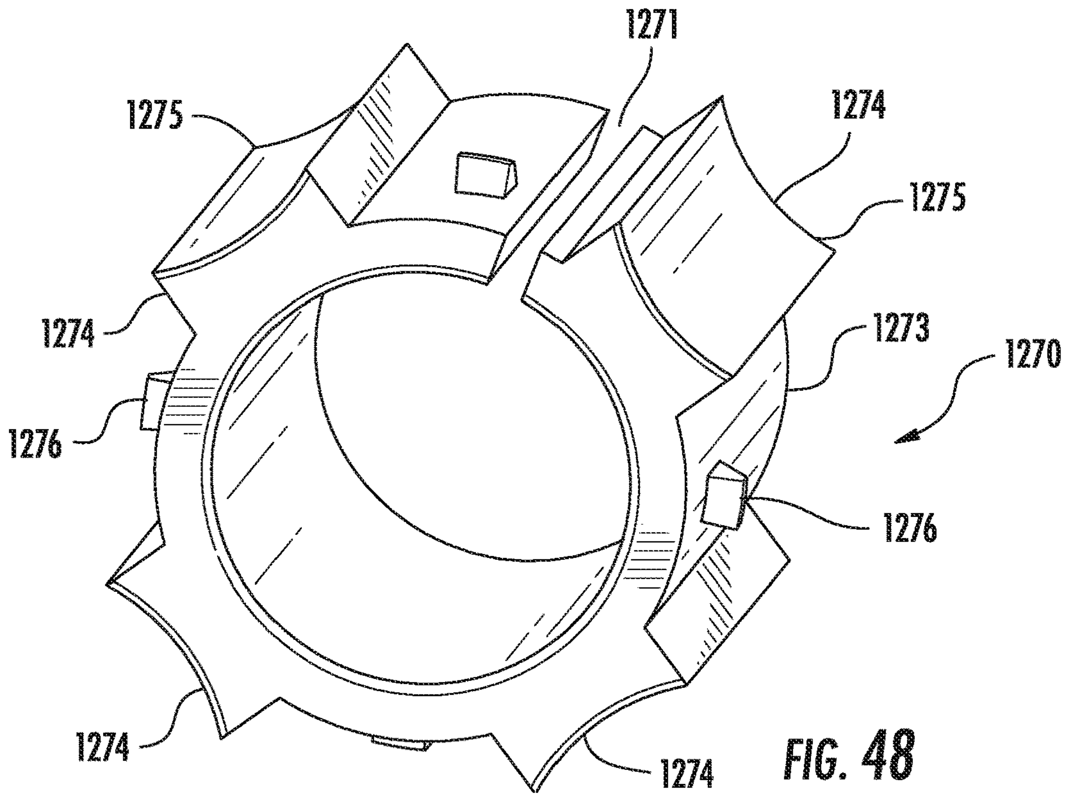
FIG. 48 is a perspective view of an insert to be used with the shell of FIG. 46.
Figure 49:
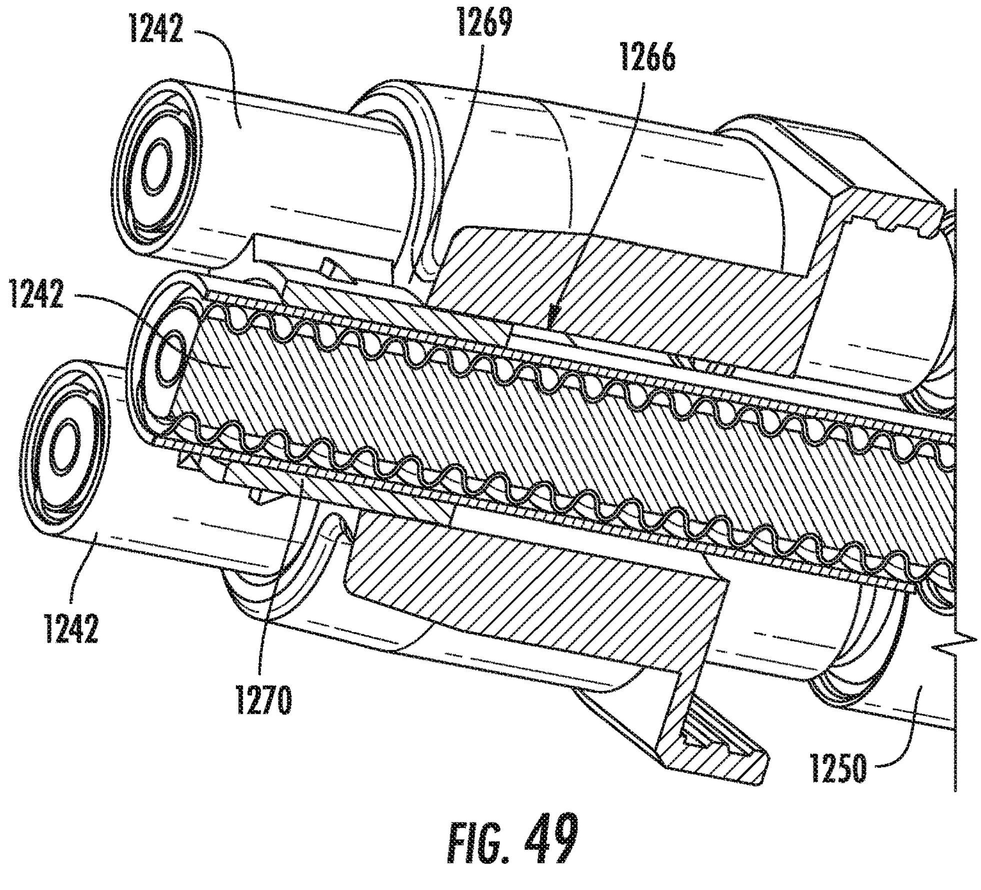
FIG. 49 is a perspective section view of the cable connector assembly used in the assembly of FIG. 44 showing the insertion of the insert of FIG. 48 into the shell of FIG. 46.
Figure 50:
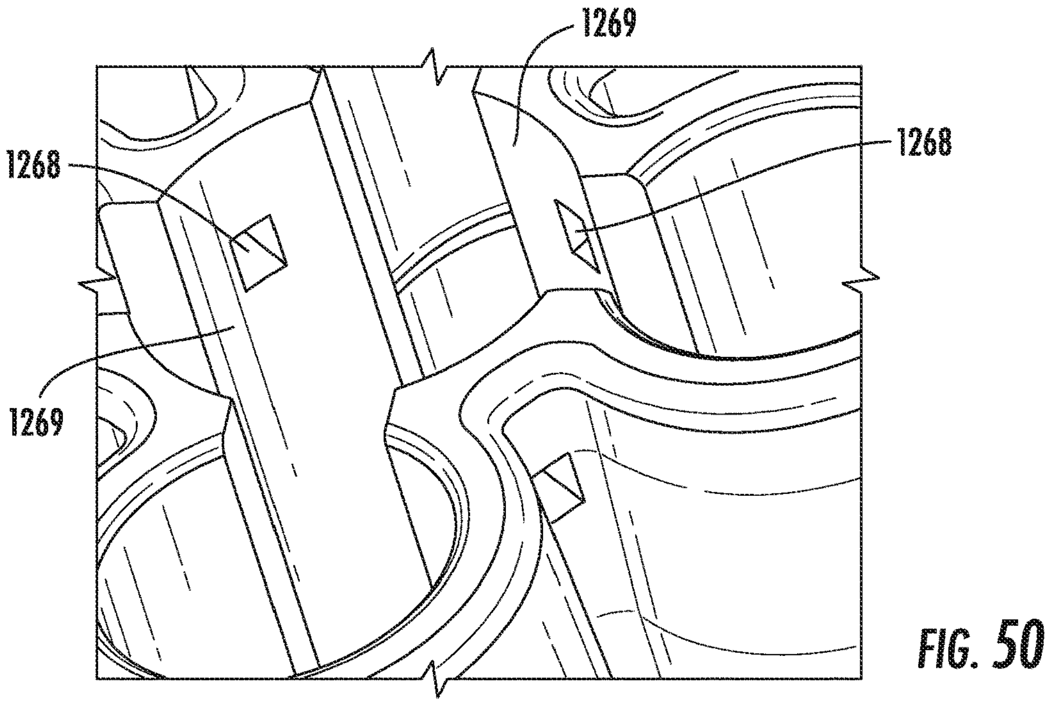
FIG. 50 is an enlarged perspective view of the central cavity of the shell of FIG. 46.
Figure 51:
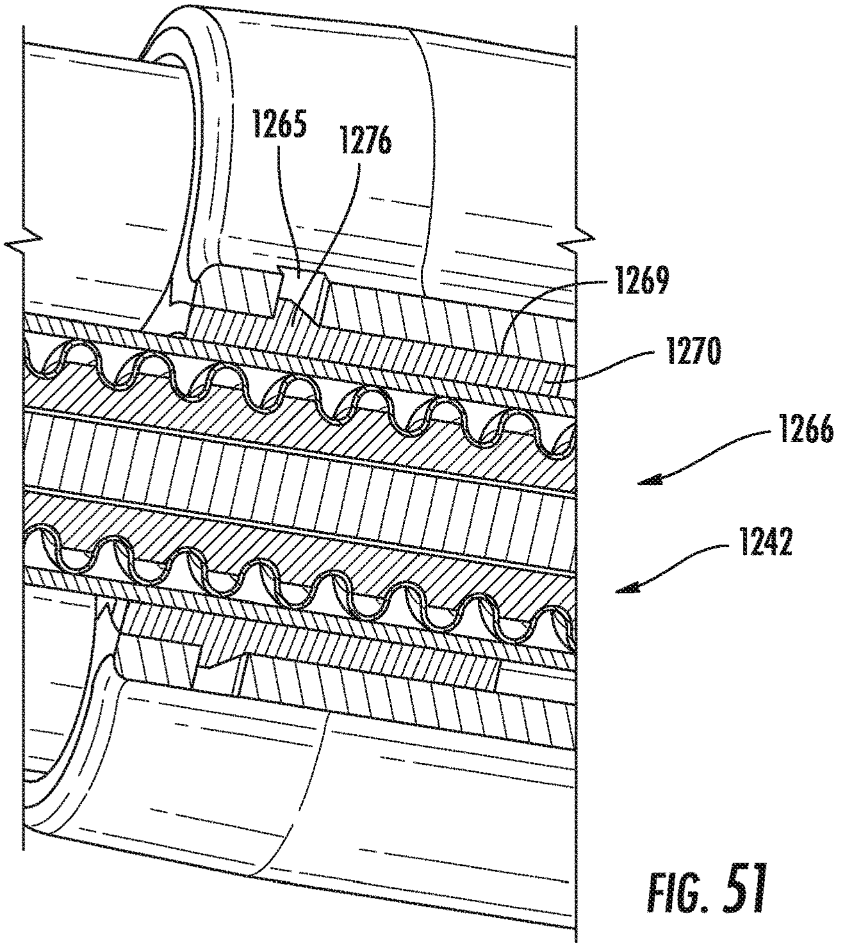
FIG. 51 is an enlarged section view of the cable connector assembly of FIG. 49.

Referring now to FIG. 48, an annular insert 1270 is shown therein. The insert 1270 is discontinuous, having a gap 1271 in the main wall 1273. Four blocks 1274 with arcuate external surfaces 1275 extend radially outwardly from the main wall 1273. Snap protections 1276 extend radially outwardly from the main wall 1273 between each pair of adjacent blocks 1274.

Construction of the assembly 1240 can be understood by reference to FIGS. 47, 49-51, 53 and 54. A terminated cable 1242 with a connector 1250 attached to the end thereof is inserted through the central cavity 1266. The cable 1242 is then forced radially outwardly through one of the gaps 1264 and into the corresponding peripheral cavity 1267, with the tower 1263 being sufficiently flexible to deflect to allow the cable 1240 to pass through the gap 1264. The connector 1250 is located relative to the shell 1260 so that rear end of the outer body 1252 of the connector 1250 fits within the recess 1265 and is captured by the lip 1265*a* (see FIGS. 53 and 54). This process is repeated three more times until all four of the peripheral cavities 1267 are filled (see FIG. 47, which shows two cables 1240 in place in the shell 1260).

Figure 52:
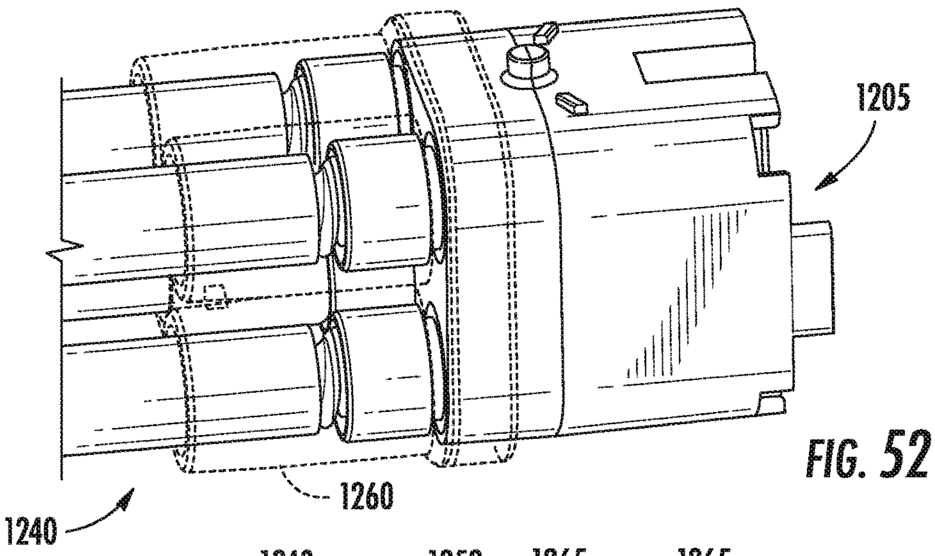
FIG. 52 is a perspective view of the assembly of FIG. 44 with the shell shown as transparent for clarity.
Figure 53:
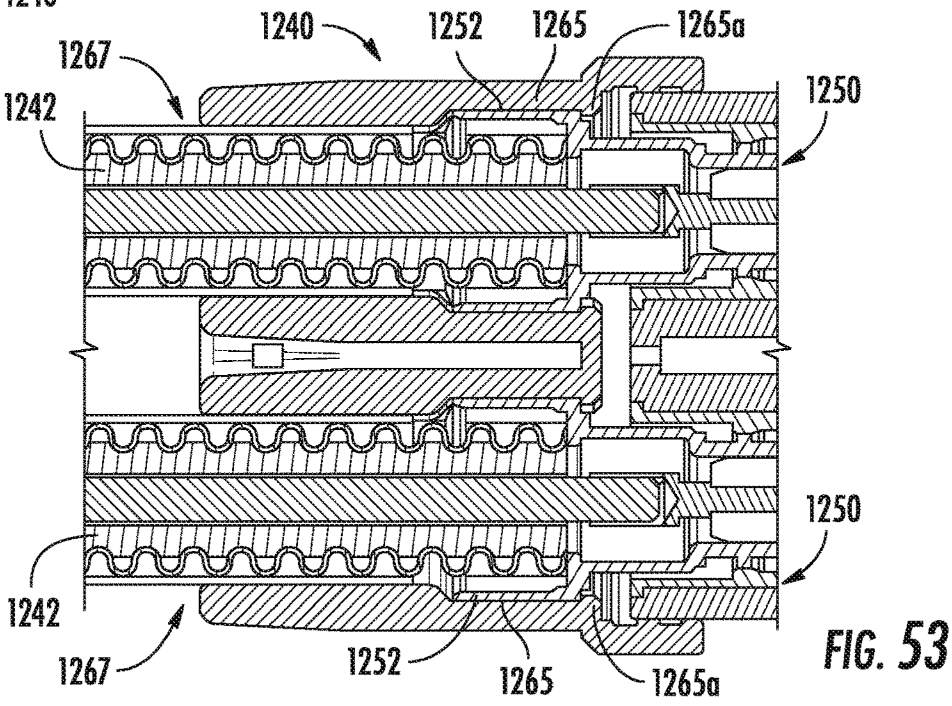
FIG. 53 is partial side section view of the mated assembly of FIG. 44.
Figure 54:
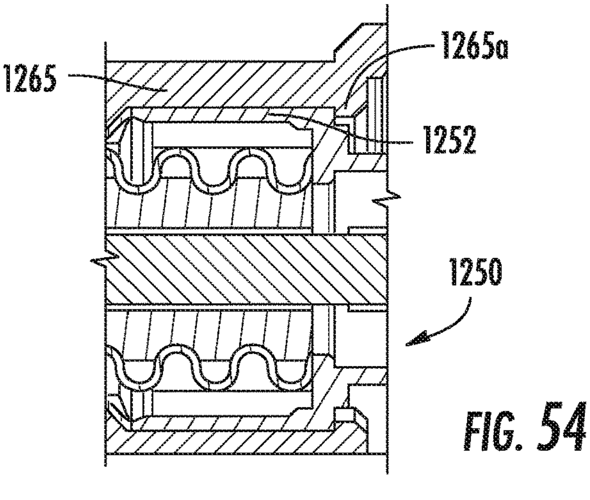
FIG. 54 is an enlarged partial side section view of the mated assembly of FIG. 53.

Next, a fifth terminated cable 1242 is passed through the central cavity 1266 and the connector 1250 is located relative to the shell 1260. The insert 1270 is slipped over the cable 1242 (i.e., the cable 1242 passes through the gap 1271 in the insert 1270) and oriented so that the blocks 1274 fit between the transition walls 1269. The insert 1270 is then slid along the cable 1242 and into the central cavity 1266 (see FIG. 49) until the snap projections 1276 snap into the indentations 1265. This interaction locks the final (central) cable 1242 into place. The cable connector assembly 1240 can then be mated with the equipment connector assembly 1205 as shown in FIG. 52.

It can be understood that the above-described arrangement, with four cables acting as the "corners" of a "square" and a fifth cable located in the center of the "square," can provide the assembly with space-related advantages. In particular, cables may be arranged in this manner in a smaller footprint than similar cables arranged in a circular pattern. Similarly, if the same footprint area is employed, large cables may be included in the illustrated "square" arrangement, with can provide performance advantages (such as improved attenuation).

It will also be understood that the assembly 1240 may be formed with four cables 1242 (one each residing in the peripheral cavities 1267), with the central cavity 1266 being filled with a circular (rather than annular) insert.

Figure 55:
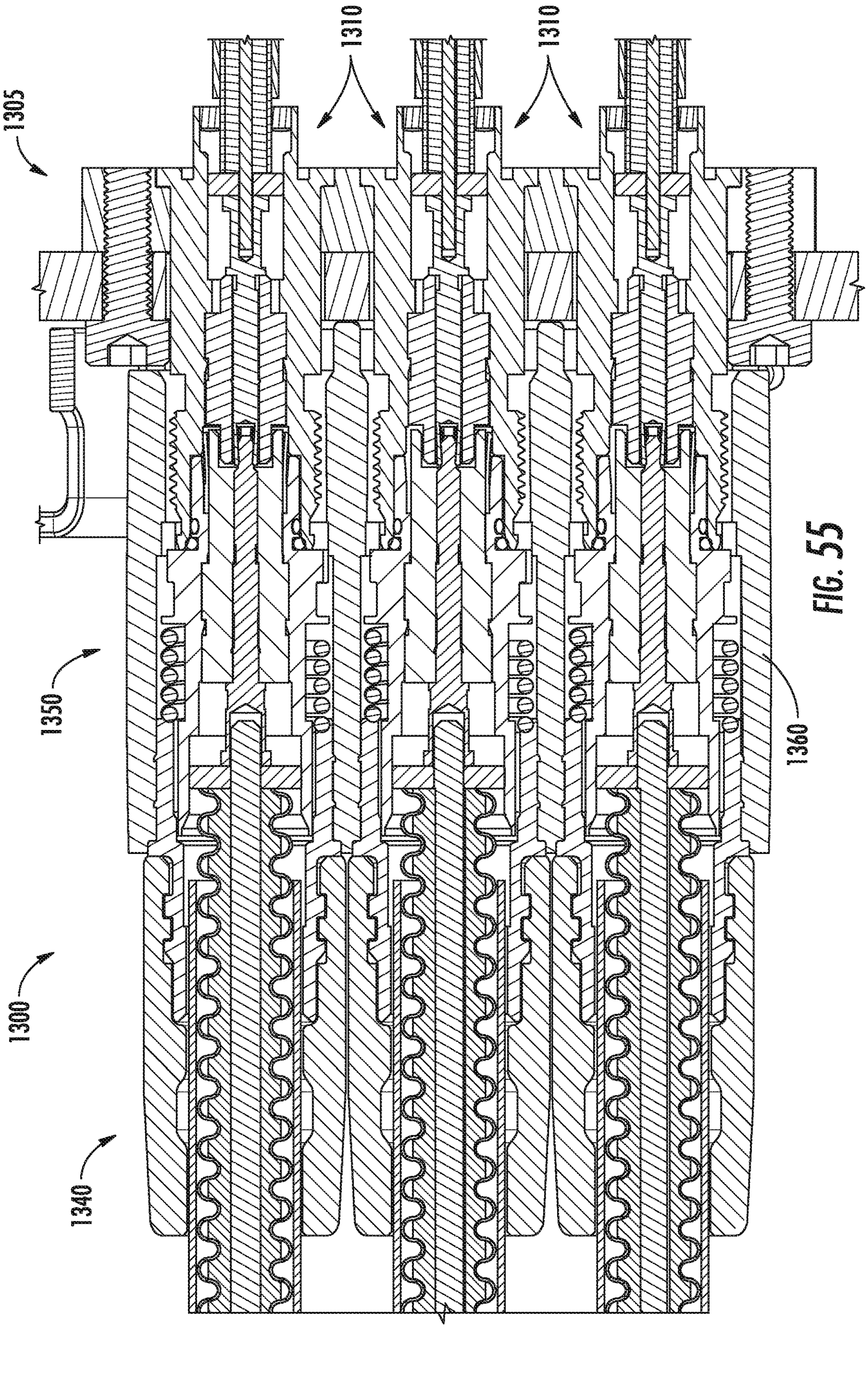
FIG. 55 is a sectional view of an assembly of mated connectors according to a further embodiment of the invention.
Figure 56:
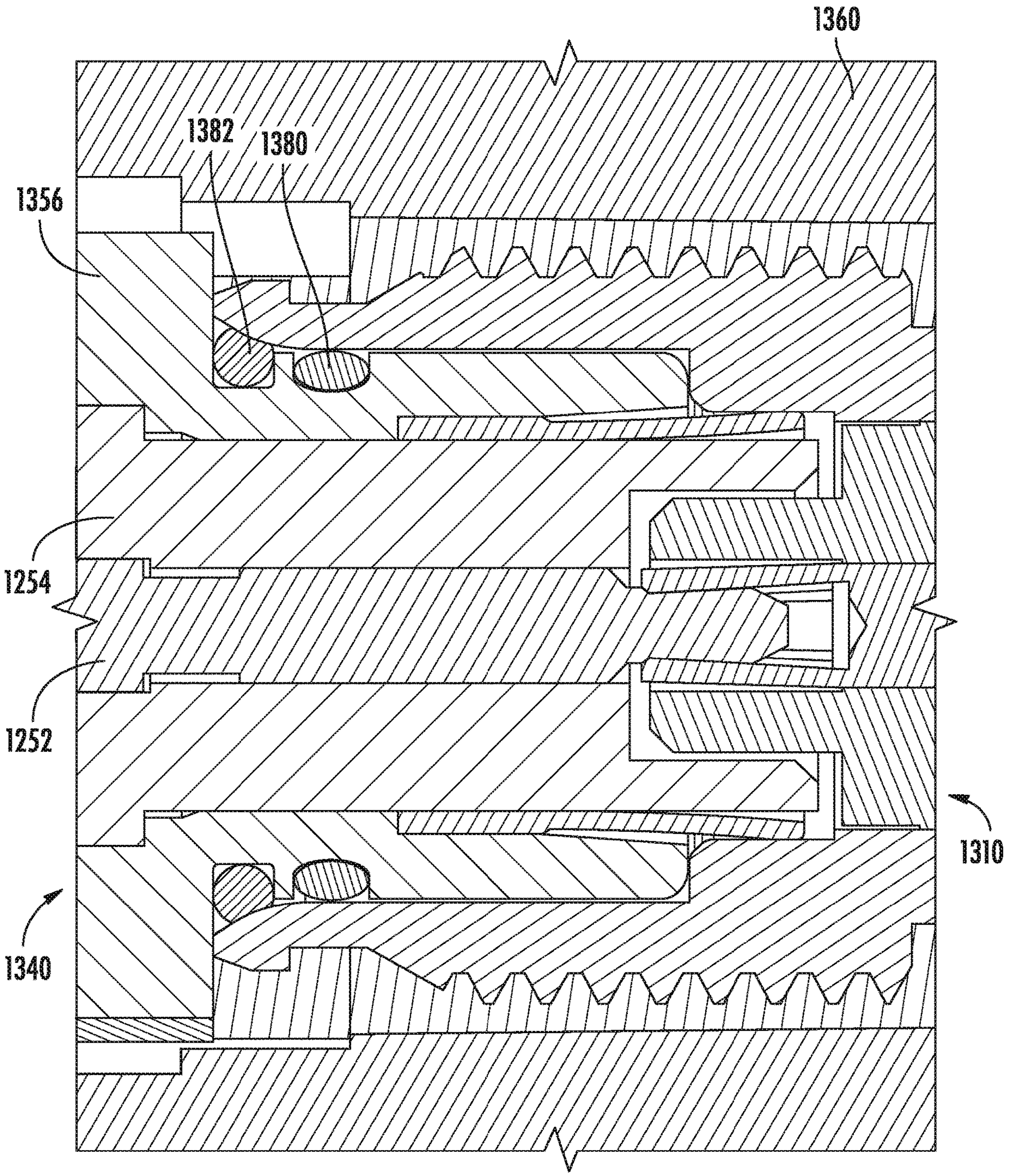
FIG. 56 is an enlarged partial section view of the assembly of FIG. 55.
Figure 57:
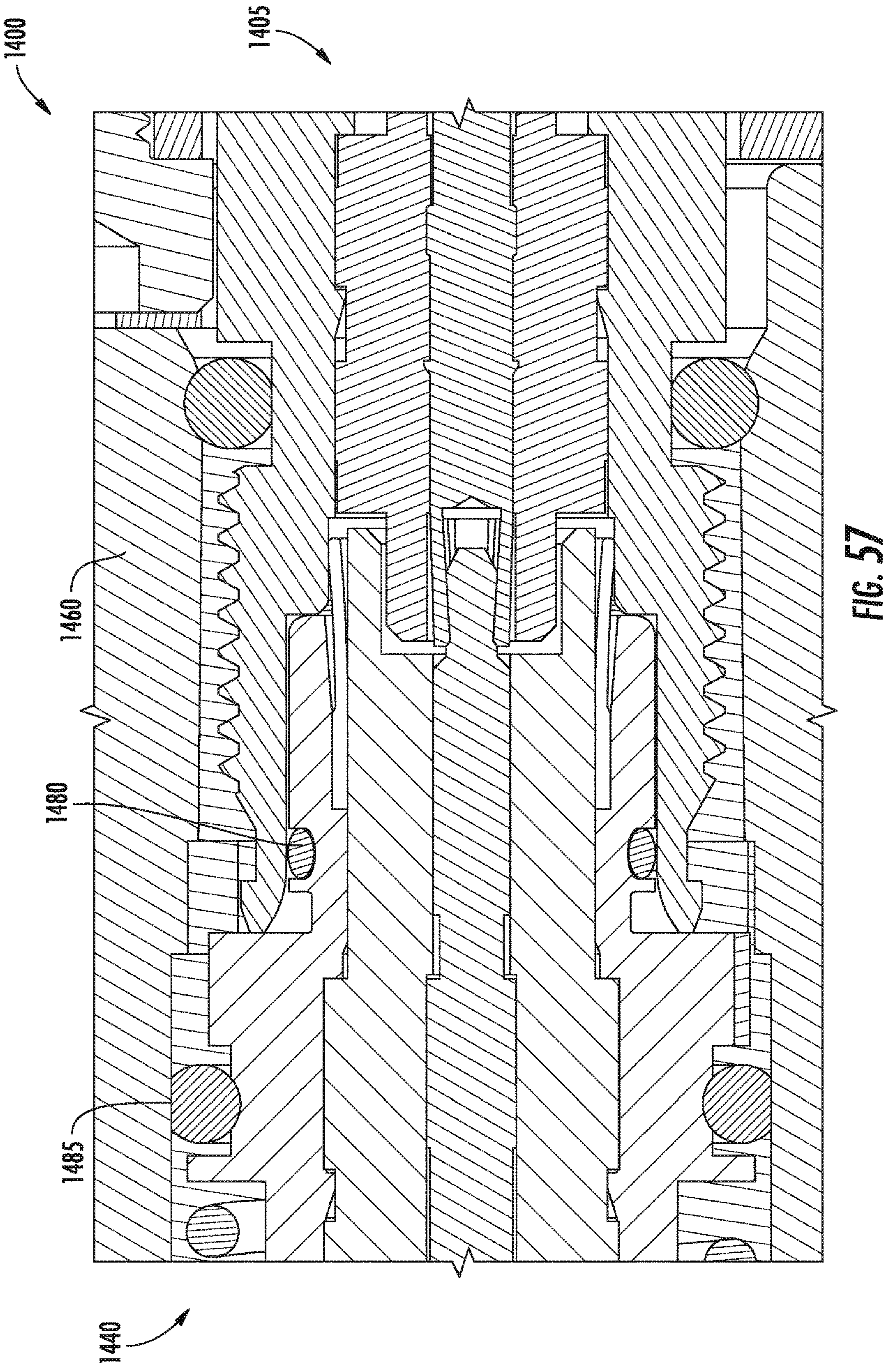
FIG. 57 is a sectional view of one pair of matted connectors in an assembly of mated connectors according to a still further embodiment of the invention.
Figure 58:
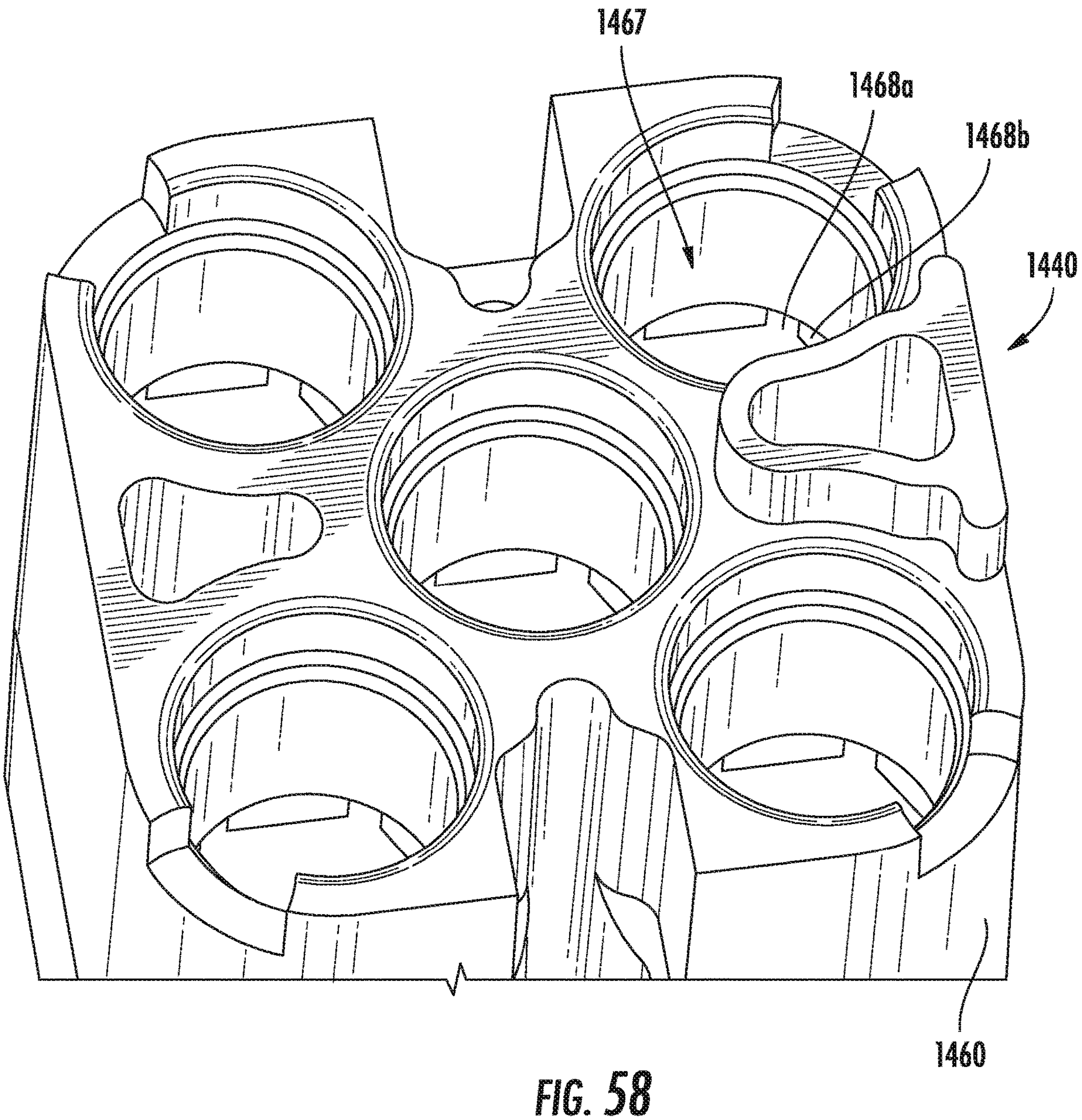
FIG. 58 is an end perspective view of the shell of the ganged cable connector assembly employed in the assembly of FIG. 57.

Referring now to FIGS. 55 and 56, another assembly, designated broadly at 1300, is shown therein. The assembly 1300 is similar to the assembly 1200, with an equipment connector assembly 1305 having connectors 1310 and a cable connector assembly 1340 having connectors 1350 and a shell 1360. The cable connector assembly 1340 has two O-rings 1380, 1382 within recesses in the outer conductor body 1356 of the connector 1350 that provide sealing against the outer conductor body 1316 of the connectors 1310. Alternatively, as shown in FIGS. 57 and 58, an assembly 1400 comprises an equipment connector assembly 1405 and a cable connector assembly 1440 that provides sealing via one O-ring 1480 positioned like the O-ring 1380 and a second O-ring 1485 positioned between the outer conductor body 1456 and the shell 1460. In these instances, the O-rings are positioned such that they can provide two separate seals between the assemblies to ensure the prevention of water egress into the area of electrical contact between the outer conductor bodies of the connectors. Also notable on the assembly 1440 are a protrusion 1470 on one side of the shell 1460 and a recess 1472 on the opposite side of the shell 1460. The protrusion 1470 and the recess 1472 are aligned with mating features on the equipment connector assembly 1405 to ensure that the assemblies 1405, 1440 are properly aligned when mated.

As another alternative, an assembly 1500 is similar to assembly 1400, but includes a molded-in sealing protrusion 1590 that is part of the shell 1560 rather than the O-ring 1485.

Figure 60:
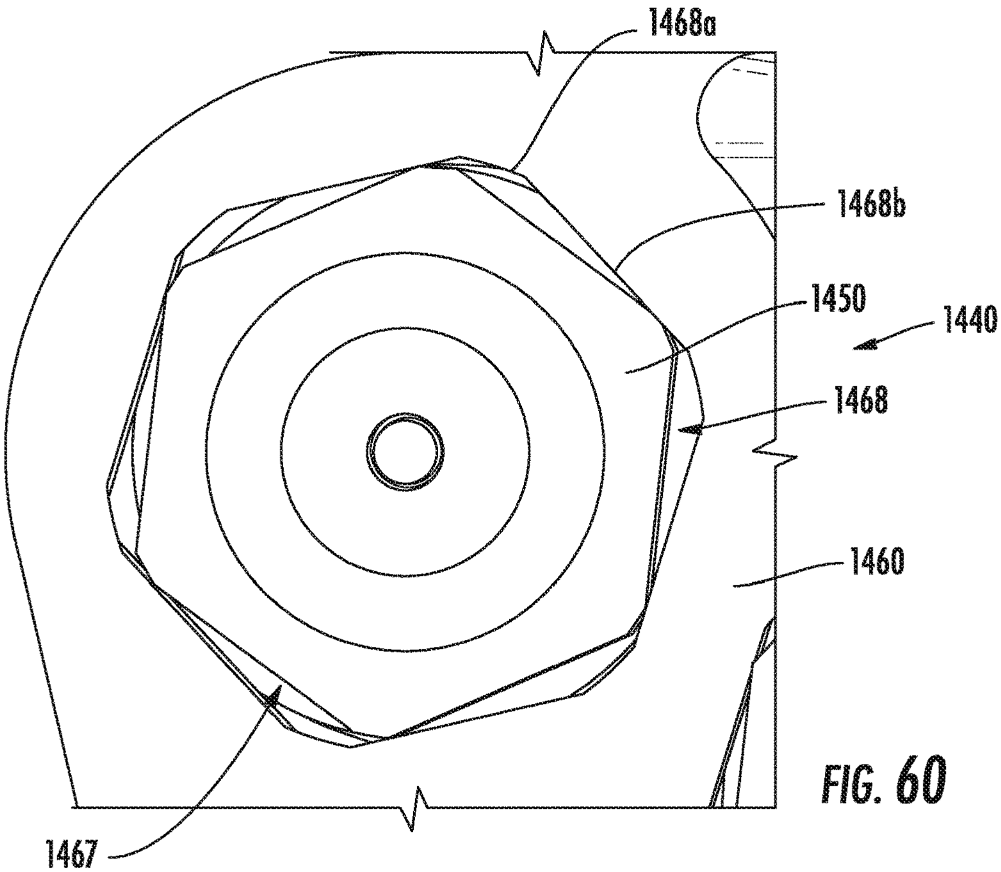
FIGS. 60 and 61 are end views of one connector of the cable connector assembly and the shell of the cable connector assembly of FIG. 58 showing the anti-rotation features of the shell.
Figure 61:
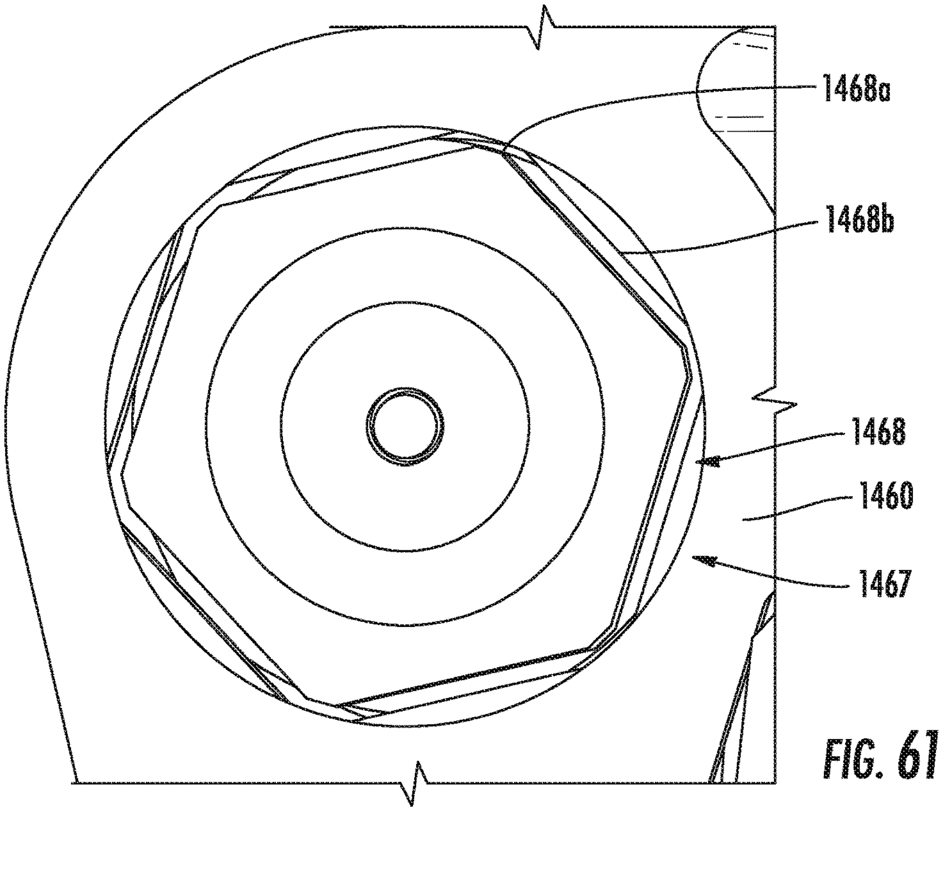

Referring now to FIGS. 60 and 61, the shell 1460 of the cable connector assembly 1440 shown in FIG. 58 has cavities 1467 with sections 1468 that are generally hexagonally-shaped, but that have beveled corners 1468*a* between the sides 1468*b* of the "hexagon." Put another way, the sections 1468 are 12-sided, with six long sides 1468*b* and six shorter sides 1468*a*. As shown in FIGS. 60 and 61, this arrangement can prevent the connectors 1450 from over-rotating within the cavity 1467 (which can damage the cable and/or produce debris that can negatively impact performance) while still permitting same degree of radial float.

Figure 62:
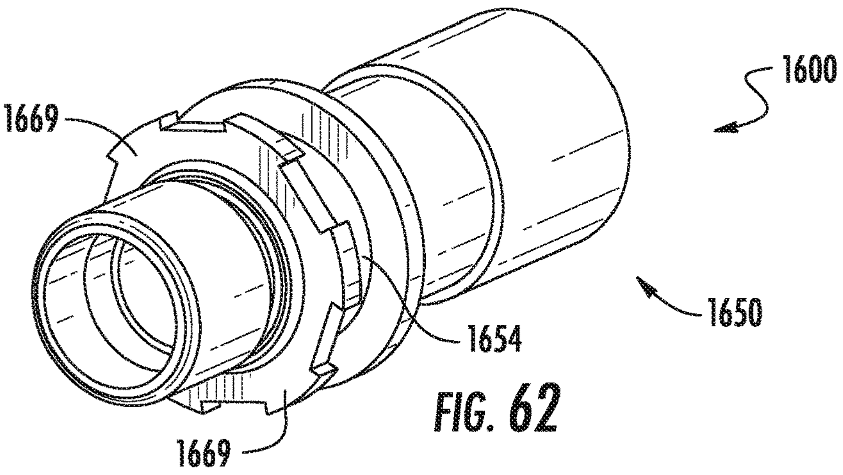
FIG. 62 is a perspective view of a connector of a ganged cable connector assembly according to still further embodiments of the invention.
Figure 63:
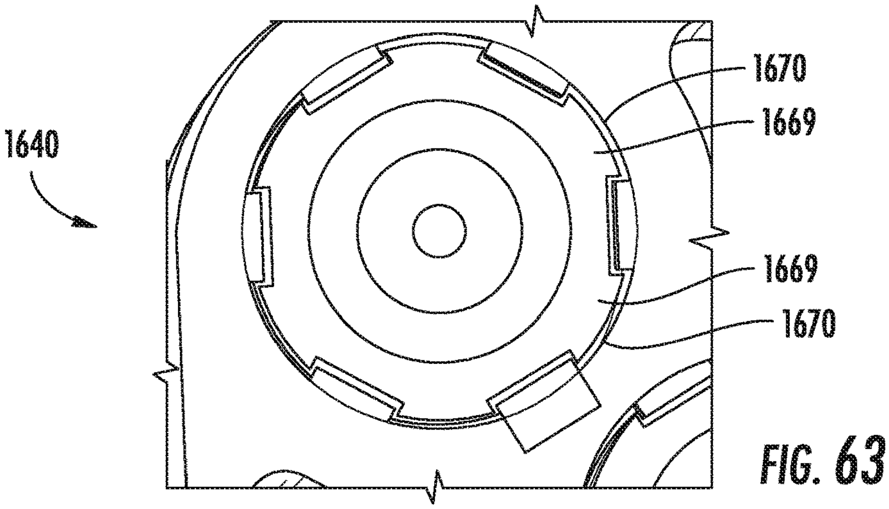
FIG. 63 is an end view of the connector of FIG. 62 inserted into the shell of FIG. 64.
Figure 64:
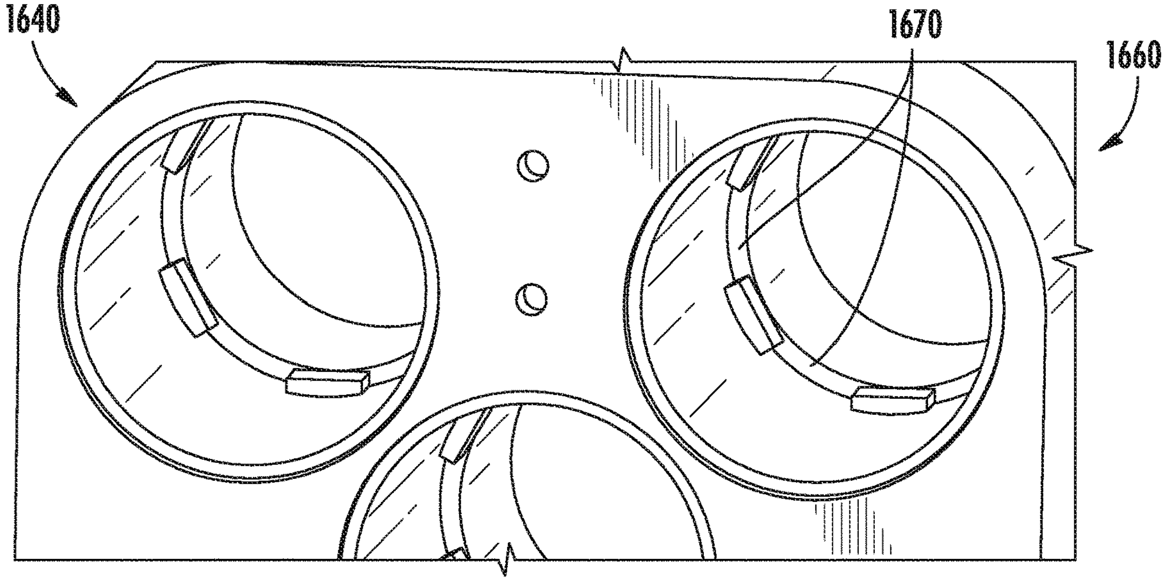
FIG. 64 is the shell of the cable connector assembly employing the connector of FIG. 62.

As another example of addressing the desire for some radial float of the connectors while limiting twist, a connector assembly 1600 is shown in FIGS. 62-64. In this embodiment, the connector 1650 of the cable connector assembly 1640 has teeth 1669 on the outer conductor body 1654, and the shell 1660 has corresponding recesses 1670 (in the embodiment shown herein, the connector 1650 has six teeth 1669, and the shell 1660 has six recesses 1670, although more or fewer teeth/recesses may be included). This arrangement also reduces the degree of twist between the connector 1650 and the shell 1660, which can protect the cable and prevent the production of undesirable debris, but also permits some degree of radial float.

Figure 59:
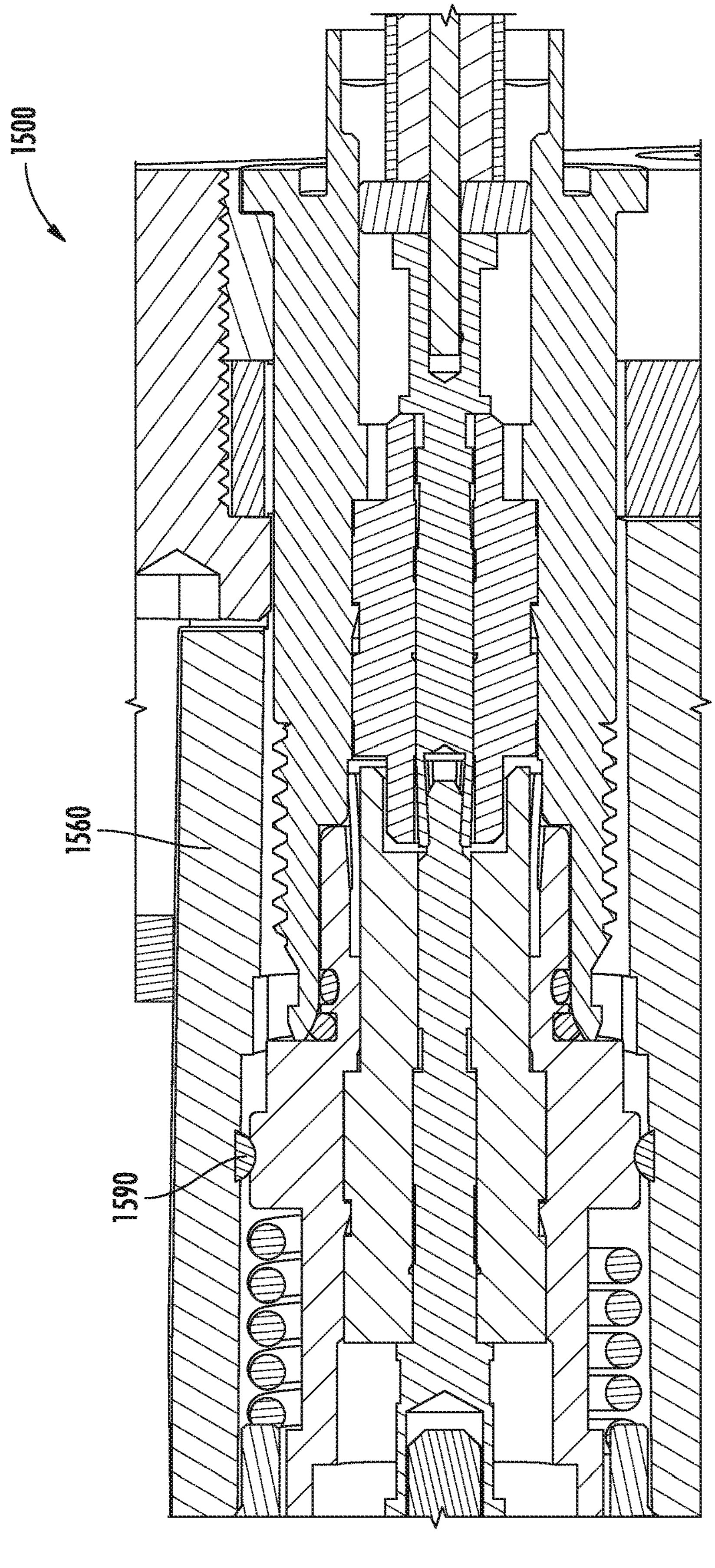
FIG. 59 is a sectional view of one pair of mated connectors in an assembly of mated connectors according to a yet further embodiment of the invention.
Figure 65:
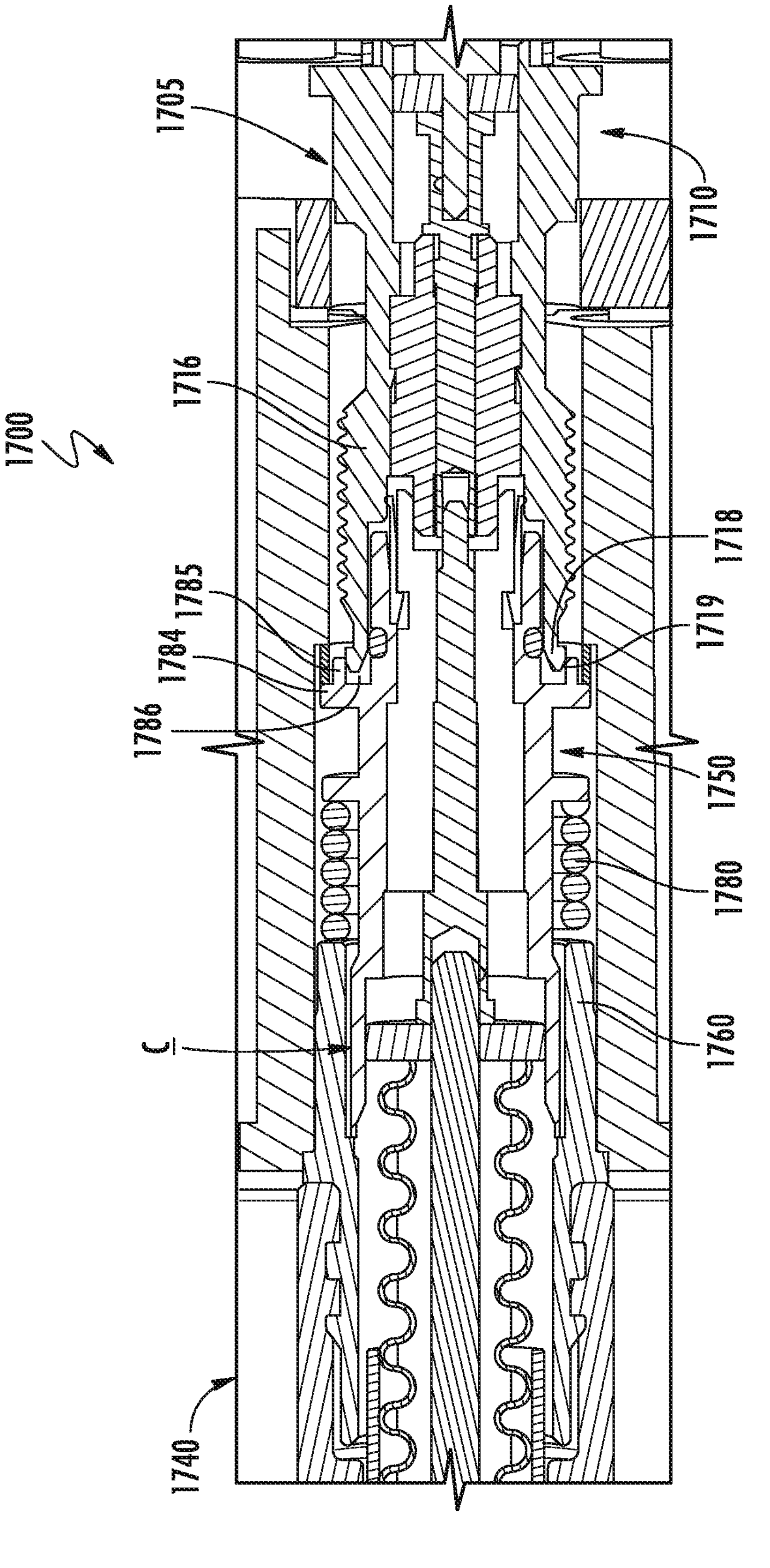
FIG. 65 is a side section view of another cable-connector assembly according to embodiments of the invention, with the connectors shown in a partially assembled condition.
Figure 66:
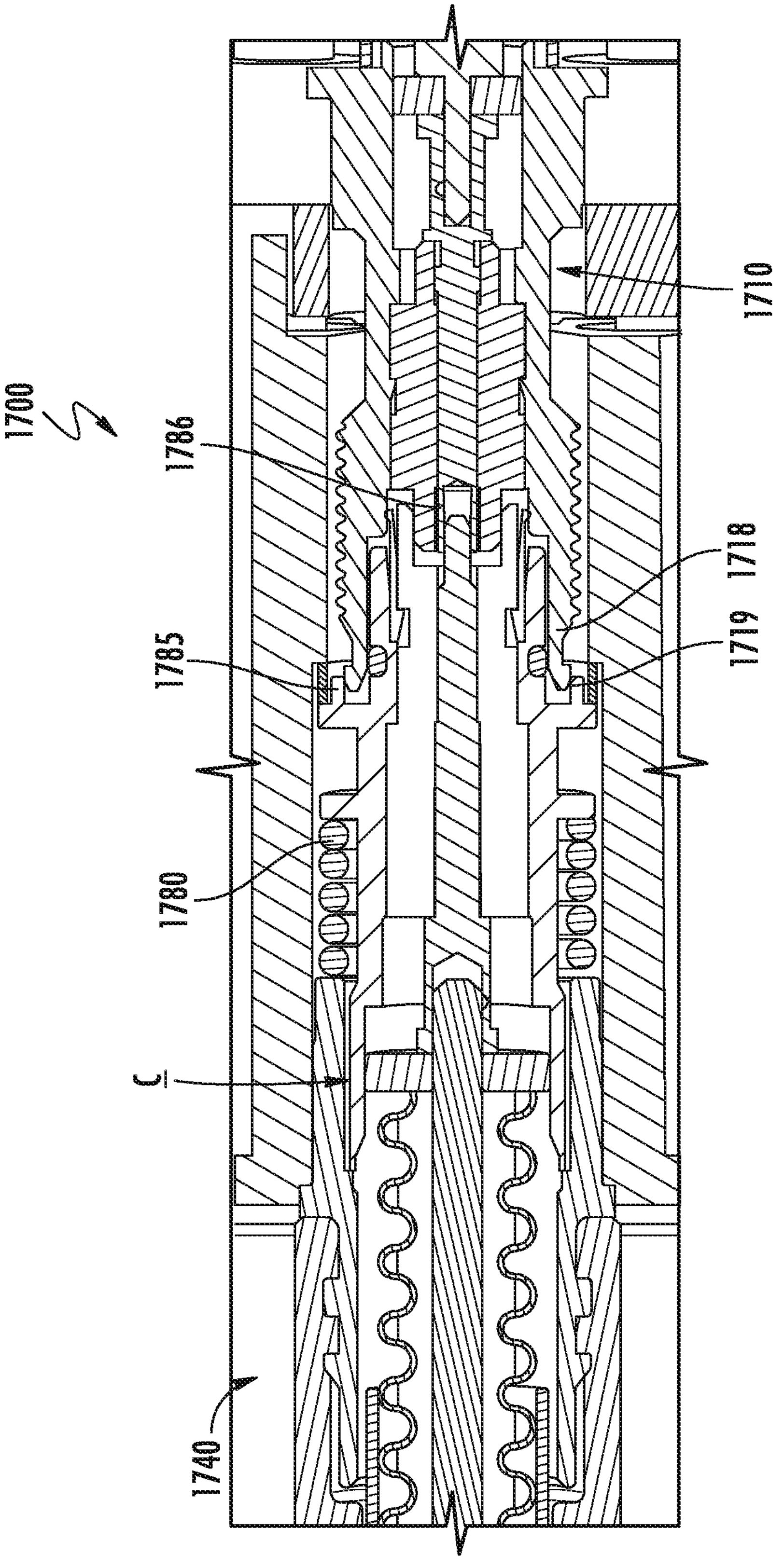
FIG. 66 is a side section view of the cable-connector assembly of FIG. 65, with the connectors shown in a fully assembled condition.

Referring now to FIGS. 65 and 66, another cable-connector assembly, designated broadly at 1700, is shown therein. The assembly 1700 is similar to the assemblies 1200, 1300, 1400, 1500 and 1600, with an equipment connector assembly 1705 having connectors 1710 mating with a cable connector assembly 1740 with connectors 1750 in a shell 1760. Springs 1780 provide the capacity for radial adjustment of the outer connector body 1756 relative to the shell 1760. In this embodiment, the outer connector body 1756 has a radially-outward flange 1784 located forwardly of the flange 1782 (which captures the forward end of the spring 1780). The flange 1784 has a trepan groove 1786 in its forward surface (a projection 1785 is located radially outward of the groove 1785). Also, at the rear end of the outer connector body 1756, there is greater clearance gap C between the outer connector body 1756 and the shell 1760 than in the assembly 1500 shown in FIG. 59. The outer connector body 1716 of the connector 1710 has a beveled outer edge 1719 at its forward end 1718.

As shown in FIG. 65, during initial mating of the connectors 1710, 1750, the inner contact 1754 of the connector 1750 engages the inner contact 1712 of the connector 1710, which provides a first "centering" action of the connector 1750. This action also causes the spring 1780 to "bottom out." As mating continues (FIG. 66), the spring 1780 opens slightly, which causes the beveled outer edge 1719 of the outer connector body 1716 to contact the projection 1785. This interaction provides a second "centering" action to mating, which enables the clearance gap C between the rear portion of the outer connector body 1756 and the shell 1760 to be greater than in other embodiments.

Figure 67:
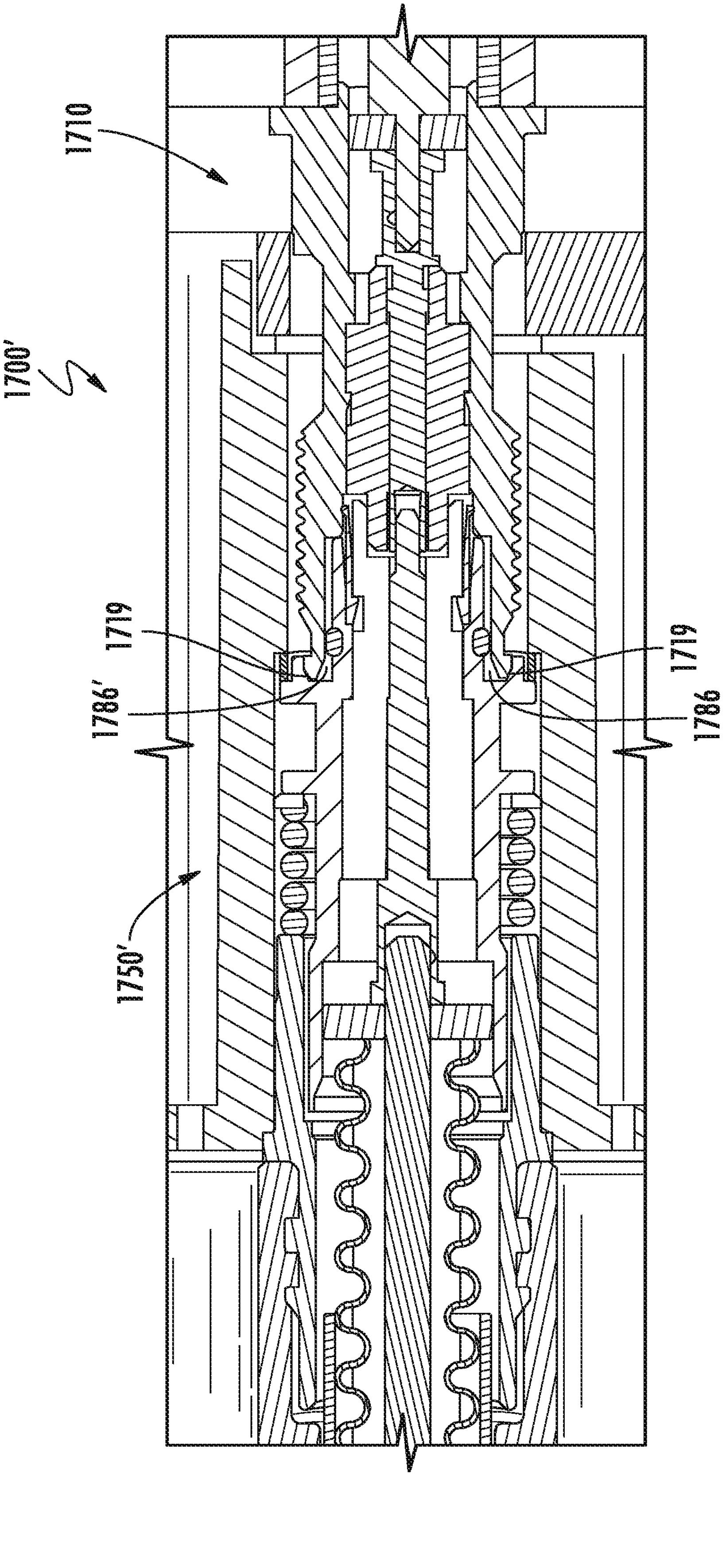
FIG. 67 is a side section view of another cable-connector assembly according to embodiments of the invention, with the connectors shown in a fully assembled condition.
Figure 68:
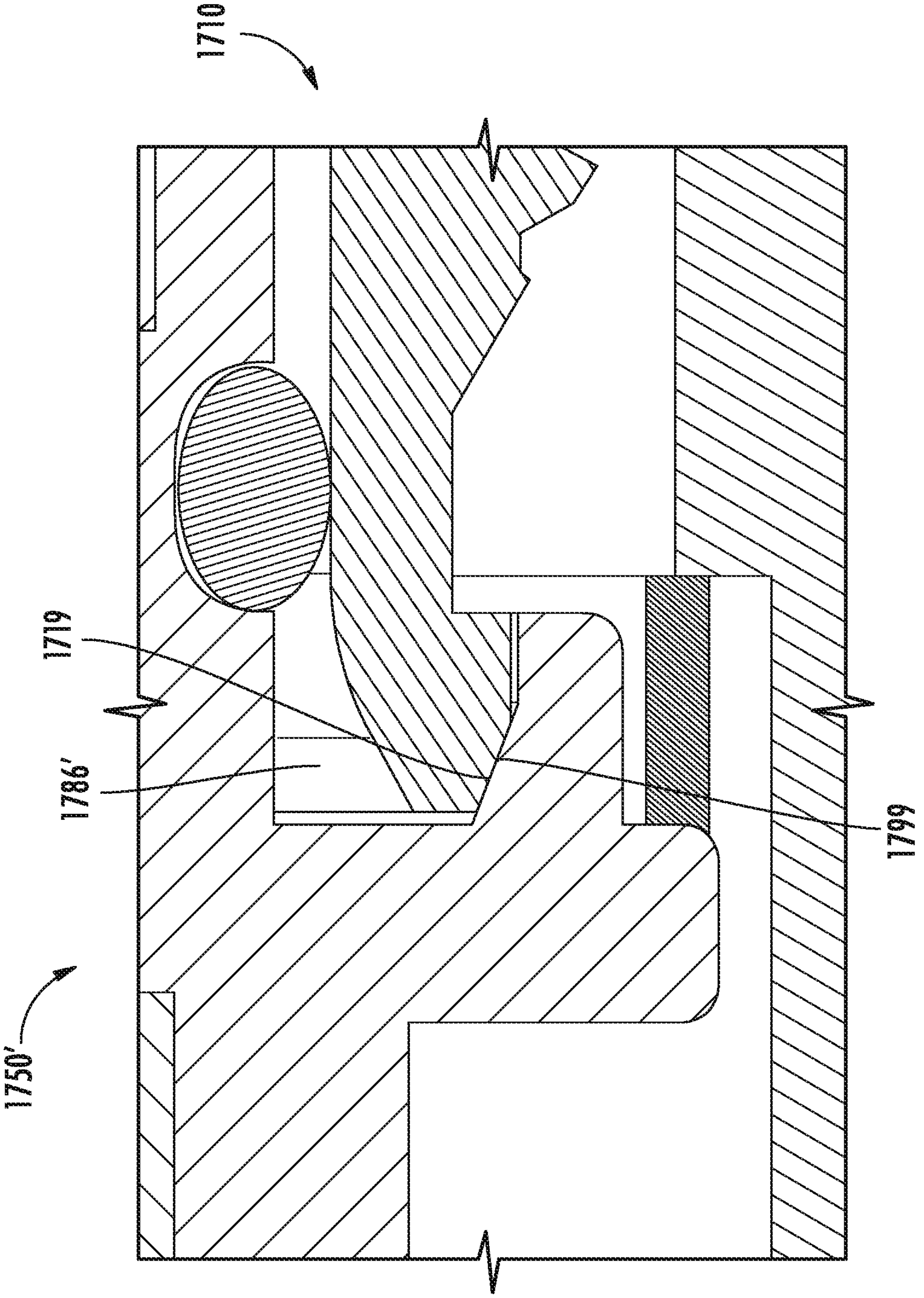
FIG. 68 is an enlarged partial view of a portion of the assembly of FIG. 67.
Figure 69:
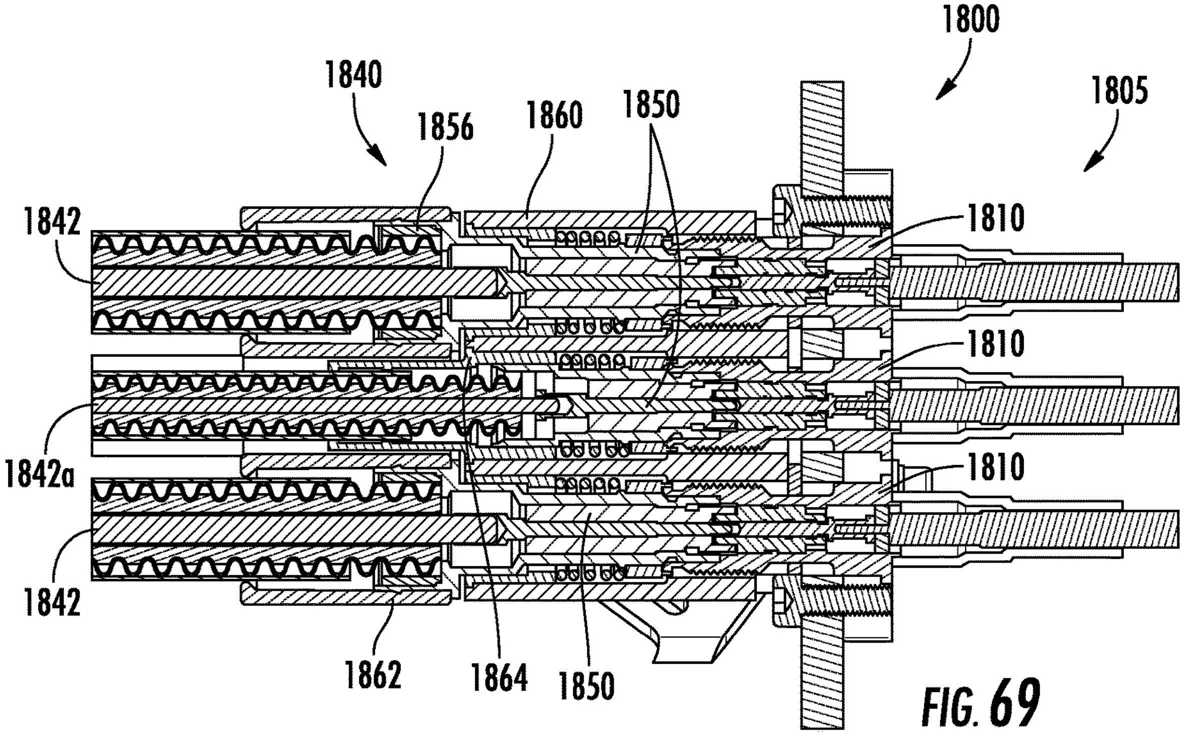
FIG. 69 is a side section view of another assembly of mated ganged connectors according to additional embodiments of the invention.
Figure 70:
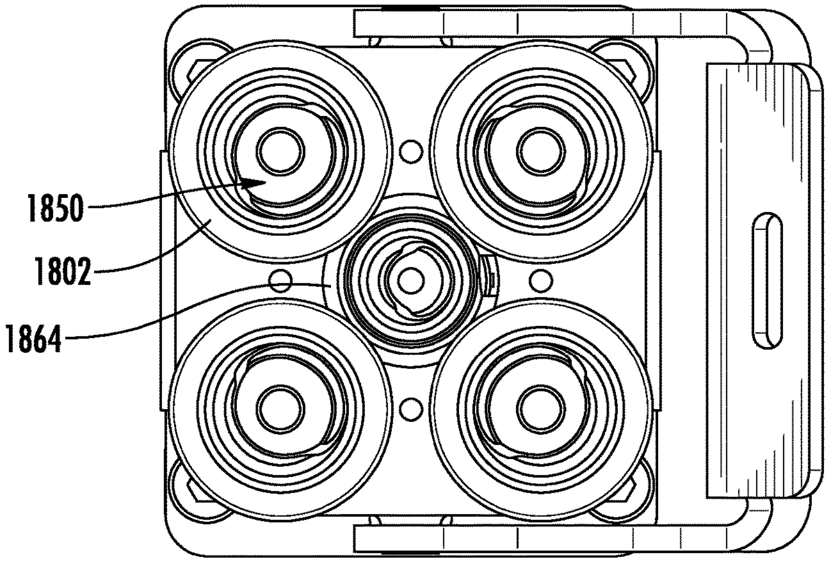
FIG. 70 is a rear view of the cable connector assembly of FIG. 69.
Figure 71:
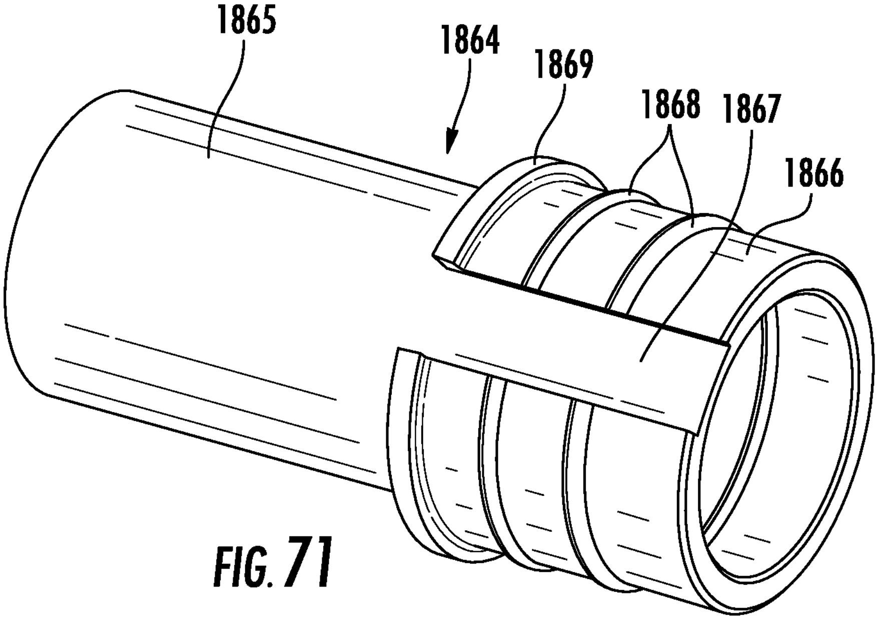
FIG. 71 is a perspective view of a large cable strain relief of the cable-connector assembly of FIG. 70.

A third centering action can also be included, as shown in FIGS. 67 and 68, in which assembly 1700' is illustrated. In this embodiment, an inclined surface 1799 is present in the radially outwardly corner of the gap 1786'. Thus, as the mating of the connectors 1710, 1750' proceeds, the beveled outer edge 1719 contacts the inclined surface 1799 near the completing of full mating, which action further provides a centering action to the connector 1750'. Thus, the three different centering actions provided by the assembly 1700' can further ensure centering of the connector 1750' relative to the connector 1710, which also enables a greater clearance gap C to be employed.

Referring now to FIGS. 69-78, another embodiment of a mated ganged assembly is shown therein and designated broadly at 1800. The assembly 1800 is similar to the assemblies 1200, 1300, 1400, 1500, 1600 and 1700, with an equipment connector assembly 1805 having connectors 1810 mating with a cable connector assembly 1840 and a shell 1860. However, the cable connector assembly 1840 includes five total cables in a cruciform arrangement, four of which (designated at 1842) are of a larger size (e.g., a ⅜ inch cable) than a fifth cable 1842*a* (e.g., a ¼ inch cable). The cable 1842*a* is located at the center or intersection of the "cross" formed by the cables 1842, 1842*a*. The cable connector assembly 1840 also includes five connectors, four of which (designated 1850) are attached to the larger cables 1842, and one of which (designated 1852*a*) is shorter in overall length and is attached to the smaller cable 1842*a*. The smaller cable 1842*a* and smaller connector 1850*a* may be employed in the center port position, and is typically used for calibration purposes.

Figure 72:
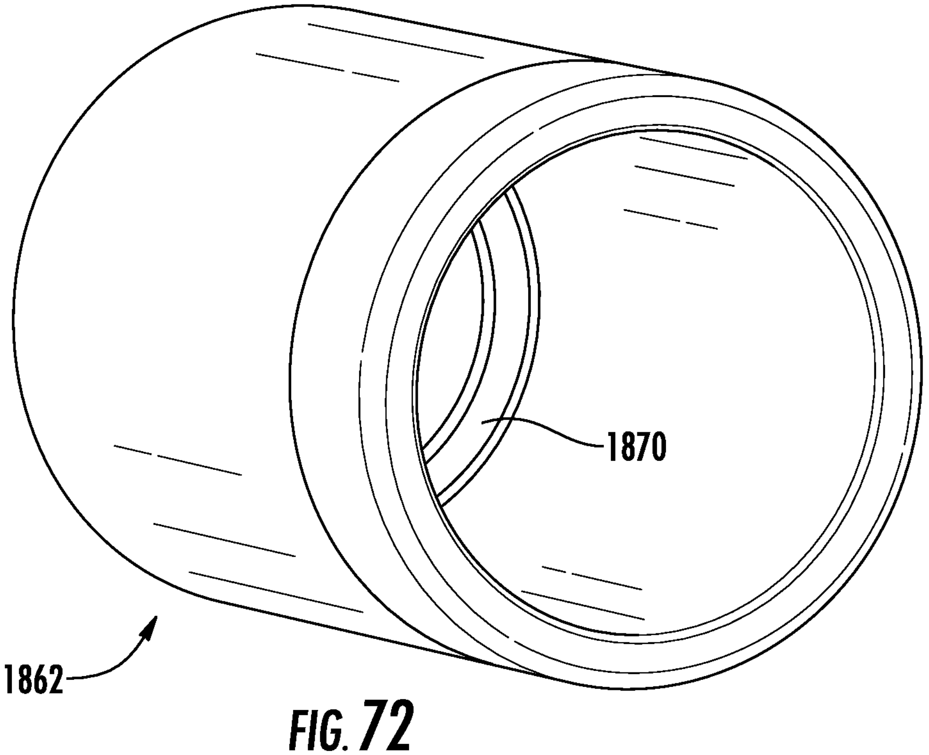
FIG. 72 is a perspective view of a small cable strain relief of the cable-connector assembly of FIG. 70.
Figure 73:
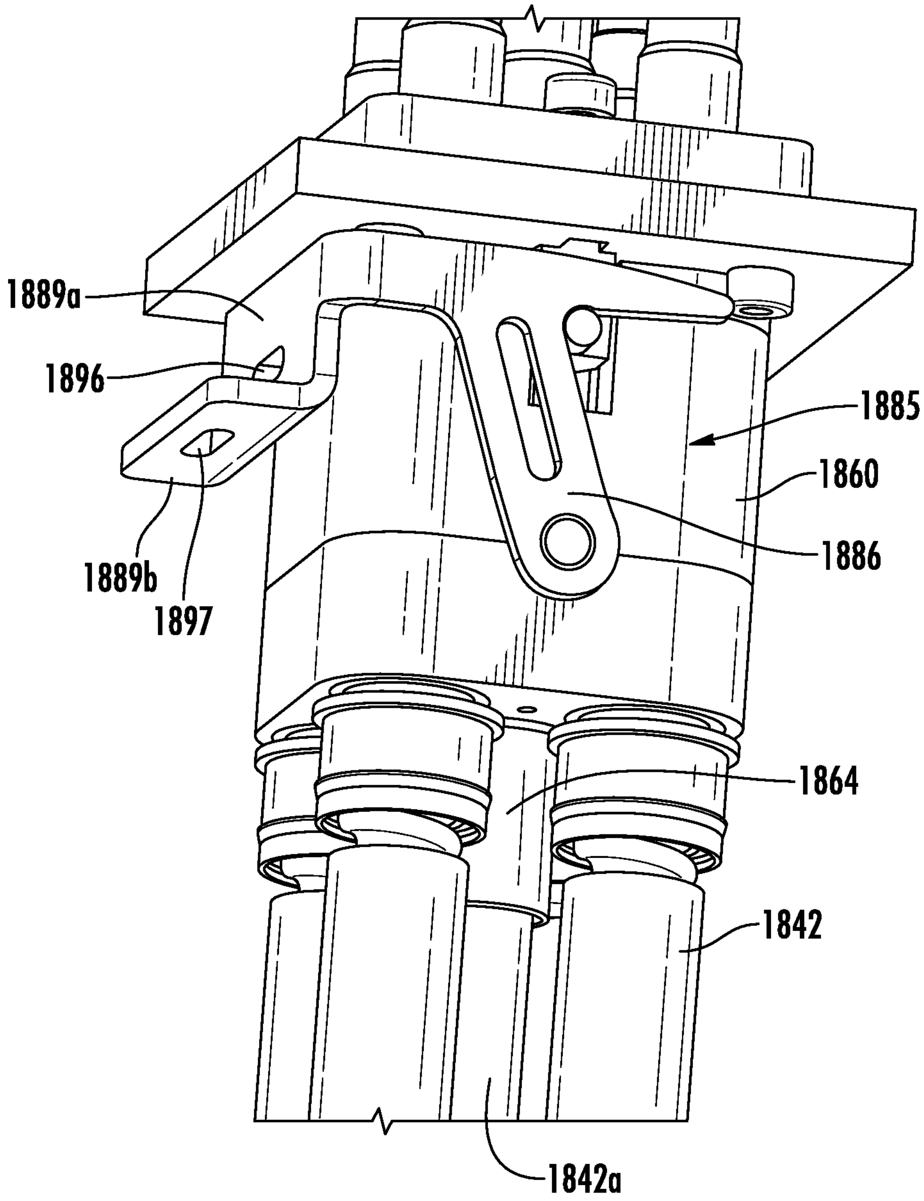
FIG. 73 is a rear perspective view of the assembly of FIG. 69 shown with the latch of the toggle assembly in the secured position.
Figure 74:
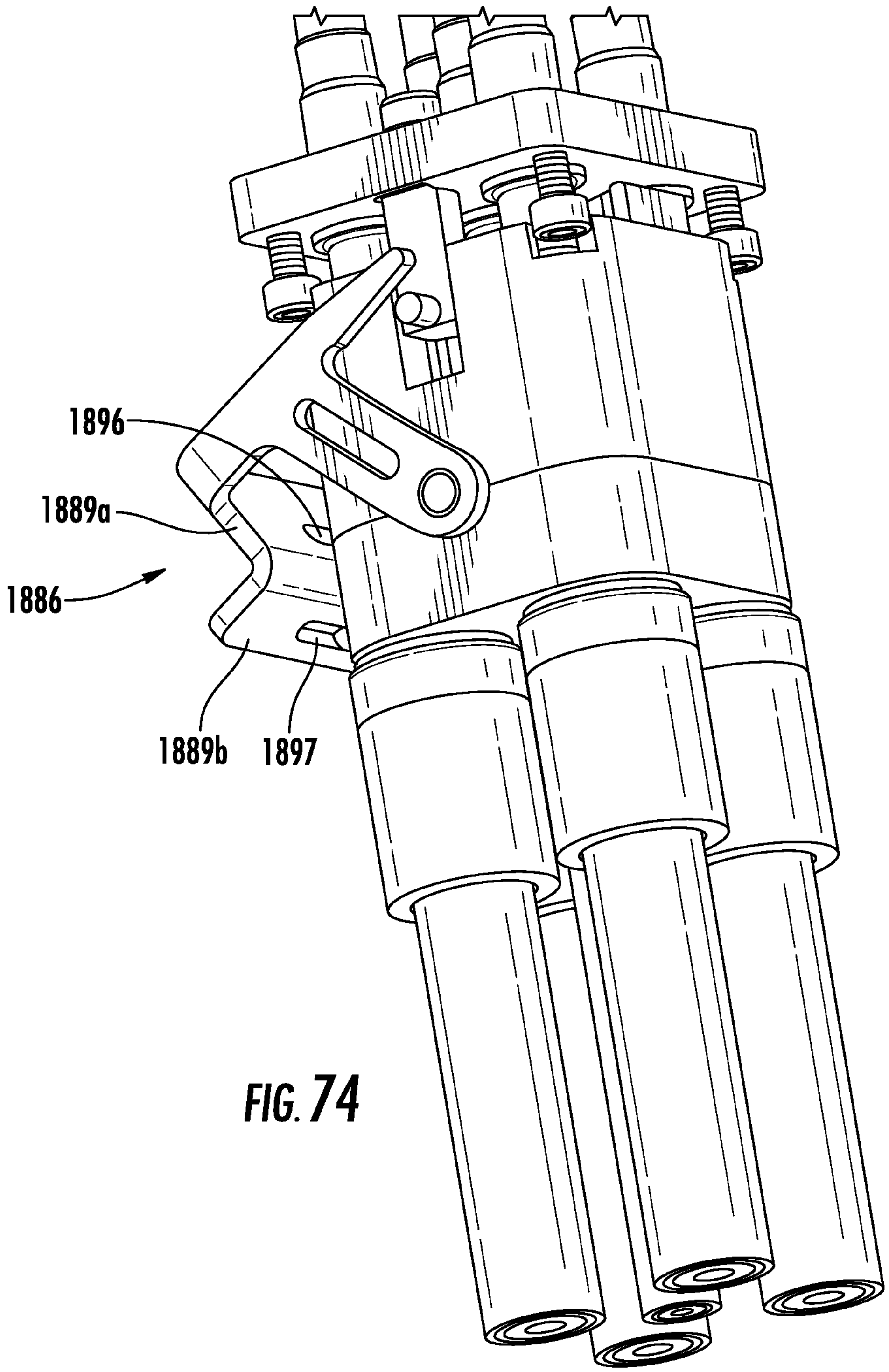
FIG. 74 is a rear perspective view of the assembly of FIG. 69 shown with the latch in the unsecured position.

Because the cable 1842*a* and connector 1850*a* are smaller than the connectors 1850 and cables 1842, the cable connector assembly 1840 may utilize a more standard approach to strain relief (due to the extra room allowed by the smaller center connector 1850*a* and cable 1842*a*). This approach includes the employment of a generally cylindrical protective boot 1862 for each larger cable-connector interface, and a smaller protective boot 1864 for the interface of the connector 1850*a* and the cable 1842*a*. As can be seen in FIGS. 68 and 72, the larger boot 1862 is generally cylindrical, with an inner lip 1870 at is rear end. The smaller, central boot 1864 (see FIGS. 68 and 71) has a narrower rear section 1865 and a wider front section 1866 which includes two external ridges 1868. An external lip 1869 is present at the rear end of the front section 1866. A channel 1867 extends longitudinally on the outer surface of the front section 1866.

As shown in FIG. 68, the narrower rear section 1865 of the boot 1864 fits between the front ends of the boots 1862. It can be seen in FIG. 68 that the boot 1862 is maintained in place with barbs or other retention features on the outer conductor boy 1856 of each connector 1850. The boot 1864 is maintained in place by the ridges 1868 engaging the shell 1860. The boots 1862, 1864 in this arrangement are able to protect the cable-connector interfaces and to provide strain relief.

Notably, when assembling the cable connector assembly 1840, the terminated cables 1842, 1842*a* can simply be pushed directly into the shell 1860; they need not utilize a central cavity as shown above in the assembly 1240 that allows the cables on the outside of the assembly to be inserted first axially, then radially, to position them in place.

Another potential performance advantage to the assembly 1840 is that, when attaching the terminating end of the port cables 1842, 1842*a,* there is no confusion about which cable is the calibration port.

Figure 75:
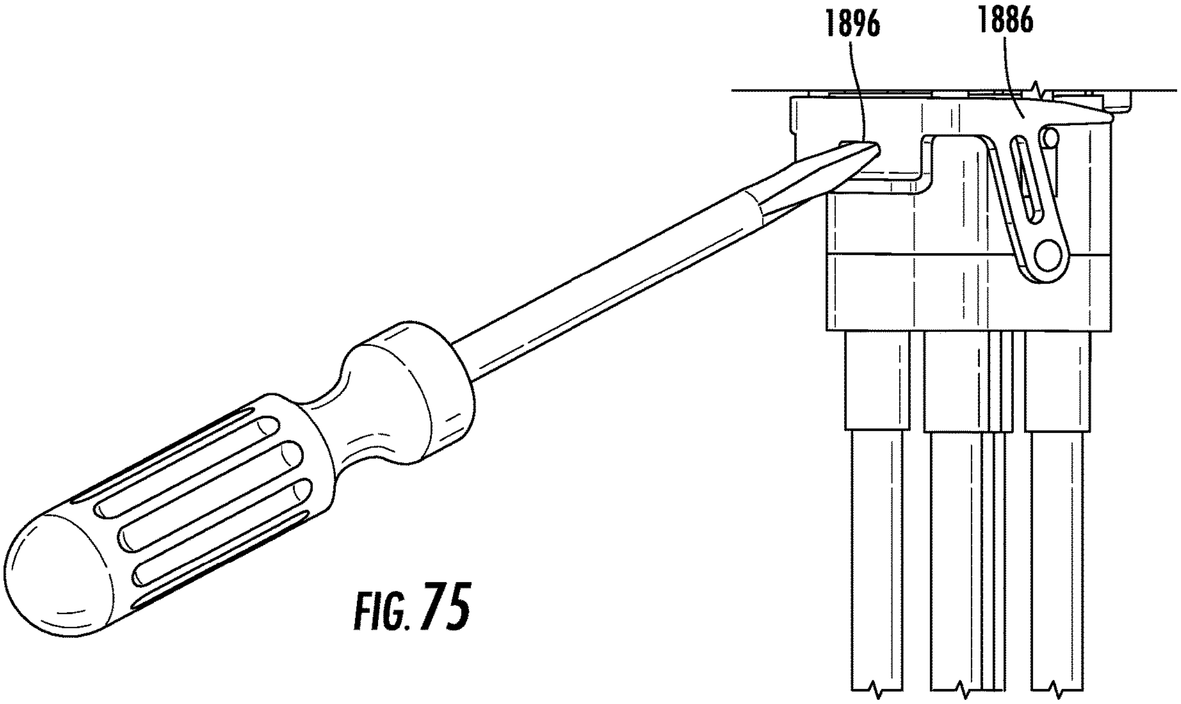
FIGS. 75 and 76 are side perspective views of the assembly of FIG. 69 showing the use of a screwdriver to move the latch from the secured position (FIG. 75) to the unsecured position (FIG. 76).
Figure 76:
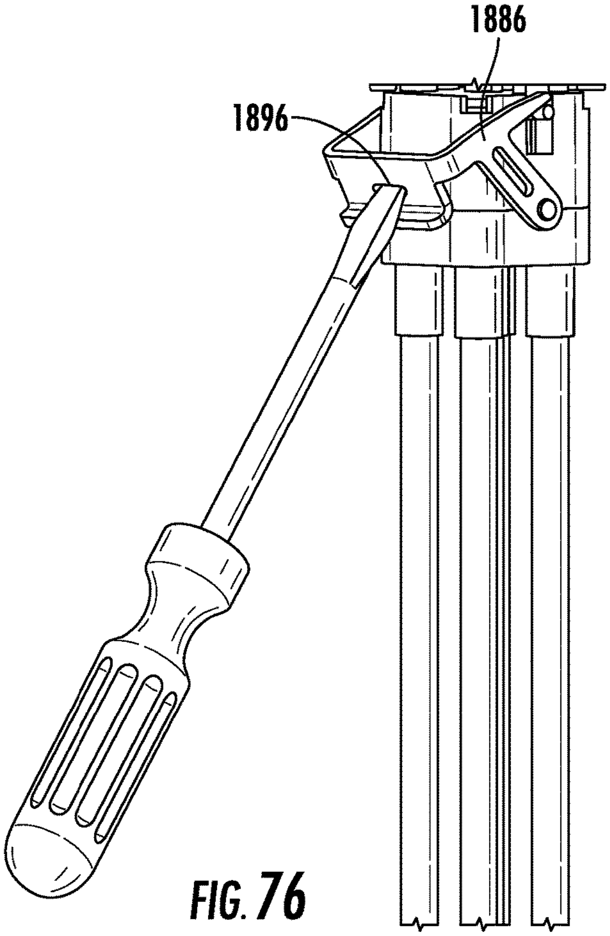
Figure 77:
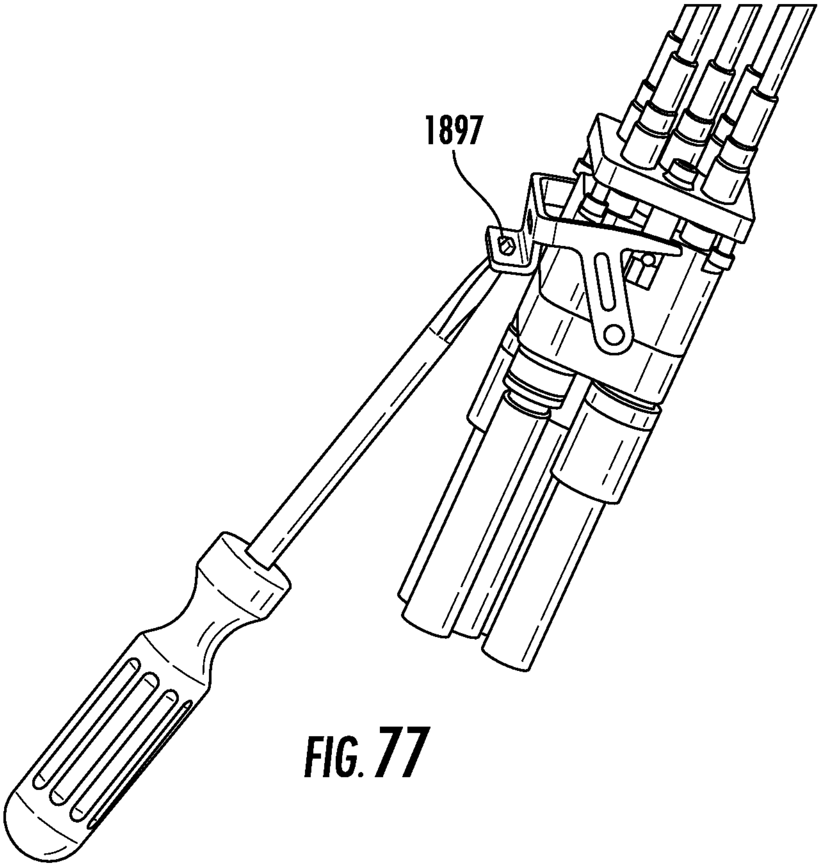
FIGS. 77 and 78 are side perspective views of the assembly of FIG. 69 showing the use of a screwdriver to move the latch from the unsecured position (FIG. 77) to the secured position (FIG. 78).
Figure 78:
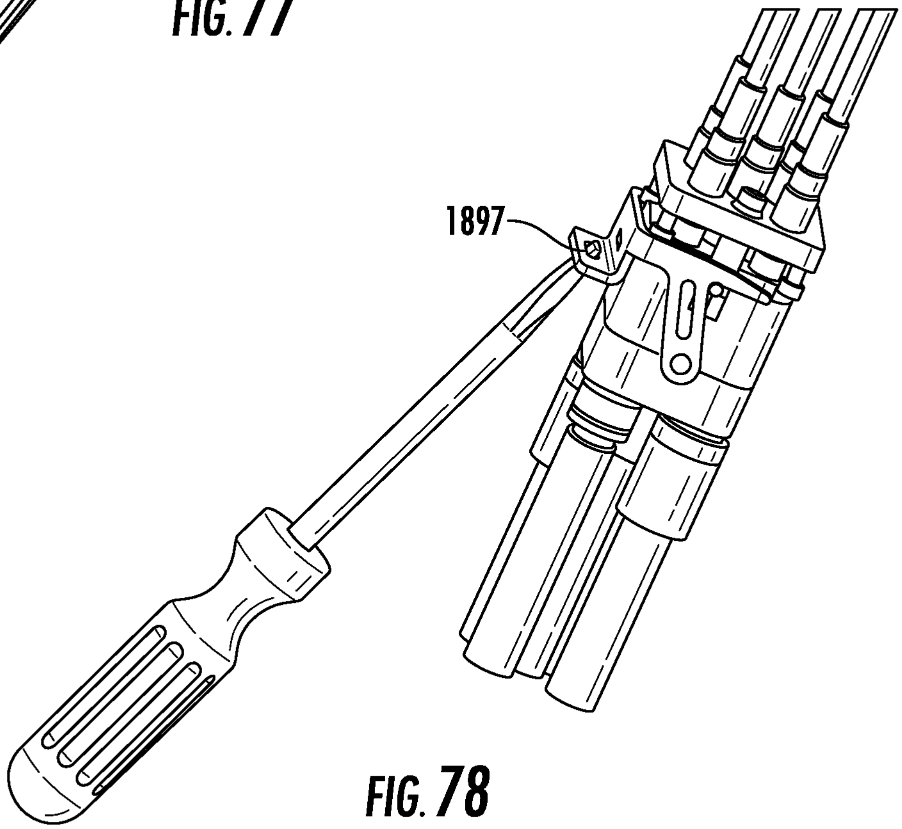

Referring now to FIGS. 73-78, the cable connector assembly 1840 includes a toggle assembly 1885 that is similar to the toggle assembly 885 of the cable connector assembly 840 discussed above, but that includes a latch 1886 that has a handle 1889 with two slots 1896, 1897 in generally perpendicular panels 1889*a,* 1889*b* of the handle 1889. As can be seen in FIGS. 75 and 76, the slot 1896 provides a receptacle for a screwdriver or other prying tool to assist in moving the latch 1896 from a secured to an unsecured condition. Conversely, FIGS. 77 and 78 show that the slot 1897 provides a receptacle for a screwdriver or other prying tool to assist in moving the latch 1896 from an unsecured to a secured condition.

Those of skill in this art will also recognize that the manner in which mating assemblies may be secured for mating may vary, as different types of fastening features may be used. For example, fastening features may include the numerous latches, screws and coupling nuts discussed above, but alternatively fastening features may include bolts and nuts, press-fits, detents, bayonet-style "quick-lock" mechanisms and the like.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A coaxial connector assembly, comprising:

four first coaxial connectors mounted within a shell, the shell defining four first electrically isolated first cavities, each of the first coaxial connectors being located in a respective cavity, each of the first cavities encircling its respective coaxial connector such that each of a plurality of mating coaxial connectors of a mating coaxial connector assembly extends into a respective cavity to mate with a respective coaxial connector:

wherein each of the four first coaxial connectors comprises an inner conductor, an outer conductor, and an insulating material located between the inner conductor and outer conductor;

wherein each of the first coaxial connectors is mounted within its respective first cavity to float radially and axially relative to each of the other first coaxial connectors;

wherein each of a plurality of springs engages each of the first coaxial connectors and the shell to provide the axial and radial float between each of the first coaxial connectors and the shell;

four first coaxial cables, each of the coaxial cables attached to a respective one of the first coaxial connectors:

wherein each of the four first coaxial cables comprises an inner conductor, an outer conductor, and an insulating material located between the inner conductor and outer conductor;

wherein the four first coaxial connectors are disposed such that a first and a second of the first coaxial connectors define a first axis, and wherein a third and a fourth of the first coaxial connectors define a second axis, and wherein the first and second axes intersect at an intersection point; and wherein a second electrically isolated cavity is present in the shell, the second cavity being positioned at the intersection point.

2. The coaxial connector assembly defined in claim 1, wherein a second coaxial connector is located in the second cavity.

3. The coaxial connector assembly defined in claim 2, further comprising a second coaxial cable attached to the second coaxial connector.

4. The coaxial connector assembly defined in claim 3, wherein the second coaxial cable is smaller than the first coaxial cables.

5. The coaxial connector assembly defined in claim 3, further comprising four first protective boots and a second protective boot, wherein each of the first protective boots is associated with a respective one of the first coaxial cables and the second protective boot is associated with the second coaxial cable.

6. The coaxial connector assembly defined in claim 1, wherein the four first coaxial connectors are arranged in a cruciform arrangement.

7. The coaxial connector assembly defined in claim 1, further comprising a toggle assembly having a latch pivotally connected with the shell, wherein the latch is configured to engage a feature on a mating coaxial connector assembly to secure the mated assembly in position.

8. A coaxial connector assembly, comprising:

four first coaxial connectors mounted within a polymeric shell, the shell defining four first electrically isolated first cavities, each of the first coaxial connectors being located in a respective cavity, each of the first cavities encircling its respective coaxial connector such that each of a plurality of mating coaxial connectors of a mating coaxial connector assembly extends into a respective cavity to mate with a respective coaxial connector:

wherein each of the first coaxial connectors is mounted within its respective first cavity to float radially and axially relative to each of the other first coaxial connectors;

wherein each of a plurality of springs engages each of the first coaxial connectors and the shell to provide the axial and radial float between each of the first coaxial connectors and the shell;

wherein each of the four first coaxial connectors comprises an inner conductor, an outer conductor, and an insulating material located between the inner conductor and outer conductor;

four first coaxial cables, each of the coaxial cables attached to a respective one of the first coaxial connectors:

wherein each of the four first coaxial cables comprises an inner conductor, an outer conductor, and an insulating material located between the inner conductor and outer conductor;

wherein the four first coaxial connectors are disposed such that a first and a second of the first coaxial connectors define a first axis, and wherein a third and a fourth of the first coaxial connectors define a second axis, and wherein the first and second axes intersect at an intersection point; and wherein a second electrically isolated cavity is present in the shell, the second cavity being positioned at the intersection point.

9. The coaxial connector assembly defined in claim 8, wherein a second coaxial connector is located in the second cavity.

10. The coaxial connector assembly defined in claim 9, further comprising a second coaxial cable attached to the second coaxial connector.

11. The coaxial connector assembly defined in claim 10, wherein the second coaxial cable is smaller than the first coaxial cables.

12. The coaxial connector assembly defined in claim 10, further comprising four first protective boots and a second protective boot, wherein each of the first protective boots is associated with a respective one of the first coaxial cables and the second protective boot is associated with the second coaxial cable.

13. The coaxial connector assembly defined in claim 8, further comprising a toggle assembly having a latch pivotally connected with the shell, wherein the latch is configured to engage a feature on a mating coaxial connector assembly to secure the mated assembly in position.

14. A coaxial connector assembly, comprising: four first coaxial connectors mounted within a shell, the shell defining four first electrically isolated first cavities, each of the first coaxial connectors being located in a respective cavity, each of the first cavities encircling its respective coaxial connector such that each of a plurality of mating coaxial connectors of a mating coaxial connector assembly extends into a respective cavity to mate with a respective coaxial connector: wherein each of the four first coaxial connectors comprises an inner conductor, an outer conductor, and an insulating material located between the inner conductor and outer conductor; wherein each of the first coaxial connectors is mounted within its respective first cavity to float radially and axially relative to each of the other first coaxial connectors; wherein each of a plurality of springs engages each of the first coaxial connectors and the shell to provide the axial and radial float between each of the first coaxial connectors and the shell;

four first coaxial cables, each of the coaxial cables attached to a respective one of the first coaxial connectors: wherein each of the four first coaxial cables comprises an inner conductor, an outer conductor, and an insulating material located between the inner conductor and outer conductor; wherein the four first coaxial connectors are disposed in the shell in a generally cruciform arrangement; and wherein a second electrically isolated cavity is present in the shell, the second cavity being positioned at center of the cruciform arrangement of the four first connectors.

15. The coaxial connector assembly defined in claim 14, wherein a second coaxial connector is located in the second cavity.

16. The coaxial connector assembly defined in claim 15, further comprising a second coaxial cable attached to the second coaxial connector.

17. The coaxial connector assembly defined in claim 16, wherein the second coaxial cable is smaller than the first coaxial cables.

18. The coaxial connector assembly defined in claim 14, further comprising a toggle assembly having a latch pivotally connected with the shell, wherein the latch is configured to engage a feature on a mating coaxial connector assembly to secure the mated assembly in position.

19. The coaxial connector assembly defined in claim 14, further comprising four first protective boots and a second protective boot, wherein each of the first protective boots is associated with a respective one of the first coaxial cables and the second protective boot is associated with the second coaxial cable.

20. The coaxial connector assembly defined in claim 14 wherein each of the first four coaxial connectors are substantially identical.

* * * * *